(12) United States Patent
Rakshani et al.

(10) Patent No.: US 7,899,410 B2
(45) Date of Patent: Mar. 1, 2011

(54) ADJUSTABLE ANTENNA INTERFACE AND APPLICATIONS THEREOF

(75) Inventors: Vafa James Rakshani, Newport Coast, CA (US); Ahmadreza (Reza) Rofougaran, Newport Coast, CA (US); Maryam Rofougaran, Rancho Palos Verdes, CA (US); Frederic Christian Marc Hayem, San Diego, CA (US); Claude G. Hayek, Huntington Beach, CA (US); Nelson R. Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 1003 days.

(21) Appl. No.: 11/642,019

(22) Filed: Dec. 19, 2006

(65) Prior Publication Data

US 2008/0146175 A1    Jun. 19, 2008

(51) Int. Cl.
*H04B 1/44* (2006.01)
(52) U.S. Cl. ........... 455/78; 455/88; 455/550.1; 455/557
(58) Field of Classification Search .................... 455/78, 455/88, 550.1, 552.1, 553.1, 557
See application file for complete search history.

(56) References Cited

U.S. PATENT DOCUMENTS

| 2004/0214528 | A1* | 10/2004 | Khorram et al. ................ 455/78 |
| 2005/0227728 | A1 | 10/2005 | Trachewsky | |

FOREIGN PATENT DOCUMENTS

| CN | 1349647 A | 5/2002 |
| EP | 1335544 A2 | 8/2003 |
| EP | 1727291 A2 | 11/2006 |
| KR | 20060066021 | 6/2006 |

OTHER PUBLICATIONS

GSM "LoCosto", Texas Instruments, Technology for Innovators, pp. 1-2.
Edge/GPRS/GSM Single-Chip Multimedia Baseband Processor, BCM2133, Product Brief, Broadcom Corporation, 2133-PB07-D1, Nov. 30, 2006, pp. 1-2.
WCDMA Baseband Coprocessor, BCM2141, Product Brief, Broadcom Corporation, 2141-PB03-R, Dec. 1, 2006, pp. 1-2.
Hedge Single-Chip Multimedia Baseband Processor, BCM2152, Product Brief, Broadcom Corporation, 2152-PB04-R, Dec. 1, 2006, pp. 1-2.
Andrew Fogg: DigRF Baseband/RF Digital Interface Specification; Logical, Electrical and Timing Characteristics, EGPRS Version, Digital Interface Working Group, version 1.12, pp. 1-32.

* cited by examiner

*Primary Examiner* — Yuwen Pan
(74) *Attorney, Agent, or Firm* — Garlick Harrison & Markison; Timothy W. Markison; Shayne X. Short

(57) ABSTRACT

An adjustable antenna interface includes a single-ended to differential conversion circuit, an adjustable impedance matching circuit, an RF differential switch, and an input. The single-ended to differential conversion circuit converts inbound RF signals from single-ended signals to differential signals and converts outbound RF signals from differential signals to single-ended signals. The adjustable impedance matching circuit provides an impedance based on an impedance control signal. The RF differential switch provides the differential outbound RF signals from the IC to the single-ended to differential conversion circuit in accordance with a first antenna control signal and provides the differential inbound RF signals from the single-ended to differential conversion circuit to the IC in accordance with a second antenna control signal. The input receives the first antenna control signal, the second antenna control signal, and the impedance control signal from the IC.

14 Claims, 42 Drawing Sheets

ADJUSTABLE ANTENNA INTERFACE AND APPLICATIONS THEREOF

CROSS REFERENCE TO RELATED PATENTS

The present invention is related to the following co-pending patent applications:
1. entitled VOICE/DATA/RF INTEGRATED CIRCUIT, having a filing date of Dec. 19, 2006, a serial number of Ser. No. 11/641,999,
2. entitled ON-CHIP BASEBAND-TO-RF INTERFACE AND APPLICATIONS THEREOF, having a filing date of Dec. 19, 2006, a serial number of Ser. No. 11/641,915,
3. entitled REAL-TIME/NON-REAL-TIME/RF IC AND APPLICATIONS THEREOF, having a filing date of Dec. 19, 2006, a serial number of Ser. No. 11/642,000,
4. entitled CELLULAR TELEPHONE IC AND APPLICATIONS THEREOF, having a filing date of Dec. 19, 2006, a serial number of Ser. No. 11/641,983, and,
5. entitled VOICE-DATA-RF INTEGRATED CIRCUIT, having a filing date of Dec. 19, 2006, a serial number of Ser. No. 11/642,018.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to integrated circuits of transceivers operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As the desire for wireless communication devices to support multiple standards continues, recent trends include the desire to integrate more functions on to a single chip. However, such desires have gone unrealized when it comes to implementing baseband and RF on the same chip for multiple wireless communication standards.

Therefore, a need exists for an integrated circuit (IC) that implements baseband and RF of multiple wireless communication standards on the same IC die.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
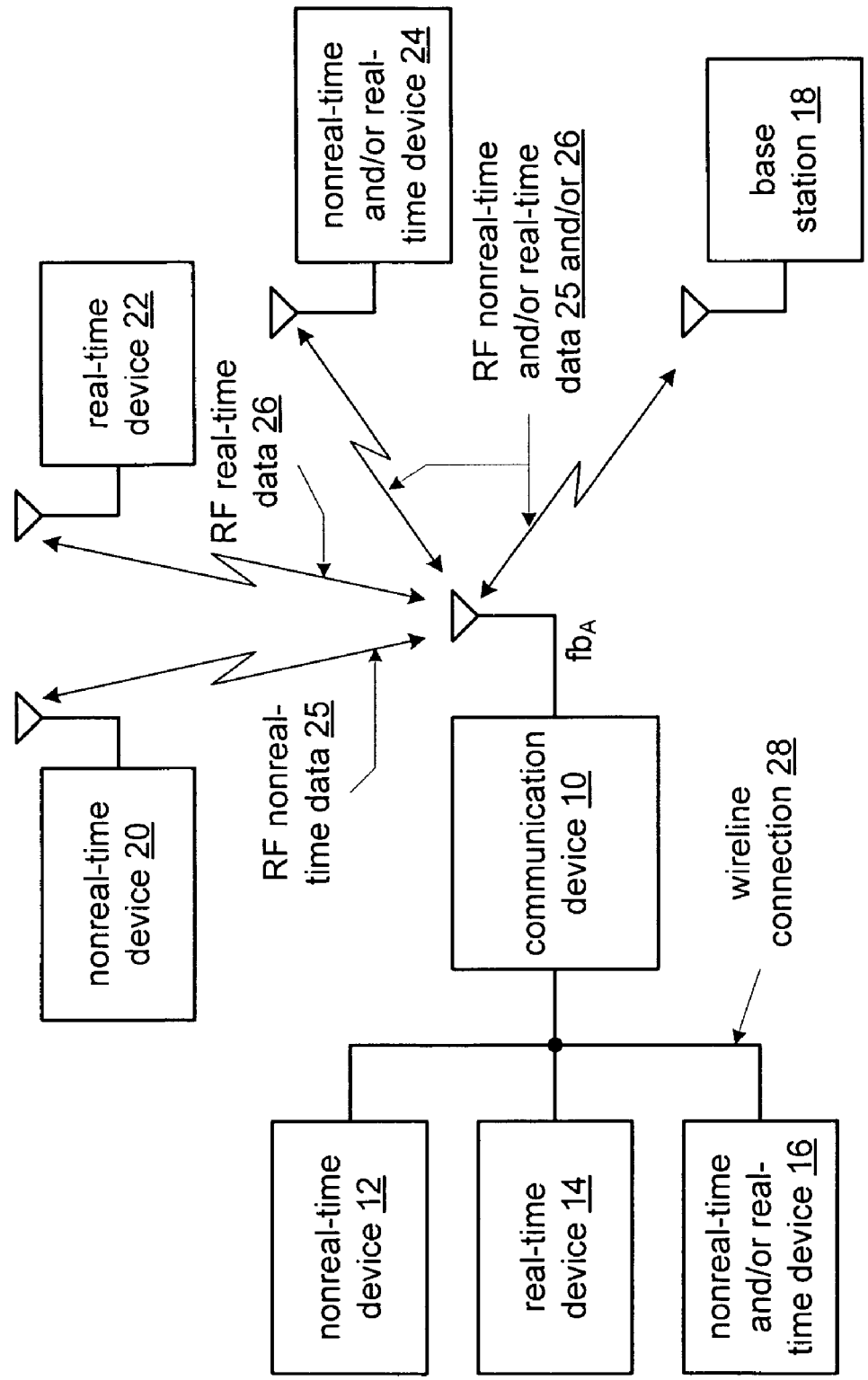
FIG. 1 is a schematic block diagram of a wireless communication environment in accordance with the present invention.

FIG. 1 is a schematic block diagram of a wireless communication environment that includes a communication device 10 communicating with one or more of a wireline non-real-time device 12, a wireline real-time device 14, a wireline non-real-time and/or real-time device 16, a base station 18, a wireless non-real-time device 20, a wireless real-time device 22, and a wireless non-real-time and/or real-time device 24. The communication device 10, which may be a personal computer, laptop computer, personal entertainment device, cellular telephone, personal digital assistant, a game console, a game controller, and/or any other type of device that communicates real-time and/or non-real-time signals, may be coupled to one or more of the wireline non-real-time device 12, the wireline real-time device 14, and the wireline non-real-time and/or real-time device 16 via a wireless connection 28. The wireless connection 28 may be an Ethernet connection, a universal serial bus (USB) connection, a parallel connection (e.g., RS232), a serial connection, a fire-wire connection, a digital subscriber loop (DSL) connection, and/or any other type of connection for conveying data.

The communication device 10 communicates RF non-real-time data 25 and/or RF real-time data 26 with one or more of the base station 18, the wireless non-real-time device 20, the wireless real-time device 22, and the wireless non-real-time and/or real-time device 24 via one or more channels in a frequency band ($fb_A$) that is designated for wireless communications. For example, the frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. As a particular example, wideband code division multiple access (WCDMA) utilizes an uplink frequency band of 1920-1980 MHz and a downlink frequency band of 2110-2170 MHz. As another particular example, EDGE, GSM and GPRS utilize an uplink transmission frequency band of 890-915 MHz and a downlink transmission band of 935-960 MHz. As yet another particular example, IEEE 802.11(g) utilizes a frequency band of 2.4 GHz frequency band.

The wireless real-time device 22 and the wireline real-time device 14 communicate real-time data that, if interrupted, would result in a noticeable adverse affect. For example, real-time data may include, but is not limited to, voice data, audio data, and/or streaming video data. Note that each of the real-time devices 14 and 22 may be a personal computer, laptop computer, personal digital assistant, a cellular telephone, a cable set-top box, a satellite set-top box, a game console, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

The wireless non-real-time device 20 and the wireline non-real-time device 12 communicate non-real-time data that, if interrupted, would not generally result in a noticeable adverse affect. For example, non-real-time data may include, but is not limited to, text messages, still video images, graphics, control data, emails, and/or web browsing. Note that each of the non-real-time devices 14 and 22 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

Depending on the real-time and non-real-time devices coupled to the communication unit 10, the communication unit 10 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 2:
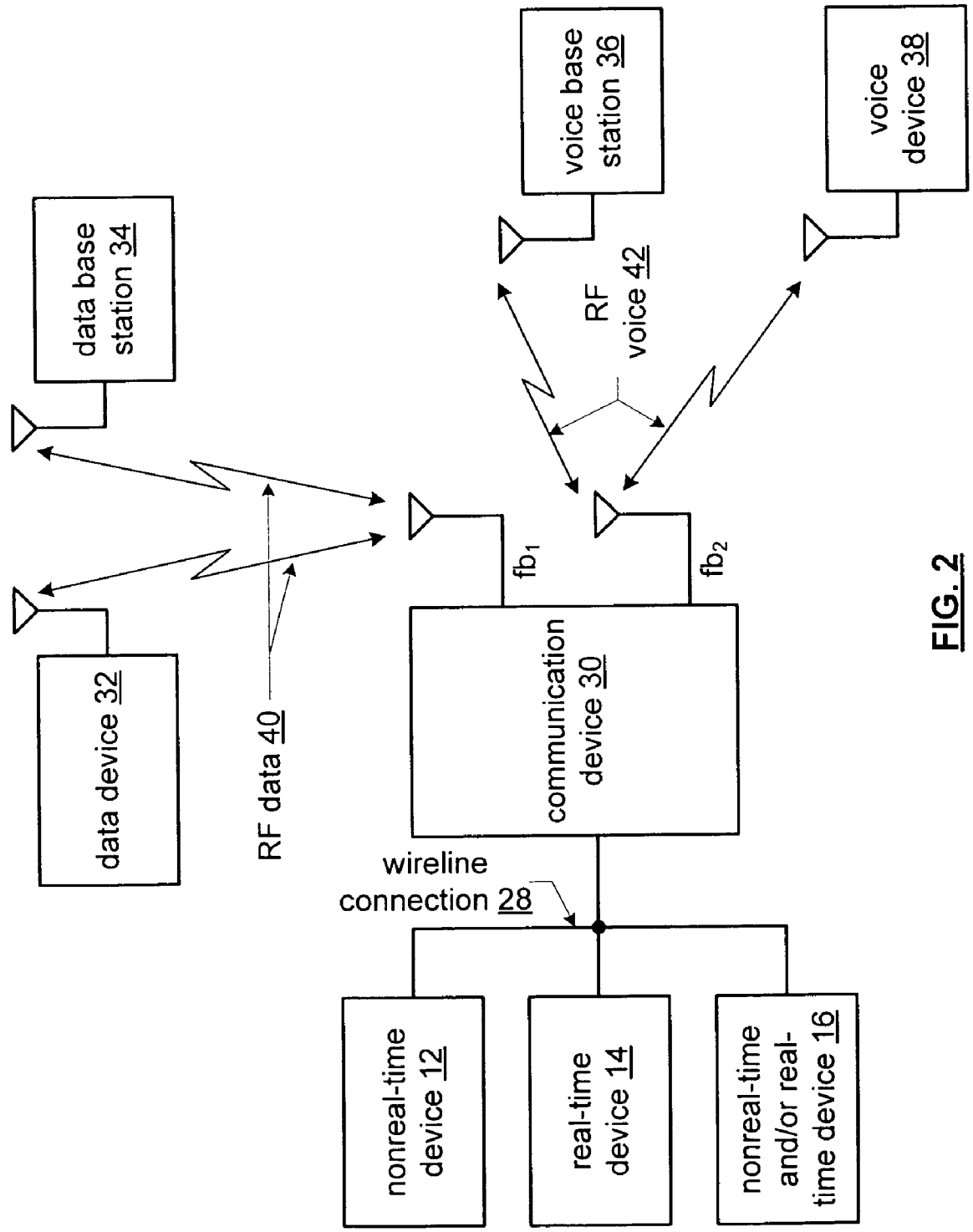
FIG. 2 is a schematic block diagram of another wireless communication environment in accordance with the present invention.

FIG. 2 is a schematic block diagram of another wireless communication environment that includes a communication device 30 communicating with one or more of the wireline non-real-time device 12, the wireline real-time device 14, the wireline non-real-time and/or real-time device 16, a wireless data device 32, a data base station 34, a voice base station 36, and a wireless voice device 38. The communication device 30, which may be a personal computer, laptop computer, personal entertainment device, cellular telephone, personal digital assistant, a game console, a game controller, and/or any other type of device that communicates data and/or voice signals, may be coupled to one or more of the wireline non-real-time device 12, the wireline real-time device 14, and the wireline non-real-time and/or real-time device 16 via the wireless connection 28.

The communication device 30 communicates RF data 40 with the data device 32 and/or the data base station 34 via one or more channels in a first frequency band ($fb_1$) that is designated for wireless communications. For example, the first frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries.

The communication device 30 communicates RF voice 42 with the voice device 38 and/or the voice base station 36 via one or more channels in a second frequency band ($fb_2$) that is designated for wireless communications. For example, the second frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. In a particular example, the first frequency band may be 900 MHz for EDGE data transmissions while the second frequency band may the 1900 MHz and 2100 MHz for WCDMA voice transmissions.

The voice device 38 and the voice base station 36 communicate voice signals that, if interrupted, would result in a noticeable adverse affect (e.g., a disruption in a communication). For example, the voice signals may include, but is not limited to, digitized voice signals, digitized audio data, and/or streaming video data. Note that the voice device 38 may be a personal computer, laptop computer, personal digital assistant, a cellular telephone, a game console, a wireless local area network (WLAN) transceiver, a Bluetooth transceiver, a frequency modulation (FM) tuner, a broadcast television tuner, a digital camcorder, and/or any other device that has a wireless interface for conveying voice signals with another device.

The data device 34 and the data base station 34 communicate data that, if interrupted, would not generally result in a noticeable adverse affect. For example, the data may include, but is not limited to, text messages, still video images, graphics, control data, emails, and/or web browsing. Note that the data device 32 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireless interface for conveying data with another device.

Depending on the devices coupled to the communication unit 30, the communication unit 30 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 3:
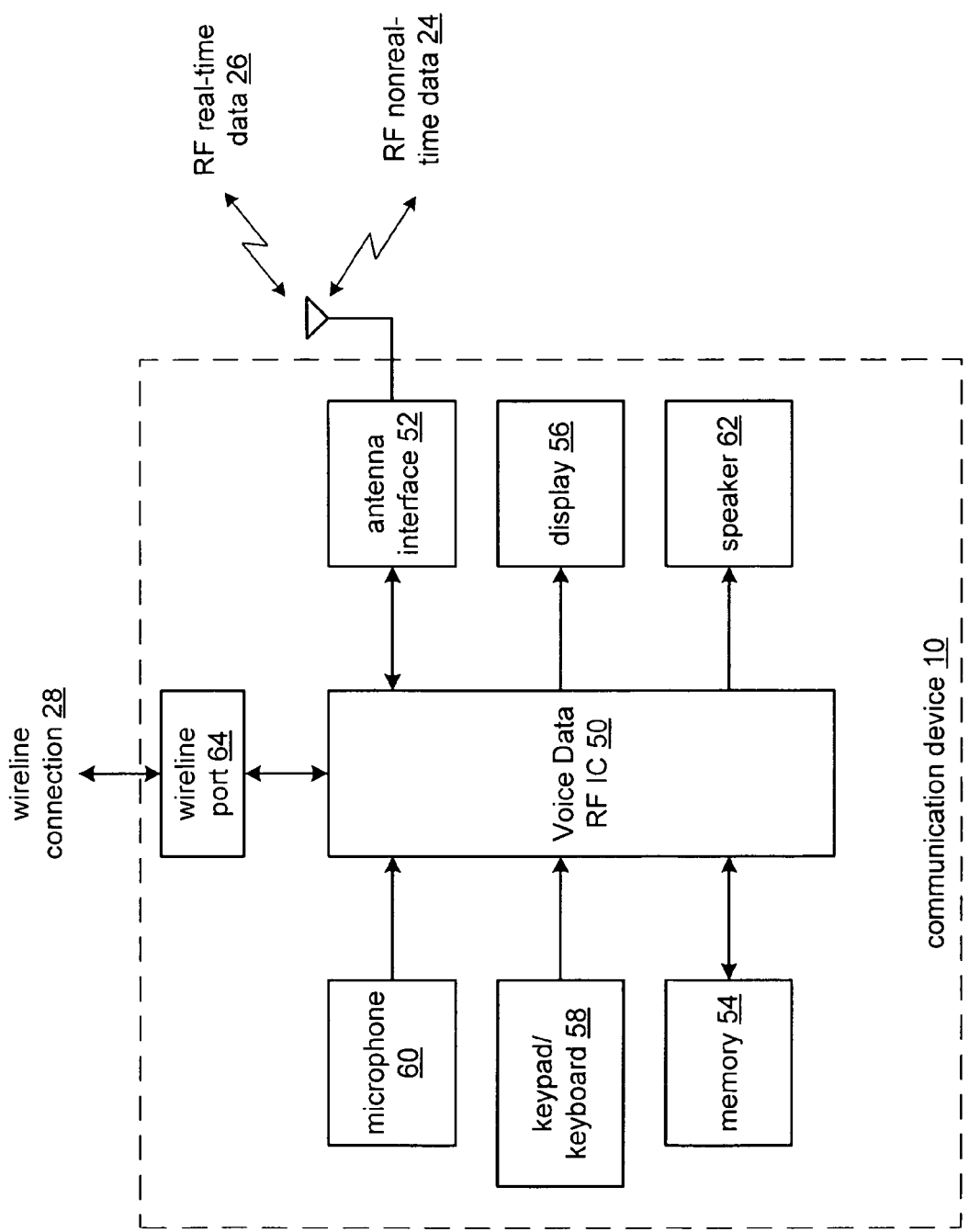
FIG. 3 is a schematic block diagram of an embodiment of a communication device in accordance with the present invention.

FIG. 3 is a schematic block diagram of an embodiment of a communication device 10 that includes a Voice Data RF (radio frequency) IC (integrated circuit) 50, an antenna interface 52, memory 54, a display 56, a keypad and/or key board 58, at least one microphone 60, at least one speaker 62, and a wireline port 64. The memory 54 may be NAND flash, NOR flash, SDRAM, and/or SRAM for storing data and/or instructions to facilitate communications of real-time and non-real-time data via the wireline port 64 and/or via the antenna interface 52. In addition, or in the alternative, the memory 54 may store video files, audio files, and/or image files for subsequent wireline or wireless transmission, for subsequent display, for file transfer, and/or for subsequent editing. Accordingly, when the communication device supports storing, displaying, transferring, and/or editing of audio, video, and/or image files, the memory 54 would further store algorithms to support such storing, displaying, and/or editing. For example, the may include, but is not limited to, file transfer algorithm, video compression algorithm, video decompression algorithm, audio compression algorithm, audio decompression algorithm, image compression algorithm, and/or image decompression algorithm, such as MPEG (motion picture expert group) encoding, MPEG decoding, JPEG (joint picture expert group) encoding, JPEG decoding, MP3 encoding, and MP3 decoding.

For outgoing voice communications, the at least one microphone 60 receives an audible voice signal, amplifies it, and provide the amplified voice signal to the Voice Data RF IC 50. The Voice Data RF IC 50 processes the amplified voice signal into a digitized voice signal using one or more audio processing schemes (e.g., pulse code modulation, audio compression, etc.). The Voice Data RF IC 50 may transmit the digitized voice signal via the wireless port 64 to the wireline real-time device 14 and/or to the wireline non-real-time and/or real-time device 16. In addition to, or in the alternative, the Voice Data RF IC 50 may transmit the digitized voice signal as RF real-time data 26 to the wireless real-time device 22, and/or to the wireless non-real-time and/or real-time device 24 via the antenna interface 52.

For outgoing real-time audio and/or video communications, the Voice Data RF IC 50 retrieves an audio and/or video file from the memory 54. The Voice Data RF IC 50 may decompress the retrieved audio and/or video file into digitized streaming audio and/or video. The Voice Data RF IC 50 may transmit the digitized streaming audio and/or video via the wireless port 64 to the wireline real-time device 14 and/or to the wireline non-real-time and/or real-time device 16. In addition to, or in the alternative, the Voice Data RF IC 50 may transmit the digitized streaming audio and/or video as RF real-time data 26 to the wireless real-time device 22, and/or to the wireless non-real-time and/or real-time device 24 via the antenna interface 52. Note that the Voice Data RF IC 50 may mix a digitized voice signal with a digitized streaming audio and/or video to produce a mixed digitized signal that may be transmitted via the wireline port 64 and/or via the antenna interface 52.

In a playback mode of the communication device 10, the Voice Data RF IC 50 retrieves an audio and/or video file from the memory 54. The Voice Data RF IC 50 may decompress the retrieved audio and/or video file into digitized streaming audio and/or video. The Voice Data RF IC 50 may convert an audio portion of the digitized streaming audio and/or video into analog audio signals that are provided to the at least one speaker 62. In addition, the Voice Data RF IC 50 may convert a video portion of the digitized streaming audio and/or video into analog or digital video signals that are provided to the display 56, which may be a liquid crystal (LCD) display, a plasma display, a digital light project (DLP) display, and/or any other type of portable video display.

For incoming RF voice communications, the antenna interface 52 receives, via an antenna, inbound RF real-time data 26 (e.g., inbound RF voice signals) and provides them to the Voice Data RF IC 50. The Voice Data RF IC 50 processes the inbound RF voice signals into digitized voice signals. The Voice Data RF IC 50 may transmit the digitized voice signals via the wireless port 64 to the wireline real-time device 14 and/or to the wireline non-real-time and/or real-time device 16. In addition to, or in the alternative, the Voice Data RF IC 50 may convert the digitized voice signals into an analog voice signals and provide the analog voice signals to the speaker 62.

The Voice Data RF IC 50 may receive digitized voice-audio-&/or-video signals from the wireline connection 28 via the wireless port 64 or may receive RF signals via the antenna interface 52, where the Voice Data RF IC 50 recovers the digitized voice-audio-&/or-video signals from the RF signals. The Voice Data RF IC 50 may then compress the received digitized voice-audio-&/or-video signals to produce voice-audio-&/or-video files and store the files in memory 54. In the alternative, or in addition to, the Voice Data RF IC 50 may convert the digitized voice-audio-&/or-video signals into analog voice-audio-&/or-video signals and provide them to the speaker 62 and/or display.

For outgoing non-real-time data communications, the keypad/keyboard 58 (which may be a keypad, keyboard, touch screen, voice activated data input, and/or any other mechanism for inputted data) provides inputted data (e.g., emails, text messages, web browsing commands, etc.) to the Voice Data RF IC 50. The Voice Data RF IC 50 converts the inputted data into a data symbol stream using one or more data modulation schemes (e.g., QPSK, 8-PSK, etc.). The Voice Data RF IC 50 converts the data symbol stream into RF non-real-time data signals 24 that are provided to the antenna interface 52 for subsequent transmission via the antenna. In addition to, or in the alternative, the Voice Data RF IC 50 may provide the inputted data to the display 56. As another alternative, the Voice Data RF IC 50 may provide the inputted data to the wireline port 64 for transmission to the wireline non-real-time data device 12 and/or the non-real-time and/or real-time device 16.

For incoming non-real-time communications (e.g., text messaging, image transfer, emails, web browsing), the antenna interface 52 receives, via an antenna, inbound RF non-real-time data signals 24 (e.g., inbound RF data signals) and provides them to the Voice Data RF IC 50. The Voice Data RF IC 50 processes the inbound RF data signals into data signals. The Voice Data RF IC 50 may transmit the data signals via the wireless port 64 to the wireline non-real-time device 12 and/or to the wireline non-real-time and/or real-time device 16. In addition to, or in the alternative, the Voice Data RF IC 50 may convert the data signals into analog data signals and provide the analog data signals to an analog input of the display 56 or the Voice Data RF IC 50 may provide the data signals to a digital input of the display 56.

Figure 4:
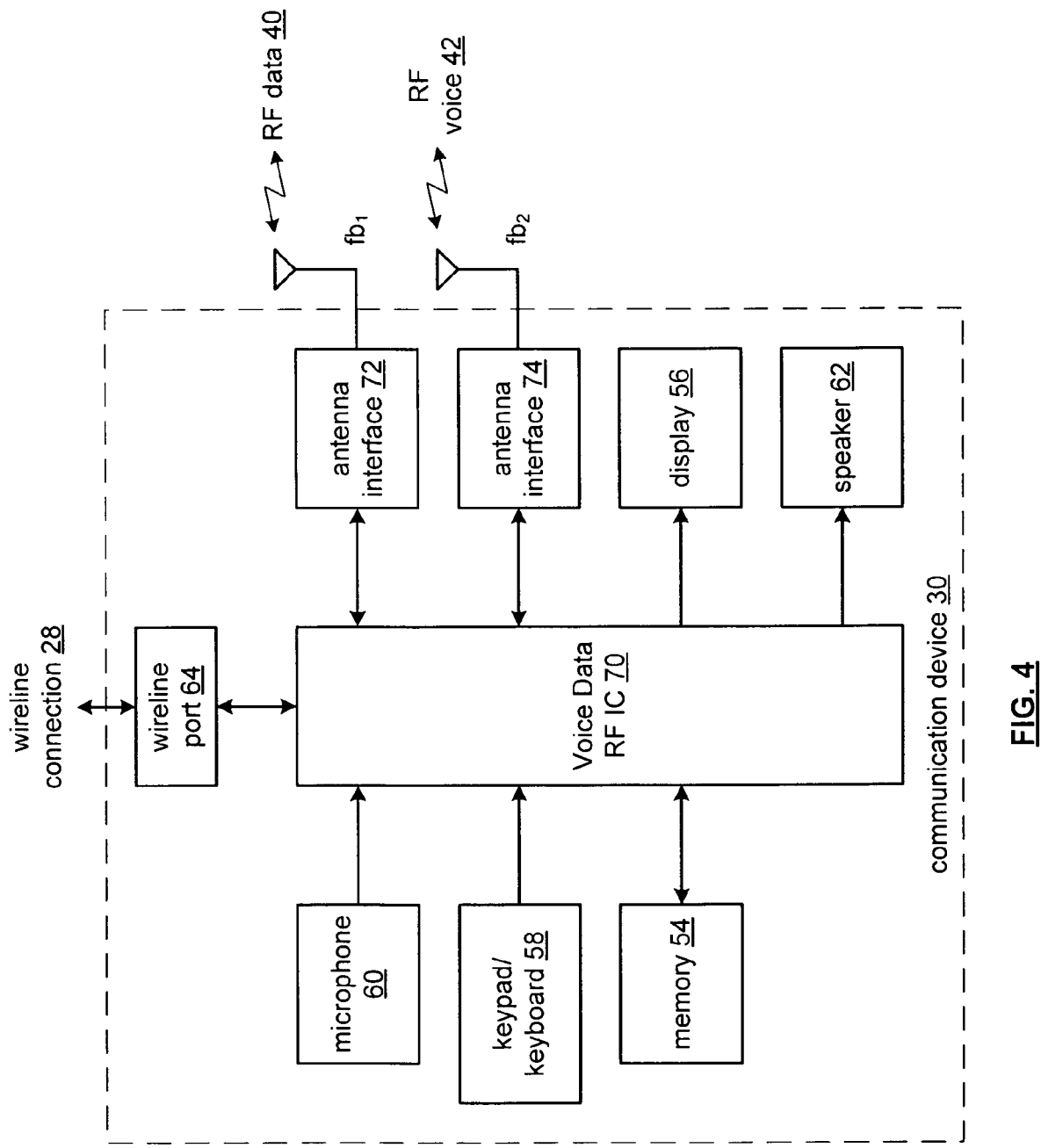
FIG. 4 is a schematic block diagram of another embodiment of a communication device in accordance with the present invention.

FIG. 4 is a schematic block diagram of another embodiment of a communication device 30 10 that includes a Voice Data RF (radio frequency) IC (integrated circuit) 70, a first antenna interface 72, a second antenna interface 74, memory 54, the display 56, the keypad and/or key board 58, the at least one microphone 60, the at least one speaker 62, and the wireline port 64. The memory 54 may be NAND flash, NOR flash, SDRAM, and/or SRAM for storing data and/or instructions to facilitate communications of real-time and non-real-time data via the wireline port 64 and/or via the antenna interfaces 72 and/or 74. In addition, or in the alternative, the memory 54 may store video files, audio files, and/or image files for subsequent wireline or wireless transmission, for subsequent display, for file transfer, and/or for subsequent editing. Accordingly, when the communication device 30 supports storing, displaying, transferring, and/or editing of audio, video, and/or image files, the memory 54 would further store algorithms to support such storing, displaying, and/or editing. For example, the may include, but is not limited to, file transfer algorithm, video compression algorithm, video decompression algorithm, audio compression algorithm, audio decompression algorithm, image compression algorithm, and/or image decompression algorithm, such as MPEG (motion picture expert group) encoding, MPEG decoding, JPEG (joint picture expert group) encoding, JPEG decoding, MP3 encoding, and MP3 decoding.

For outgoing voice communications, the at least one microphone 60 receives an audible voice signal, amplifies it, and provide the amplified voice signal to the Voice Data RF IC 70. The Voice Data RF IC 70 processes the amplified voice signal into a digitized voice signal using one or more audio processing schemes (e.g., pulse code modulation, audio compression, etc.). The Voice Data RF IC 70 may transmit the digitized voice signal via the wireless port 64 to the wireline real-time device 14 and/or to the wireline non-real-time and/or real-time device 16. In addition to, or in the alternative, the Voice Data RF IC 70 may transmit the digitized voice signal as RF real-time data 26 to the wireless real-time device 22, and/or to the wireless non-real-time and/or real-time device 24 via the antenna interface 72 using a first frequency band ($fb_1$).

For outgoing real-time audio and/or video communications, the Voice Data RF IC 70 retrieves an audio and/or video file from the memory 54. The Voice Data RF IC 70 may decompress the retrieved audio and/or video file into digitized streaming audio and/or video. The Voice Data RF IC 70 may transmit the digitized streaming audio and/or video via the wireless port 64 to the wireline real-time device 14 and/or to the wireline non-real-time and/or real-time device 16. In addition to, or in the alternative, the Voice Data RF IC 70 may transmit the digitized streaming audio and/or video as RF real-time data 26 to the wireless real-time device 22, and/or to the wireless non-real-time and/or real-time device 24 via the antenna interface 72 using the first frequency band ($fb_1$). Note that the Voice Data RF IC 70 may mix a digitized voice signal with a digitized streaming audio and/or video to produce a mixed digitized signal that may be transmitted via the wireline port 64 and/or via the antenna interface 72.

In a playback mode of the communication device 10, the Voice Data RF IC 70 retrieves an audio and/or video file from the memory 54. The Voice Data RF IC 70 may decompress the retrieved audio and/or video file into digitized streaming audio and/or video. The Voice Data RF IC 70 may convert an audio portion of the digitized streaming audio and/or video into analog audio signals that are provided to the at least one speaker 62. In addition, the Voice Data RF IC 70 may convert a video portion of the digitized streaming audio and/or video into analog or digital video signals that are provided to the display 56, which may be a liquid crystal (LCD) display, a plasma display, a digital light project (DLP) display, and/or any other type of portable video display.

For incoming RF voice communications, the antenna interface 72 receives, via an antenna within the first frequency band, inbound RF real-time data 26 (e.g., inbound RF voice signals) and provides them to the Voice Data RF IC 70. The Voice Data RF IC 70 processes the inbound RF voice signals into digitized voice signals. The Voice Data RF IC 70 may transmit the digitized voice signals via the wireless port 64 to the wireline real-time device 14 and/or to the wireline non-real-time and/or real-time device 16. In addition to, or in the alternative, the Voice Data RF IC 70 may convert the digitized voice signals into an analog voice signals and provide the analog voice signals to the speaker 62.

The Voice Data RF IC 70 may receive digitized voice-audio-&/or-video signals from the wireline connection 28 via the wireless port 64 or may receive RF signals via the antenna interface 72, where the Voice Data RF IC 70 recovers the digitized voice-audio-&/or -video signals from the RF signals. The Voice Data RF IC 70 may then compress the received digitized voice-audio-&/or-video signals to produce voice-audio-&/or-video files and store the files in memory 54. In the alternative, or in addition to, the Voice Data RF IC 70 may convert the digitized voice-audio-&/or-video signals into analog voice-audio-&/or-video signals and provide them to the speaker 62 and/or display.

For outgoing non-real-time data communications, the keypad/keyboard 58 provides inputted data (e.g., emails, text messages, web browsing commands, etc.) to the Voice Data RF IC 70. The Voice Data RF IC 70 converts the inputted data into a data symbol stream using one or more data modulation schemes (e.g., QPSK, 8-PSK, etc.). The Voice Data RF IC 70 converts the data symbol stream into RF non-real-time data signals 24 that are provided to the antenna interface 74 for subsequent transmission via an antenna in a second frequency band ($fb_2$). In addition to, or in the alternative, the Voice Data RF IC 70 may provide the inputted data to the display 56. As another alternative, the Voice Data RF IC 70 may provide the inputted data to the wireline port 64 for transmission to the wireline non-real-time data device 12 and/or the non-real-time and/or real-time device 16.

For incoming non-real-time communications (e.g., text messaging, image transfer, emails, web browsing), the antenna interface 74 receives, via an antenna within the second frequency band, inbound RF non-real-time data signals 24 (e.g., inbound RF data signals) and provides them to the Voice Data RF IC 70. The Voice Data RF IC 70 processes the inbound RF data signals into data signals. The Voice Data RF IC 70 may transmit the data signals via the wireless port 64 to the wireline non-real-time device 12 and/or to the wireline non-real-time and/or real-time device 16. In addition to, or in the alternative, the Voice Data RF IC 70 may convert the data signals into analog data signals and provide the analog data signals to an analog input of the display 56 or the Voice Data RF IC 70 may provide the data signals to a digital input of the display 56.

Figure 5:
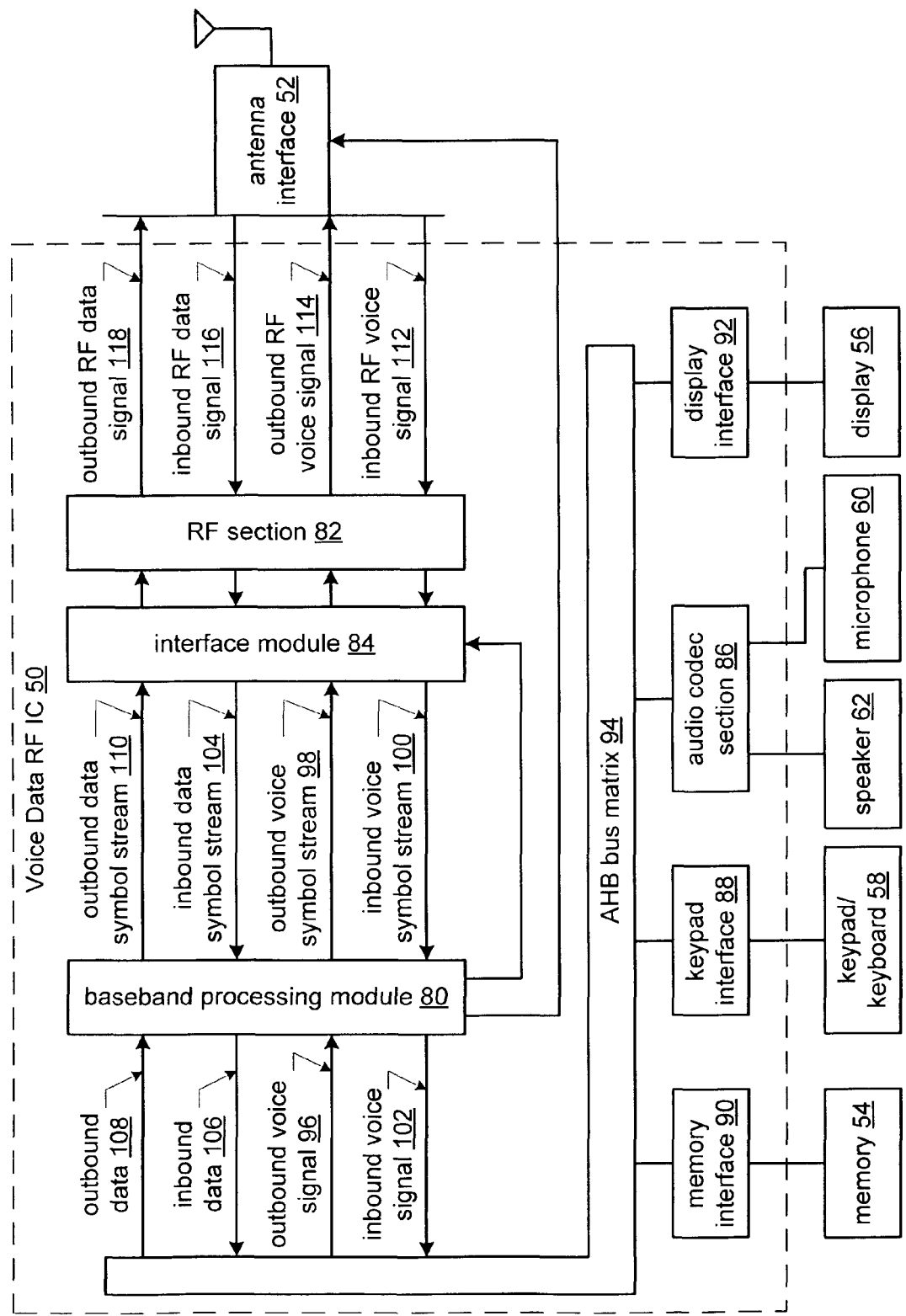
FIG. 5 is a schematic block diagram of another embodiment of a communication device in accordance with the present invention.

FIG. 5 is a schematic block diagram of another embodiment of a communication device 10 that includes the Voice Data RF IC 50, the antenna interface 52, the memory 54, the keypad/keyboard 58, the at least one speaker 62, the at least one microphone 60, and the display 56. The Voice Data RF IC 50 includes a baseband processing module 80, a radio frequency (RF) section 82, an interface module 84, an audio codec 86, a keypad interface 88, a memory interface 90, a display interface 92, and an advanced high-performance (AHB) bus matrix 94. The baseband processing module 80 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 80 may have an associated memory and/or memory element, which may be a single memory device, a plurality of memory devices, and/or embedded circuitry of the processing module 80. Such a memory device may be a read-only memory, random access memory, volatile memory, non-volatile memory, static memory, dynamic memory, flash memory, cache memory, and/or any device that stores digital information. Note that when the processing module 80 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 80 executes, hard coded and/or operational instructions corresponding to at least some of the steps and/or functions illustrated in FIGS. 5-42.

The baseband processing module 80 converts an outbound voice signal 96 into an outbound voice symbol stream 98 in accordance with one or more existing wireless communication standards, new wireless communication standards, modifications thereof, and/or extensions thereof (e.g., GSM, AMPS, digital AMPS, CDMA, etc.). The baseband processing module 80 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal 96 into the outbound voice symbol stream 98. Depending on the desired formatting of the outbound voice symbol stream 98, the baseband processing module 80 may generate the outbound voice symbol stream 98 as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in entitled HYBRID RADIO FREQUENCY TRANSMITTER, having a filing date of Mar. 24, 2006, and an application Ser. No. 11/388,822, and entitled PROGRAMMABLE HYBRID TRANSMITTER, having a filing date of Jul. 26, 2006, and an application Ser. No. 11/494,682.

The interface module 84 conveys the outbound voice symbol stream 98 to the RF section 82 when the Voice Data RF IC 50 is in a voice mode. The voice mode may be activated by the user of the communication device 10 by initiating a cellular telephone call, by receiving a cellular telephone call, by initiating a walkie-talkie type call, by receiving a walkie-talkie type call, by initiating a voice record function, and/or by another voice activation selection mechanism.

The RF section 82 converts the outbound voice symbol stream 98 into an outbound RF voice signal 114 in accordance with the one or more existing wireless communication standards, new wireless communication standards, modifications thereof, and/or extensions thereof (e.g., GSM, AMPS, digital AMPS, CDMA, etc.). In one embodiment, the RF section 82 receives the outbound voice symbol stream 98 as Cartesian coordinates. In this embodiment, the RF section 82 mixes the in-phase components of the outbound voice symbol stream 98 with an in-phase local oscillation to produce a first mixed signal and mixes the quadrature components of the outbound voice symbol stream 98 to produce a second mixed signal. The RF section 82 combines the first and second mixed signals to produce an up-converted voice signal. The RF section 82 then amplifies the up-converted voice signal to produce the outbound RF voice signal 114, which it provides to the antenna interface 52. Note that further power amplification may occur between the output of the RF section 82 and the input of the antenna interface 52.

In other embodiments, the RF section 82 receives the outbound voice symbol stream 98 as Polar or hybrid coordinates. In these embodiments, the RF section 82 modulates a local oscillator based on phase information of the outbound voice symbol stream 98 to produce a phase modulated RF signal. The RF section 82 then amplifies the phase modulated RF signal in accordance with amplitude information of the outbound voice symbol stream 98 to produce the outbound RF voice signal 114. Alternatively, the RF section 82 may amplify the phase modulated RF signal in accordance with a power level setting to produce the outbound RF voice signal 114.

For incoming voice signals, the RF section 82 receives an inbound RF voice signal 112 via the antenna interface 52. The RF section 82 converts the inbound RF voice signal 112 into an inbound voice symbol stream 100. In one embodiment, the RF section 82 extracts Cartesian coordinates from the inbound RF voice signal 112 to produce the inbound voice symbol stream 100. In another embodiment, the RF section 82 extracts Polar coordinates from the inbound RF voice signal 112 to produce the inbound voice symbol stream 100. In yet another embodiment, the RF section 82 extracts hybrid coordinates from the inbound RF voice signal 112 to produce the inbound voice symbol stream 100. The interface module 84 provides the inbound voice symbol stream 100 to the baseband processing module 80 when the Voice Data RF IC 50 is in the voice mode.

The baseband processing module 80 converts the inbound voice symbol stream 100 into an inbound voice signal 102.

The baseband processing module 80 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream 100 into the inbound voice signal 102, which is placed on the AHB bus matrix 94.

In one embodiment, the outbound voice signal 96 is received from the audio codec section 86 via the AHB bus 94. The audio codec section 86 is coupled to the at least one microphone 60 to receive an analog voice input signal therefrom. The audio codec section 86 converts the analog voice input signal into a digitized voice signal that is provided to the baseband processing module 80 as the outbound voice signal 96. The audio codec section 86 may perform an analog to digital conversion to produce the digitized voice signal from the analog voice input signal, may perform pulse code modulation (PCM) to produce the digitized voice signal, and/or may compress a digital representation of the analog voice input signal to produce the digitized voice signal.

The audio codec section 86 is also coupled to the at least one speaker 62. In one embodiment the audio codec section 86 processes the inbound voice signal 102 to produce an analog inbound voice signal that is subsequently provided to the at least one speaker 62. The audio codec section 86 may process the inbound voice signal 102 by performing a digital to analog conversion, by PCM decoding, and/or by decompressing the inbound voice signal 102.

For an outgoing data communication (e.g., email, text message, web browsing, and/or non-real-time data), the baseband processing module 80 receives outbound data 108 from the keypad interface 88 and/or the memory interface 90. The baseband processing module 80 converts outbound data 108 into an outbound data symbol stream 110 in accordance with one or more existing wireless communication standards, new wireless communication standards, modifications thereof, and/or extensions thereof (e.g., EDGE, GPRS, etc.). The baseband processing module 80 may perform one or more of scrambling, encoding, constellation mapping, modulation, frequency spreading, frequency hopping, beamforming, space-time-block encoding, space-frequency-block encoding, and/or digital baseband to IF conversion to convert the outbound data 108 into the outbound data symbol stream 110. Depending on the desired formatting of the outbound data symbol stream 110, the baseband processing module 80 may generate the outbound data symbol stream 110 as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in co-pending patent application entitled HYBRID RADIO FREQUENCY TRANSMITTER, having a filing date of Mar. 24, 2006, and an application Ser. No. 11/388,822, and co-pending patent application entitled PROGRAMMABLE HYBRID TRANSMITTER, having a filing date of Jul. 26, 2006, and an application Ser. No. 11/494,682. In addition to, or in the alternative of, the outbound data 108 may be provided to the display interface 92 such that the outbound data 108, or a representation thereof, may be displayed on the display 56.

The interface module 84 conveys the outbound data symbol stream 110 to the RF section 82 when the Voice Data RF IC 50 is in a data mode. The data mode may be activated by the user of the communication device 10 by initiating a text message, by receiving a text message, by initiating a web browser function, by receiving a web browser response, by initiating a data file transfer, and/or by another data activation selection mechanism.

The RF section 82 converts the outbound data symbol stream 110 into an outbound RF data signal 118 in accordance with the one or more existing wireless communication standards, new wireless communication standards, modifications thereof, and/or extensions thereof (e.g., EDGE, GPRS, etc.). In one embodiment, the RF section 82 receives the outbound data symbol stream 110 as Cartesian coordinates. In this embodiment, the RF section 82 mixes the in-phase components of the outbound data symbol stream 110 with an in-phase local oscillation to produce a first mixed signal and mixes the quadrature components of the outbound data symbol stream 110 to produce a second mixed signal. The RF section 82 combines the first and second mixed signals to produce an up-converted data signal. The RF section 82 then amplifies the up-converted data signal to produce the outbound RF data signal 118, which it provides to the antenna interface 52. Note that further power amplification may occur between the output of the RF section 82 and the input of the antenna interface 52.

In other embodiments, the RF section 82 receives the outbound data symbol stream 110 as Polar or hybrid coordinates. In these embodiments, the RF section 82 modulates a local oscillator based on phase information of the outbound data symbol stream 110 to produce a phase modulated RF signal. The RF section 82 then amplifies the phase modulated RF signal in accordance with amplitude information of the outbound data symbol stream 110 to produce the outbound RF data signal 118. Alternatively, the RF section 82 may amplify the phase modulated RF signal in accordance with a power level setting to produce the outbound RF data signal 118.

For incoming data communications, the RF section 82 receives an inbound RF data signal 116 via the antenna interface 52. The RF section 82 converts the inbound RF data signal 116 into an inbound data symbol stream 104. In one embodiment, the RF section 82 extracts Cartesian coordinates from the inbound RF data signal 116 to produce the inbound data symbol stream 104. In another embodiment, the RF section 82 extracts Polar coordinates from the inbound RF data signal 116 to produce the inbound data symbol stream 104. In yet another embodiment, the RF section 82 extracts hybrid coordinates from the inbound RF data signal 116 to produce the inbound data symbol stream 104. The interface module 84 provides the inbound data symbol stream 104 to the baseband processing module 80 when the Voice Data RF IC 50 is in the data mode.

The baseband processing module 80 converts the inbound data symbol stream 104 into inbound data 106. The baseband processing module 80 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound data symbol stream 104 into the inbound data 106, which is placed on the AHB bus matrix 94.

In one embodiment, the display interface 92 retrieves the inbound data 106 from the AHB bus matrix 94 and provides it, or a representation thereof, to the display 56. In another embodiment, the memory interface 90 retrieves the inbound data 106 from the AHG bus matrix 94 and provides it to the memory 54 for storage therein.

Figure 6:
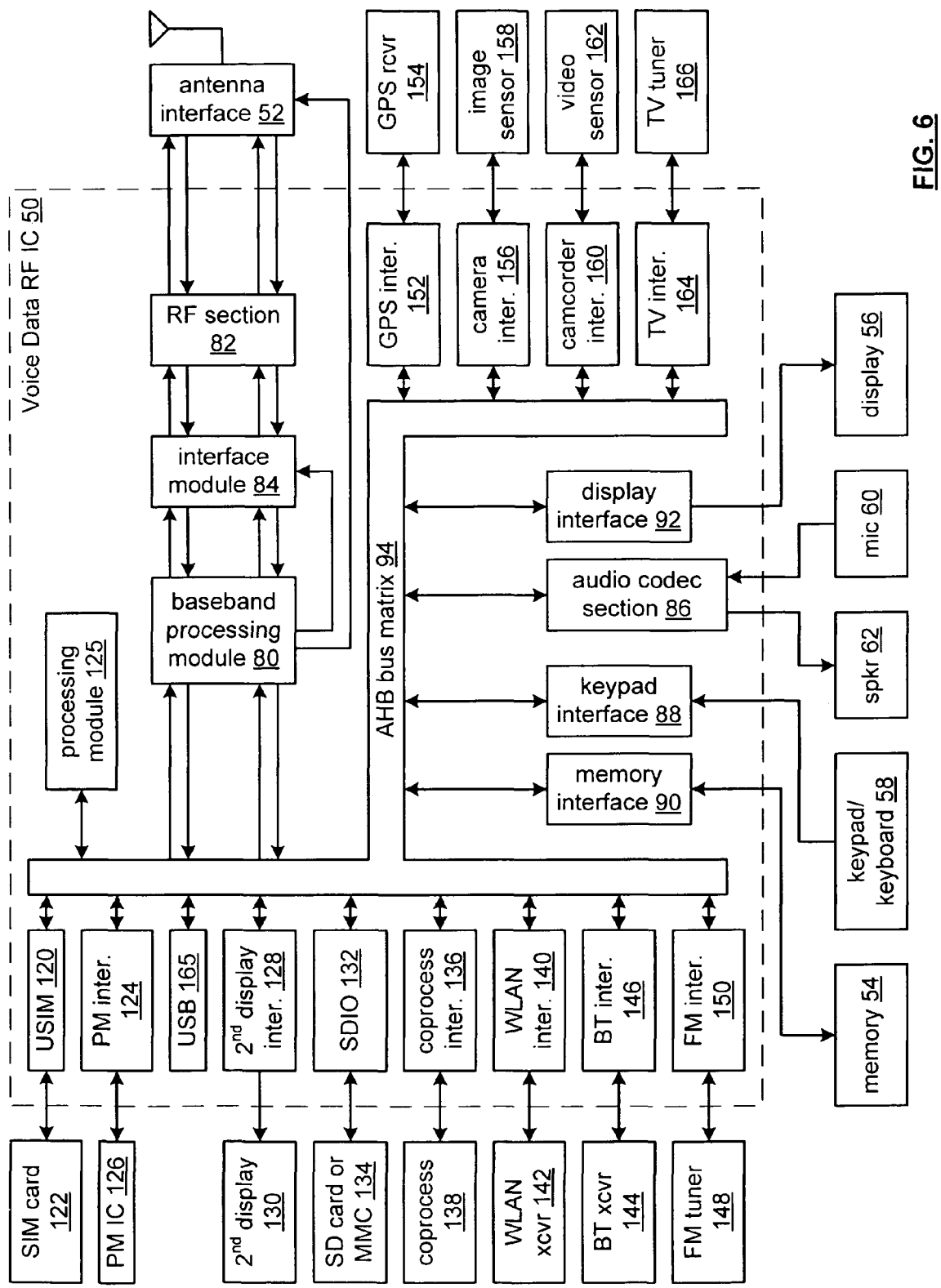
FIG. 6 is a schematic block diagram of another embodiment of a communication device in accordance with the present invention.

FIG. 6 is a schematic block diagram of another embodiment of a communication device 10 that includes the Voice Data RF IC 50, the antenna interface 52, the memory 54, the keypad/keyboard 58, the at least one speaker 62, the at least one microphone 60, the display 56, and at least one of: a SIM (Security Identification Module) card 122, a power management (PM) IC 126, a second display 130, a SD (Secure Digital) card or MMC (Multi Media Card) 134, a coprocessor IC 138, a WLAN transceiver 142, a Bluetooth (BT) transceiver 144, an FM tuner 148, a GPS receiver 154, an image sensor 158 (e.g., a digital camera), a video sensor 162 (e.g., a camcorder), and a TV tuner 166. The Voice Data RF IC 50 includes the baseband processing module 80, the RF section 82, the interface module 84, the audio codec 86, the keypad interface 88, the memory interface 90, the display interface 92, the advanced high-performance (AHB) bus matrix 94, a processing module 125, and one or more of: a universal subscriber identity module (USIM) interface 120, power management (PM) interface 124, a second display interface 126, a secure digital input/output (SDIO) interface 132, a coprocessor interface 136, a WLAN interface 140, a Bluetooth interface 146, an FM interface 150, a GPS interface 152, a camera interface 156, a camcorder interface 160, a TV interface 164, and a Universal Serial Bus (USB) interface 165. While not shown in the present figure, the Voice Data RF IC 50 may further included one or more of a Universal Asynchronous Receiver-Transmitter (UART) interface coupled to the AHB bus matrix 94, a Serial Peripheral Interface (SPI) interface coupled to the AHB bus matrix 94, an I2S interface coupled to the AHB bus matrix 94, and a pulse code modulation (PCM) interface coupled to the AHB bus matrix 94.

The processing module 125 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 125 may have an associated memory and/or memory element, which may be a single memory device, a plurality of memory devices, and/or embedded circuitry of the processing module 125. Such a memory device may be a read-only memory, random access memory, volatile memory, non-volatile memory, static memory, dynamic memory, flash memory, cache memory, and/or any device that stores digital information. Note that when the processing module 125 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 125 executes, hard coded and/or operational instructions corresponding to at least some of the steps and/or functions illustrated in FIGS. 5-42.

In this embodiment, the Voice Data RF IC 50 includes one or more of a plurality of interfaces that enable the communication device 10 to include one or more of a plurality of additional circuits. For example, the communication device 10 may be a cellular telephone that provides voice, data, and at least one other service via the Voice Data RF IC 50, which, in this instance, is a cellular telephone IC. An example of another service includes WLAN access via a WLAN transceiver to support voice over IP communications, internet access, etc. Another service example includes Bluetooth access via a Bluetooth transceiver to support a Bluetooth wireless headset, file transfers, and other piconet services.

For wireline connectivity to another device, the Voice Data RF IC 50 may include a USB interface 165, an SPI interface, and I2S interface, and/or another other type of wired interface. In this instance, file transfers are easily supported by the wireline connectivity and can be managed by the processing module 125. Further, video games may be downloaded to the communication device 10 via the wireline connectivity and subsequently played as administered by the processing module 125. Alternatively, the wireline connectivity provides coupling to a game console such that the communication device 10 acts as the display and/or controller of the video game.

With the various interface options of the Voice Data RF IC 50, the communication device 10 may function as a personal entertainment device to playback audio files, video files, image files, to record images, to record video, to record audio, to watch television, to track location, to listen to broadcast FM radio, etc. Such personal entertainment functions would be administered primarily by the processing module 125.

With the inclusion of one or more display interfaces 92 and 128, the communication device may include multiple displays 56 and 130. The displays 56 and 130 may be a liquid crystal (LCD) display, a plasma display, a digital light project (DLP) display, and/or any other type of portable video display. Note that the display interfaces 92 and 128 may be an LCD interface, a mobile industry processor interface (MIPI), and/or other type of interface for supporting the particular display 56 or 130.

The Voice Data RF IC 50 includes security interface options to protect the data stored in the communication device and/or to insure use of the communication device is by an authorized user. For example, the Voice Data RF IC 50 may include the USIM interface 120 and/or the SDIO interface 132 for interfacing with a SIM card, a Secure Data card and/or a multi media card.

Of the various interfaces that may be included on the Voice Data RF IC 50, I2S is an industry standard 3-wire interface for streaming stereo audio between devices and the PCM interface is a serial interface used to transfer speech data. Of the external components of the communication device 10 with respect to the IC 50, a Secure Digital (SD) is a flash memory (non-volatile) memory card format used in portable devices, including digital cameras and handheld computers. SD cards are based on the older Multi-Media-Card (MMC) format, but most are physically slightly thicker than MMC cards. A (SIM) card that stores user subscriber information, authentication information and provides storage space for text messages and USIM stores a long-term preshared secret key K, which is shared with the Authentication Center (AuC) in the network. The USIM also verifies a sequence number that must be within a range using a window mechanism to avoid replay attacks, and is in charge of generating the session keys CK and IK to be used in the confidentiality and integrity algorithms of the KASUMI block cipher in UMTS.

Figure 7:
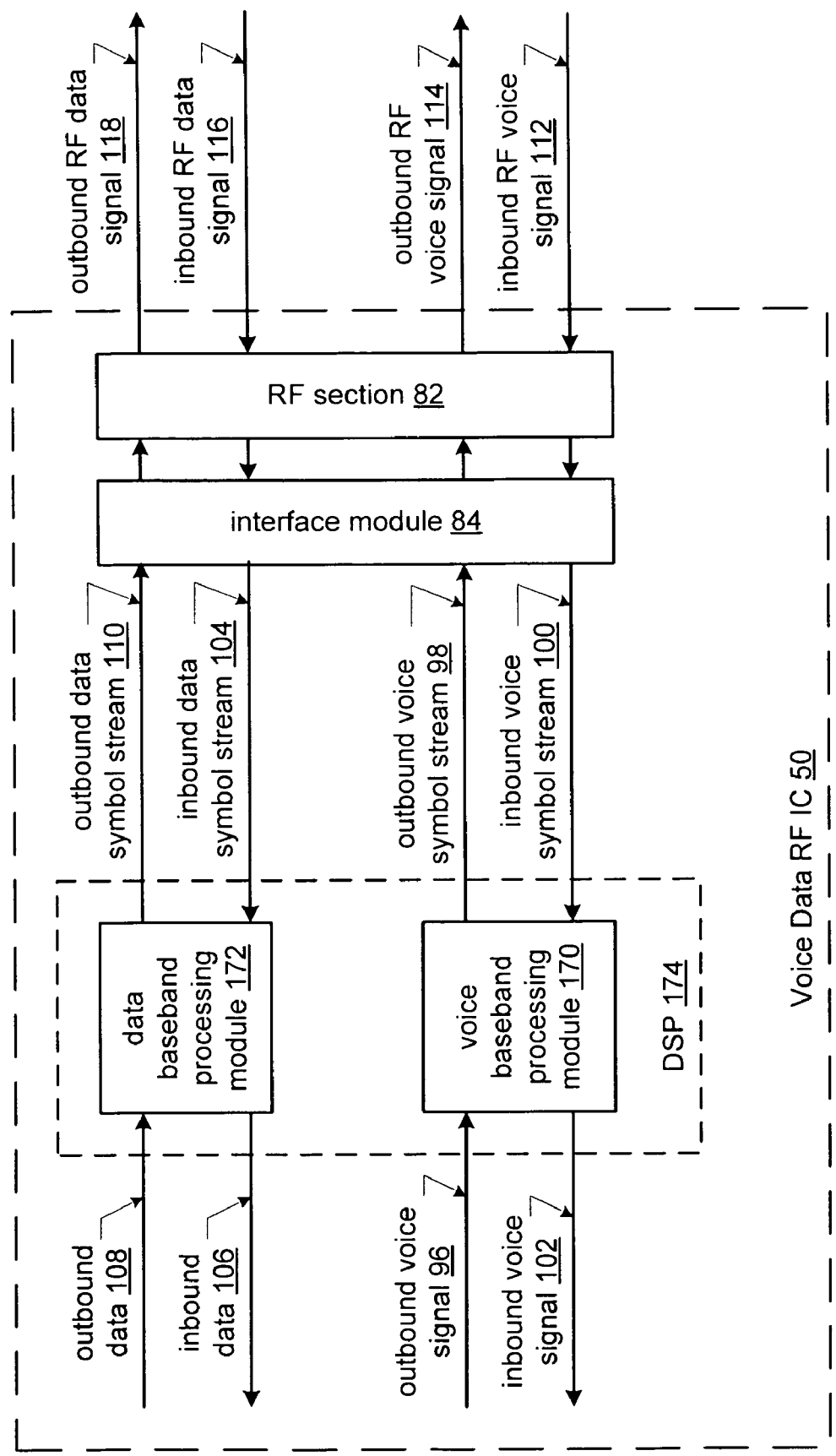
FIG. 7 is a schematic block diagram of an embodiment of a Voice Data RF IC in accordance with the present invention.

FIG. 7 is a schematic block diagram of an embodiment of a Voice Data RF IC 50 that includes a digital signal processor (DSP) 174, the interface module 84, and the RF section 82. The DSP 174 may be programmed to include a voice baseband processing module 170 and a data baseband processing module 172.

The voice baseband processing module 170 converts an outbound voice signal 96 into an outbound voice symbol stream 98 in accordance with one or more existing wireless communication standards, new wireless communication standards, modifications thereof, and/or extensions thereof (e.g., GSM, AMPS, digital AMPS, CDMA, etc.). The voice baseband processing module 170 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal 96 into the outbound voice symbol stream 98. Depending on the desired formatting of the outbound voice symbol stream 98, the voice baseband processing module 170 may generate the outbound voice symbol stream 98 as Cartesian coordinates (e.g., having an in-phase signal component and a quadrature signal component to represent a symbol), as Polar or hybrid coordinates (e.g., having a phase component and an amplitude component to represent a symbol). The interface module 84 conveys the outbound voice symbol stream 98 to the RF section 82 when the Voice Data RF IC 50 is in a voice mode.

The RF section 82 converts the outbound voice symbol stream 98 into an outbound RF voice signal 114 in accordance with the one or more existing wireless communication standards, new wireless communication standards, modifications thereof, and/or extensions thereof (e.g., GSM, AMPS, digital AMPS, CDMA, etc.). In one embodiment, the RF section 82 receives the outbound voice symbol stream 98 as Cartesian coordinates. In this embodiment, the RF section 82 mixes the in-phase components of the outbound voice symbol stream 98 with an in-phase local oscillation to produce a first mixed signal and mixes the quadrature components of the outbound voice symbol stream 98 to produce a second mixed signal. The RF section 82 combines the first and second mixed signals to produce an up-converted voice signal. The RF section 82 then amplifies the up-converted voice signal to produce the outbound RF voice signal 114, which it provides to the antenna interface 52. Note that further power amplification may occur between the output of the RF section 82 and the input of the antenna interface 52.

In other embodiments, the RF section 82 receives the outbound voice symbol stream 98 as Polar or hybrid coordinates. In these embodiments, the RF section 82 modulates a local oscillator based on phase information of the outbound voice symbol stream 98 to produce a phase modulated RF signal. The RF section 82 then amplifies the phase modulated RF signal in accordance with amplitude information of the outbound voice symbol stream 98 to produce the outbound RF voice signal 114. Alternatively, the RF section 82 may amplify the phase modulated RF signal in accordance with a power level setting to produce the outbound RF voice signal 114.

For incoming voice signals, the RF section 82 converts the inbound RF voice signal 112 into an inbound voice symbol stream 100. In one embodiment, the RF section 82 extracts Cartesian coordinates from the inbound RF voice signal 112 to produce the inbound voice symbol stream 100. In another embodiment, the RF section 82 extracts Polar coordinates from the inbound RF voice signal 112 to produce the inbound voice symbol stream 100. In yet another embodiment, the RF section 82 extracts hybrid coordinates from the inbound RF voice signal 112 to produce the inbound voice symbol stream 100. The interface module 84 provides the inbound voice symbol stream 100 to the voice baseband processing module 170 when the Voice Data RF IC 50 is in the voice mode.

The voice baseband processing module 170 converts the inbound voice symbol stream 100 into an inbound voice signal 102. The voice baseband processing module 170 may perform one or more of descrambling, decoding, constellation demapping, modulation, frequency spreading decoding, frequency hopping decoding, beamforming decoding, space-time-block decoding, space-frequency-block decoding, and/ or IF to digital baseband conversion to convert the inbound voice symbol stream 100 into the inbound voice signal 102.

For an outgoing data communication (e.g., email, text message, web browsing, and/or non-real-time data), the data baseband processing module 172 converts outbound data 108 into an outbound data symbol stream 110 in accordance with one or more existing wireless communication standards, new wireless communication standards, modifications thereof, and/or extensions thereof (e.g., EDGE, GPRS, etc.). The data baseband processing module 172 may perform one or more of scrambling, encoding, constellation mapping, modulation, frequency spreading, frequency hopping, beamforming, space-time-block encoding, space-frequency-block encoding, and/or digital baseband to IF conversion to convert the outbound data 108 into the outbound data symbol stream 110. Depending on the desired formatting of the outbound data symbol stream 110, the data baseband processing module 172 may generate the outbound data symbol stream 110 as Cartesian coordinates, as Polar coordinates, or as hybrid coordinates.

The interface module 84 conveys the outbound data symbol stream 110 to the RF section 82 when the Voice Data RF IC 50 is in a data mode. The data mode may be activated by the user of the communication device 10 by initiating a text message, by receiving a text message, by initiating a web browser function, by receiving a web browser response, by initiating a data file transfer, and/or by another data activation selection mechanism.

The RF section 82 converts the outbound data symbol stream 110 into an outbound RF data signal 118 in accordance with the one or more existing wireless communication standards, new wireless communication standards, modifications thereof, and/or extensions thereof (e.g., EDGE, GPRS, etc.). In one embodiment, the RF section 82 receives the outbound data symbol stream 110 as Cartesian coordinates. In this embodiment, the RF section 82 mixes the in-phase components of the outbound data symbol stream 110 with an in-phase local oscillation to produce a first mixed signal and mixes the quadrature components of the outbound data symbol stream 110 to produce a second mixed signal. The RF section 82 combines the first and second mixed signals to produce an up-converted data signal. The RF section 82 then amplifies the up-converted data signal to produce the outbound RF data signal 118, which it provides to the antenna interface 52. Note that further power amplification may occur between the output of the RF section 82 and the input of the antenna interface 52.

In other embodiments, the RF section 82 receives the outbound data symbol stream 110 as Polar or hybrid coordinates. In these embodiments, the RF section 82 modulates a local oscillator based on phase information of the outbound data symbol stream 110 to produce a phase modulated RF signal. The RF section 82 then amplifies the phase modulated RF signal in accordance with amplitude information of the outbound data symbol stream 110 to produce the outbound RF data signal 118. Alternatively, the RF section 82 may amplify the phase modulated RF signal in accordance with a power level setting to produce the outbound RF data signal 118.

For incoming data communications, the RF section 82 converts the inbound RF data signal 116 into an inbound data symbol stream 104. In one embodiment, the RF section 82 extracts Cartesian coordinates from the inbound RF data signal 116 to produce the inbound data symbol stream 104. In another embodiment, the RF section 82 extracts Polar coordinates from the inbound RF data signal 116 to produce the inbound data symbol stream 104. In yet another embodiment, the RF section 82 extracts hybrid coordinates from the inbound RF data signal 116 to produce the inbound data symbol stream 104. The interface module 84 provides the inbound data symbol stream 104 to the data baseband processing module 172 when the Voice Data RF IC 50 is in the data mode.

The data baseband processing module 172 converts the inbound data symbol stream 104 into inbound data 106. The data baseband processing module 172 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound data symbol stream 104 into the inbound data 106.

Figure 8:
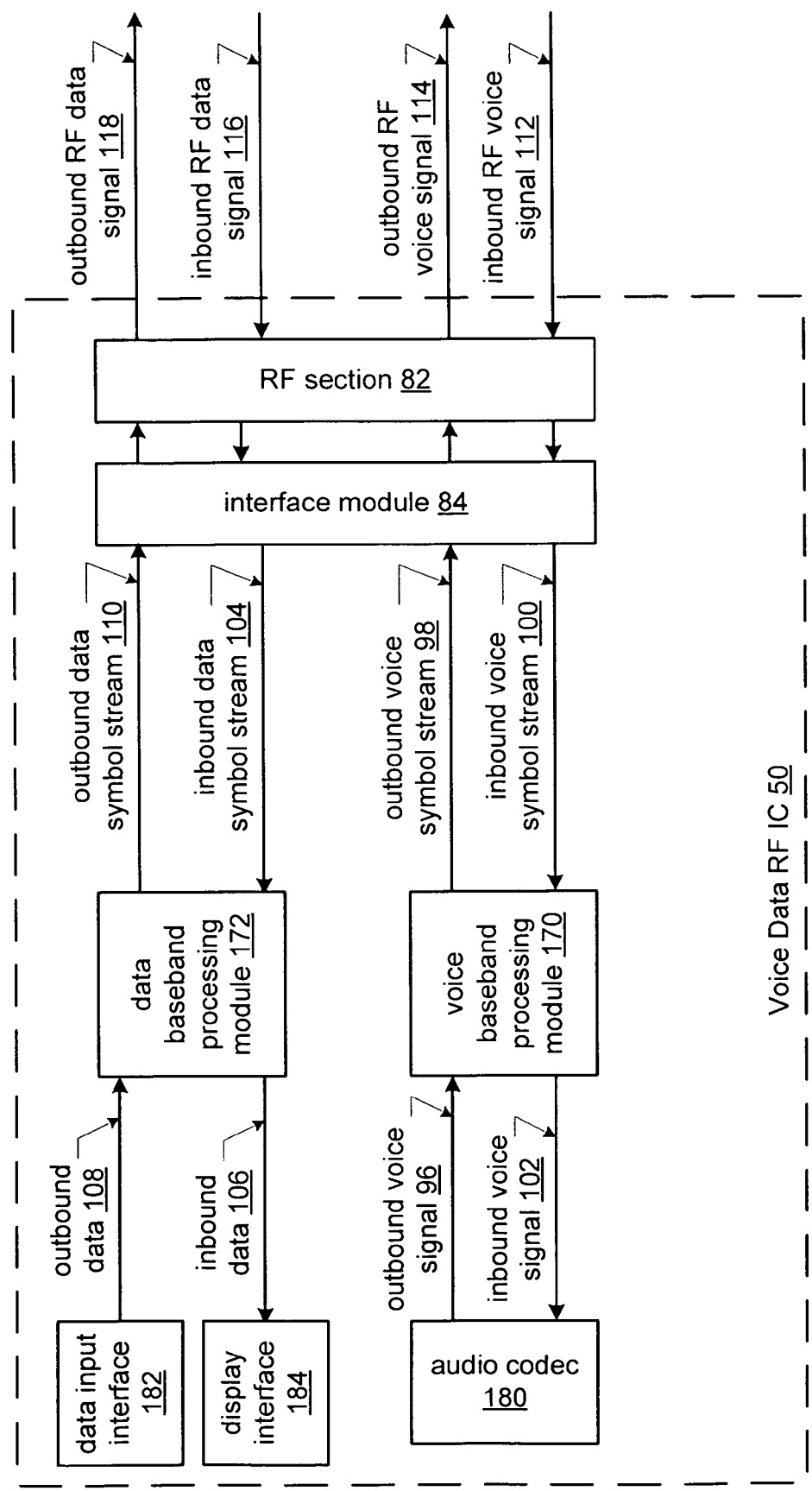
FIG. 8 is a schematic block diagram of another embodiment of a Voice Data RF IC in accordance with the present invention.

FIG. 8 is a schematic block diagram of another embodiment of a Voice Data RF IC 50 that includes the RF section 82, the interface module 84, the voice baseband processing module 170, the data baseband processing module 172, a data input interface 182, a display interface 184, and an audio codec section 180. In this embodiment, the RF section 82, the interface module 84, the voice baseband processing module 170, the data baseband processing module 172 function as previously described with reference to FIG. 7.

In this embodiment, the data input interface 182 receives the outbound data 108 for a component of the communication device 10. For example, the data input interface 182 may be a keypad interface, a keyboard interface, a touch screen interface, a serial interface (e.g., USB, etc.), a parallel interface, and/or any other type of interface for receiving data. The display interface 184 is coupled to provide the inbound data 106 to one or more displays. The display interface 184 may be a liquid crystal (LCD) display interface, a plasma display interface, a digital light project (DLP) display interface, a mobile industry processor interface (MIPI), and/or any other type of portable video display interface.

The audio codec 180 is coupled to provide the outbound voice signal 96 to the voice baseband processing module 170 and to receive the inbound voice signal 102 from the voice baseband processing module 170. In one embodiment, the audio codec section 180 receives an analog voice input signal from a microphone. The audio codec section 180 converts the analog voice input signal into a digitized voice signal that is provided to the voice baseband processing module 170 as the outbound voice signal 96. The audio codec section 180 may perform an analog to digital conversion to produce the digitized voice signal from the analog voice input signal, may perform pulse code modulation (PCM) to produce the digitized voice signal, and/or may compress a digital representation of the analog voice input signal to produce the digitized voice signal.

The audio codec section 180 processes the inbound voice signal 102 to produce an analog inbound voice signal that may be provided to a speaker. The audio codec section 86 may process the inbound voice signal 102 by performing a digital to analog conversion, by PCM decoding, and/or by decompressing the inbound voice signal 102.

Figure 9:
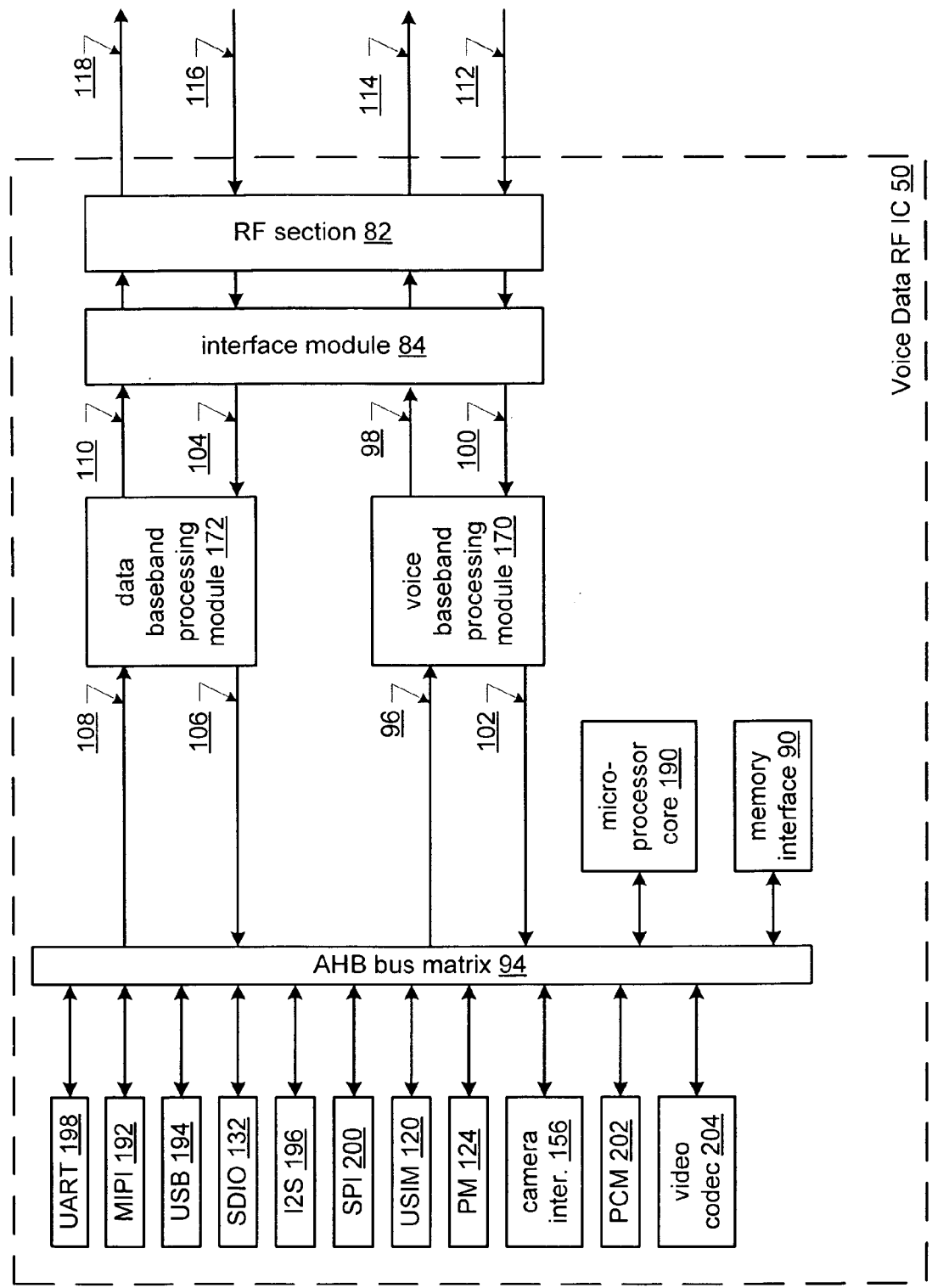
FIG. 9 is a schematic block diagram of another embodiment of a Voice Data RF IC in accordance with the present invention.

FIG. 9 is a schematic block diagram of another embodiment of a Voice Data RF IC 50 that includes the RF section 82, the interface module 84, the voice baseband processing module 170, the data baseband processing module 172, the AHB bus matrix 94, a microprocessor core 190, a memory interface 90, and one or more of a plurality of interface modules. The plurality of interface modules includes a mobile industry processor interface (MIPI) interface 192, a universal serial bus (USB) interface 194, a secure digital input/output (SDIO) interface 132, an I2S interface 196, a Universal Asynchronous Receiver-Transmitter (UART) interface 198, a Serial Peripheral Interface (SPI) interface 200, a power management (PM) interface 124, a universal subscriber identity module (USIM) interface 120, a camera interface 156, a pulse code modulation (PCM) interface 202, and a video codec 204.

The video codec 204 performs coding and decoding of video signals, where encoded video signals may be stored in memory coupled to the memory interface 90. Such coding and decoding may be in accordance with various video processing standards such as MPEG (Motion Picture Expert Group), JPEG (Joint Picture Expert Group), etc.

Figure 10:
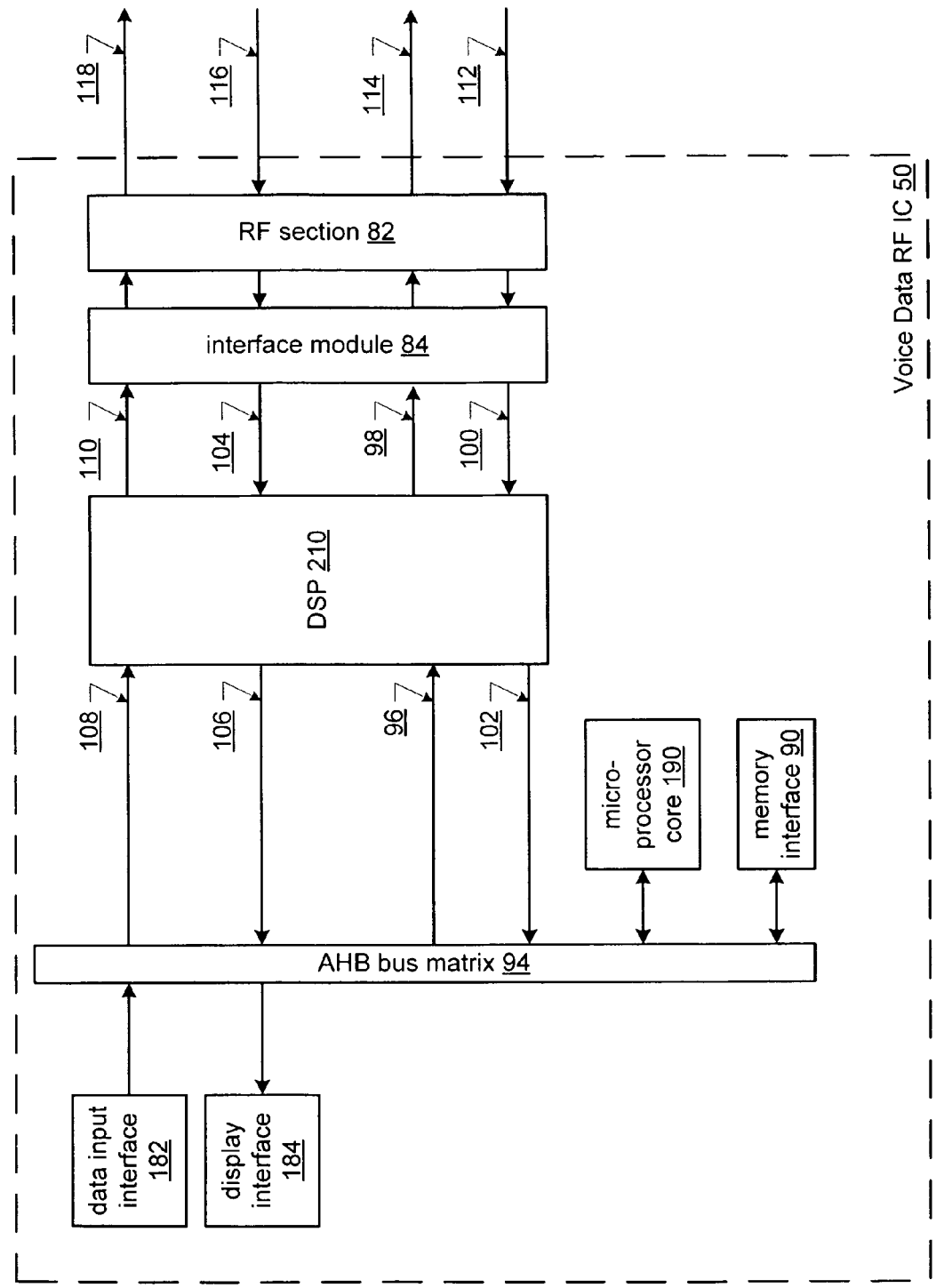
FIG. 10 is a schematic block diagram of another embodiment of a Voice Data RF IC in accordance with the present invention.

FIG. 10 is a schematic block diagram of another embodiment of a Voice Data RF IC 50 that includes the RF section 82, the interface module 84, a digital signal processor (DSP) 210, a data input interface 182, a display interface 184, a microprocessor core 190, and a memory interface 90.

The DSP 210 converts an outbound voice signal 96 into an outbound voice symbol stream 98 in accordance with one or more existing wireless communication standards, new wireless communication standards, modifications thereof, and/or extensions thereof (e.g., GSM, AMPS, digital AMPS, CDMA, etc.). The DSP 210 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal 96 into the outbound voice symbol stream 98. Depending on the desired formatting of the outbound voice symbol stream 98, the DSP may generate the outbound voice symbol stream 98 as Cartesian coordinates, as Polar coordinates, or as hybrid coordinates.

The interface module 84 conveys the outbound voice symbol stream 98 to the RF section 82 when the Voice Data RF IC 50 is in a voice mode. The RF section 82 converts the outbound voice symbol stream 98 into an outbound RF voice signal 114 as previously discussed with reference to FIG. 7.

For incoming voice signals, the RF section 82 converts the inbound RF voice signal 112 into an inbound voice symbol stream 100 as previously discussed with reference to FIG. 7. The interface module 84 provides the inbound voice symbol stream 100 to the DSP 210 when the Voice Data RF IC 50 is in the voice mode.

The DSP 210 converts the inbound voice symbol stream 100 into an inbound voice signal 102. The DSP 210 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream 100 into the inbound voice signal 102.

For an outgoing data communication (e.g., email, text message, web browsing, and/or non-real-time data), the DSP 210 converts outbound data 108 into an outbound data symbol stream 110 in accordance with one or more existing wireless communication standards, new wireless communication standards, modifications thereof, and/or extensions thereof (e.g., EDGE, GPRS, etc.). The DSP 210 may perform one or more of scrambling, encoding, constellation mapping, modulation, frequency spreading, frequency hopping, beamforming, space-time-block encoding, space-frequency-block encoding, and/or digital baseband to IF conversion to convert the outbound data 108 into the outbound data symbol stream 110. Depending on the desired formatting of the outbound data symbol stream 110, the DSP 210 may generate the outbound data symbol stream 110 as Cartesian coordinates, as Polar coordinates, or as hybrid coordinates.

The interface module 84 conveys the outbound data symbol stream 110 to the RF section 82 when the Voice Data RF IC 50 is in a data mode. The RF section 82 converts the outbound data symbol stream 110 into an outbound RF data signal 118 as previously described with reference to FIG. 7.

For incoming data communications, the RF section 82 converts the inbound RF data signal 116 into an inbound data symbol stream 104 as previously discussed with reference to FIG. 7. The interface module 84 provides the inbound data symbol stream 104 to the DSP 210 when the Voice Data RF IC 50 is in the data mode.

The DSP 210 converts the inbound data symbol stream 104 into inbound data 106. The DSP 210 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound data symbol stream 104 into the inbound data 106.

In this embodiment, the microprocessor core 190 may retrieve from memory via memory interface 90 and/or may generate the outbound data 108 and/or the outbound voice signal 96. Note that, in this embodiment, the outbound voice signal 96 may be a voice signal of a cellular telephone call, an audio signal (e.g., music, a voice recording, etc.) a video signal (e.g., a movie, TV show, etc), and/or an image signal (e.g., a picture).

In addition, the microprocessor core 190 may store the inbound voice signal 102 and/or the inbound data 106 in the memory via the memory interface 90. Note that, in this embodiment, the inbound voice signal 102 may be a voice signal of a cellular telephone call, an audio signal (e.g., music, a voice recording, etc.) a video signal (e.g., a movie, TV show, etc), and/or an image signal (e.g., a picture).

Figure 11:
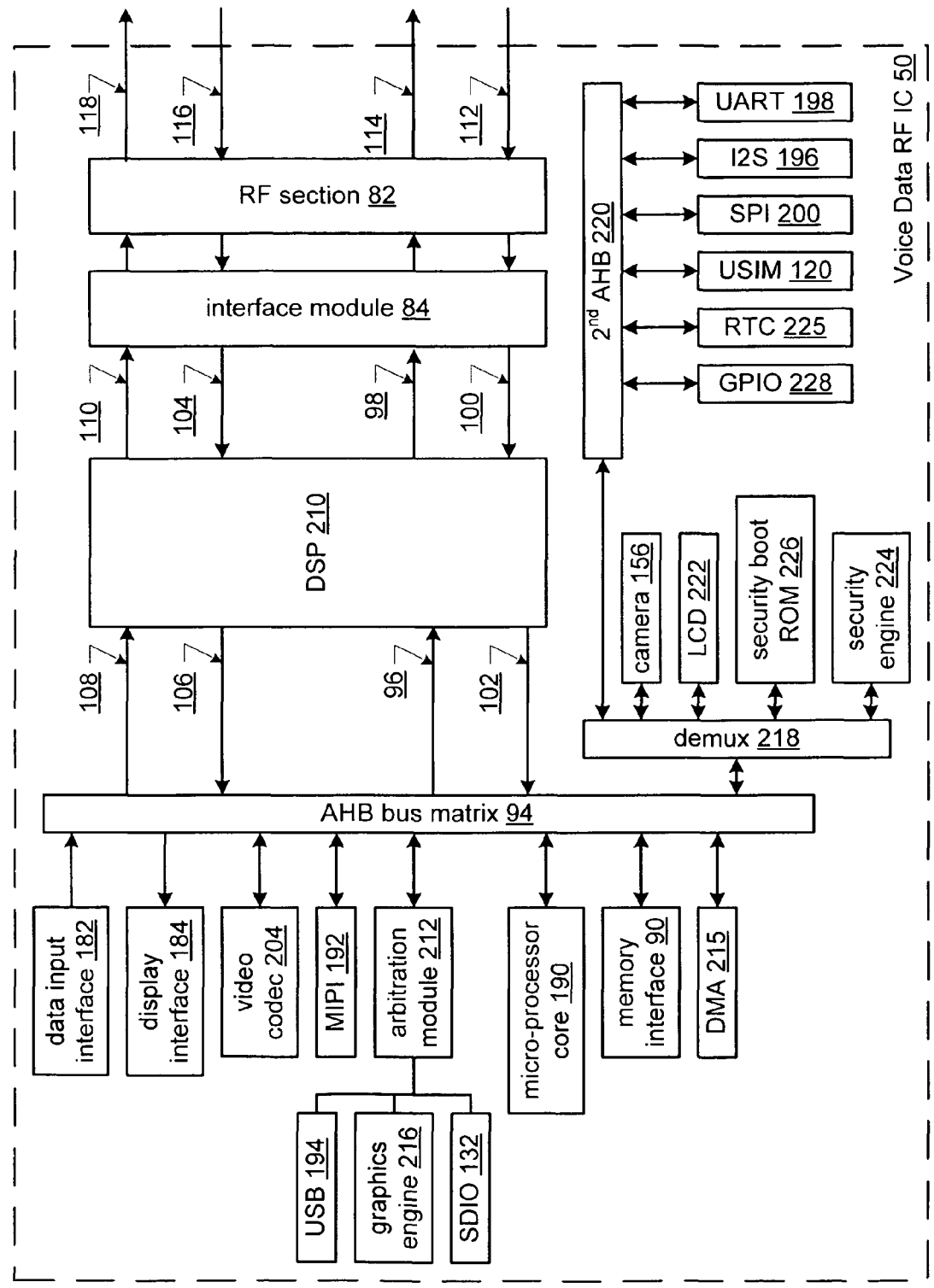
FIG. 11 is a schematic block diagram of another embodiment of a Voice Data RF IC in accordance with the present invention.

FIG. 11 is a schematic block diagram of another embodiment of a Voice Data RF IC 50 that includes the RF section 82, the interface module 84, the DSP 210, the AHB bus matrix 94, the microprocessor core 190, the memory interface 90, the data interface 182, the display interface 184, the video codec 204, the mobile industry processor interface (MIPI) interface 192, an arbitration module 212, a direct memory access (DMA) 215, a demultiplexer 218, a security engine 224, a security boot ROM 226, an LCD interface 222, a camera interface 156, a $2^{nd}$ AHB bus 220, a real time clock (RTC) module 225, a general purpose input/output (GPIO) interface 228, a Universal Asynchronous Receiver-Transmitter (UART) interface 198, a Serial Peripheral Interface (SPI) interface 200, and an I2S interface 196. The arbitration module 212 is coupled to the SDIO interface 132, a universal serial bus (USB) interface 194, and a graphics engine 216.

In this embodiment, the arbitration module 212 arbitrates access to the AHB bus matrix 94 between the SDIO interface 132, a universal serial bus (USB) interface 194, and a graphics engine 216. The graphics engine 216 is operable to generate two-dimensional and/or three-dimensional graphic images for display and/or for transmission as outbound data. In addition, the graphics engine 216 may process inbound data to produce two-dimensional and/or three-dimensional graphic images for display and/or storage.

Figure 12:
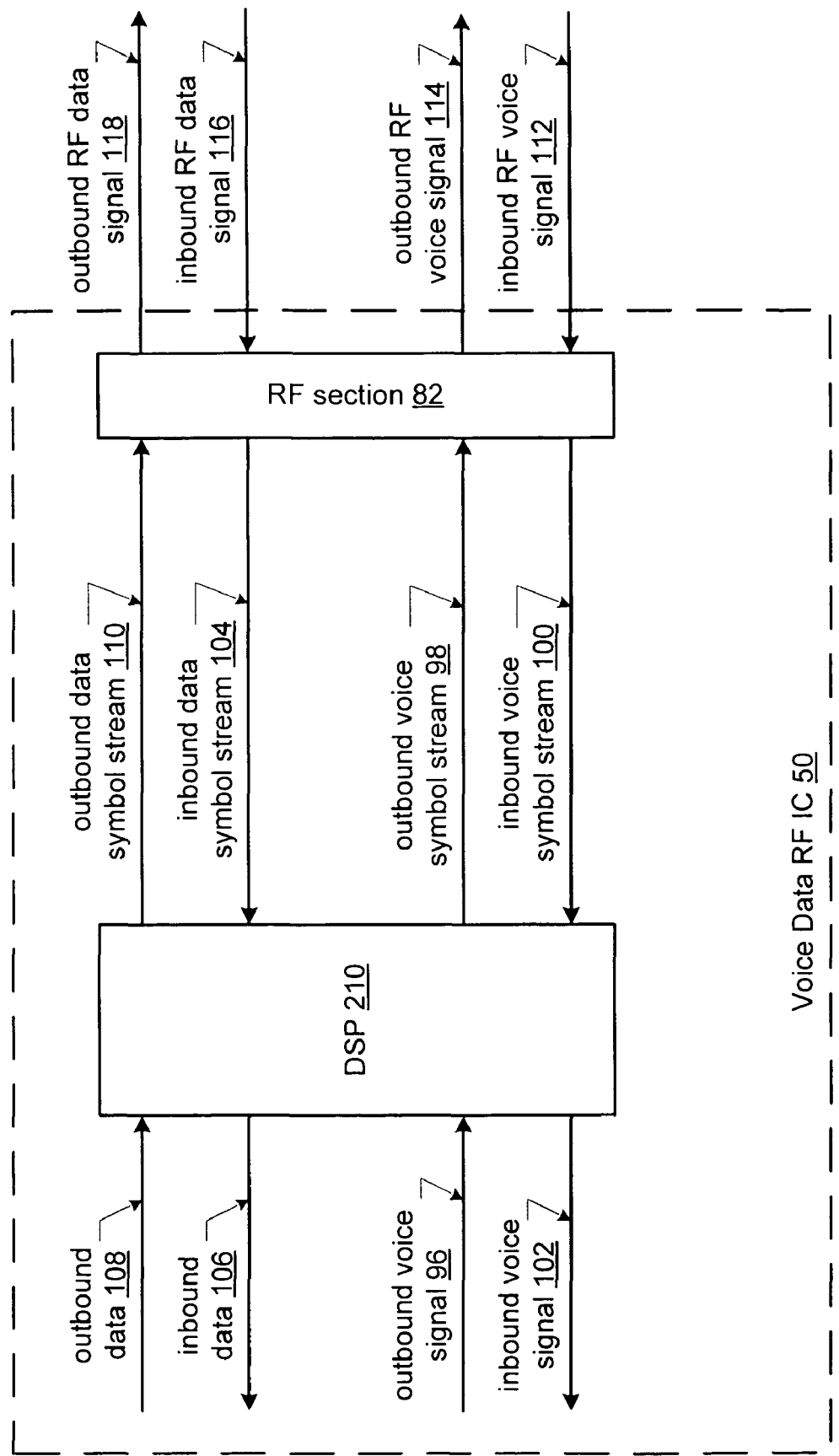
FIG. 12 is a schematic block diagram of another embodiment of a Voice Data RF IC in accordance with the present invention.

FIG. 12 is a schematic block diagram of another embodiment of a Voice Data RF IC 50 that includes the RF section 82 and a digital signal processor (DSP) 210. The DSP 210 converts an outbound voice signal 96 into an outbound voice symbol stream 98 in accordance with one or more existing wireless communication standards, new wireless communication standards, modifications thereof, and/or extensions thereof (e.g., GSM, AMPS, digital AMPS, CDMA, etc.). The DSP 210 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal 96 into the outbound voice symbol stream 98. Depending on the desired formatting of the outbound voice symbol stream 98, the DSP may generate the outbound voice symbol stream 98 as Cartesian coordinates, as Polar coordinates, or as hybrid coordinates. The RF section 82 converts the outbound voice symbol stream 98 into an outbound RF voice signal 114 as previously discussed with reference to FIG. 7.

For incoming voice signals, the RF section 82 converts the inbound RF voice signal 112 into an inbound voice symbol stream 100 as previously discussed with reference to FIG. 7. The DSP 210 converts the inbound voice symbol stream 100 into an inbound voice signal 102. The DSP 210 may perform one or more of descrambling, decoding, constellation demapping, modulation, frequency spreading decoding, frequency hopping decoding, beamforming decoding, space-time-block decoding, space-frequency -block decoding, and/or IF to digital baseband conversion to convert the inbound voice symbol stream 100 into the inbound voice signal 102.

For an outgoing data communication (e.g., email, text message, web browsing, and/or non-real-time data), the DSP 210 converts outbound data 108 into an outbound data symbol stream 110 in accordance with one or more existing wireless communication standards, new wireless communication standards, modifications thereof, and/or extensions thereof (e.g., EDGE, GPRS, etc.). The DSP 210 may perform one or more of scrambling, encoding, constellation mapping, modulation, frequency spreading, frequency hopping, beamforming, space-time-block encoding, space-frequency-block encoding, and/or digital baseband to IF conversion to convert the outbound data 108 into the outbound data symbol stream 110. Depending on the desired formatting of the outbound data symbol stream 110, the DSP 210 may generate the outbound data symbol stream 110 as Cartesian coordinates, as Polar coordinates, or as hybrid coordinates.

For incoming data communications, the RF section 82 converts the inbound RF data signal 116 into an inbound data symbol stream 104 as previously discussed with reference to FIG. 7. The DSP 210 converts the inbound data symbol stream 104 into inbound data 106. The DSP 210 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound data symbol stream 104 into the inbound data 106.

Figure 13:
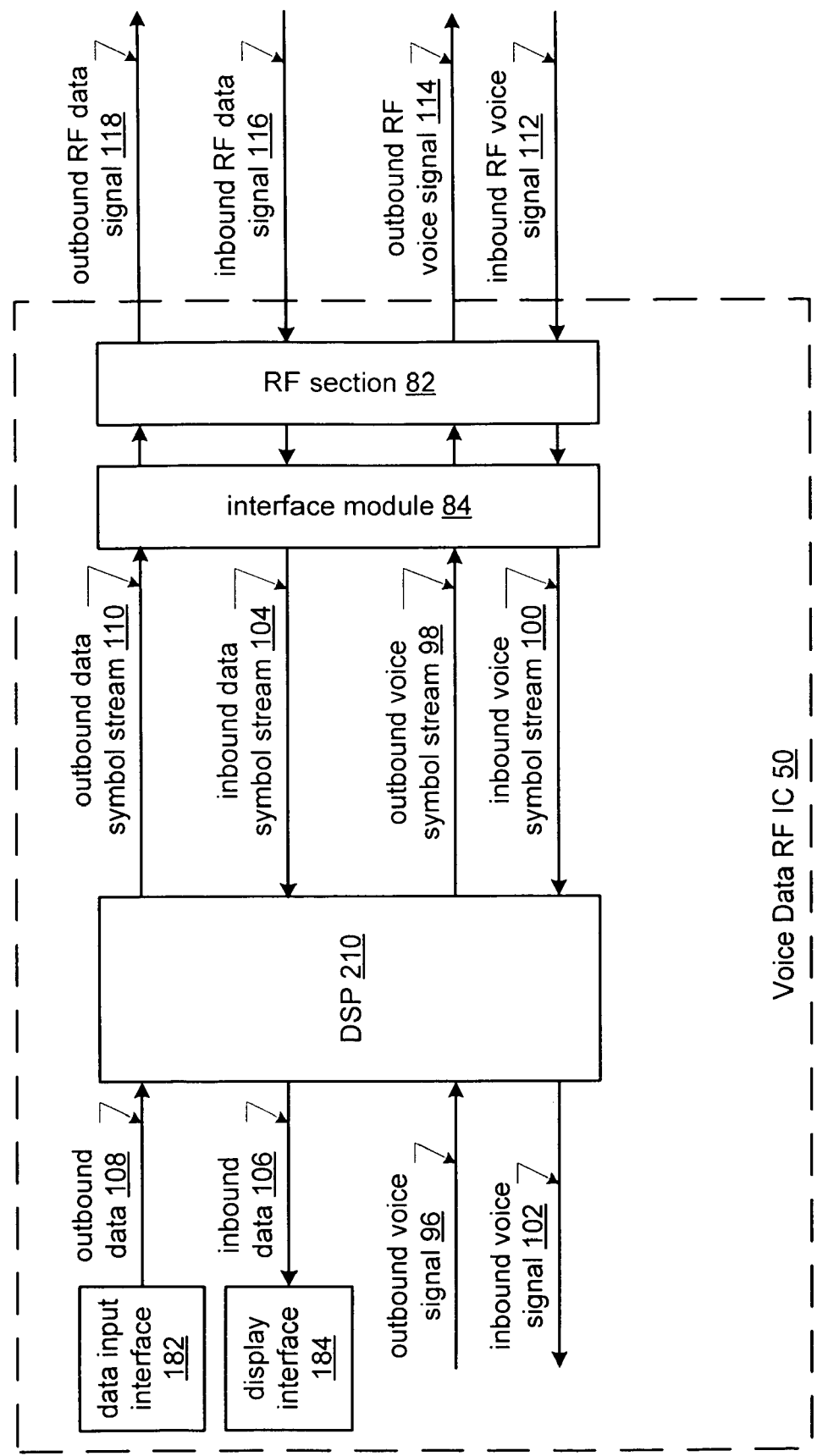
FIG. 13 is a schematic block diagram of another embodiment of a Voice Data RF IC in accordance with the present invention.

FIG. 13 is a schematic block diagram of another embodiment of a Voice Data RF IC 50 that includes the RF section 82, the interface module 84, the data input interface 182, the display interface 184, and the DSP 210. In an embodiment, the data input interface 182 receives the outbound data 108 for a component of the communication device 10. For example, the data input interface 182 may be a keypad interface, a keyboard interface, a touch screen interface, a serial interface (e.g., USB, etc.), a parallel interface, and/or any other type of interface for receiving data. The display interface 184 is coupled to provide the inbound data 106 to one or more displays. The display interface 184 may be a liquid crystal (LCD) display interface, a plasma display interface, a digital light project (DLP) display interface, a mobile industry processor interface (MIPI), and/or any other type of portable video display interface.

The DSP 210 converts the outbound data 108 into the outbound data symbol stream 110 and converts the inbound data symbol stream 104 into the inbound data 106 as previously discussed with reference to FIG. 12. The interface module 84 conveys the outbound data symbol stream 110 to the RF section 82 and conveys the inbound data symbol stream from the RF section 82 to the DSP 210 when the Voice Data RF IC 50 is in a data mode. The data mode may be activated by the user of the communication device 10 by initiating a text message, by receiving a text message, by initiating a web browser function, by receiving a web browser response, by initiating a data file transfer, and/or by another data activation selection mechanism. The RF section 82 converts the outbound data symbol stream 110 into the outbound RF data signal 118 and converts the inbound RF data signal 116 into the inbound data symbols stream 104 as previously discussed with reference to FIG. 7.

The DSP 210 also converts the outbound voice signal 96 into the outbound voice symbol stream 98 and converts the inbound voice symbol stream 100 into the inbound voice signal 102 as previously discussed with reference to FIG. 12. The interface module 84 conveys the outbound voice symbol stream 98 to the RF section 82 and conveys the inbound voice symbol stream 100 from the RF section 82 to the DSP 210 when the Voice Data RF IC 50 is in a voice mode. The voice mode may be activated by the user of the communication device 10 by initiating a cellular telephone call, by receiving a cellular telephone call, by initiating a walkie-talkie type call, by receiving a walkie-talkie type call, by initiating a voice record function, and/or by another voice activation selection mechanism. The RF section 82 converts the outbound voice symbol stream 98 into the outbound RF voice signal 114 and converts the inbound RF voice signal 112 into the inbound voice symbols stream 100 as previously discussed with reference to FIG. 7.

Figure 14:
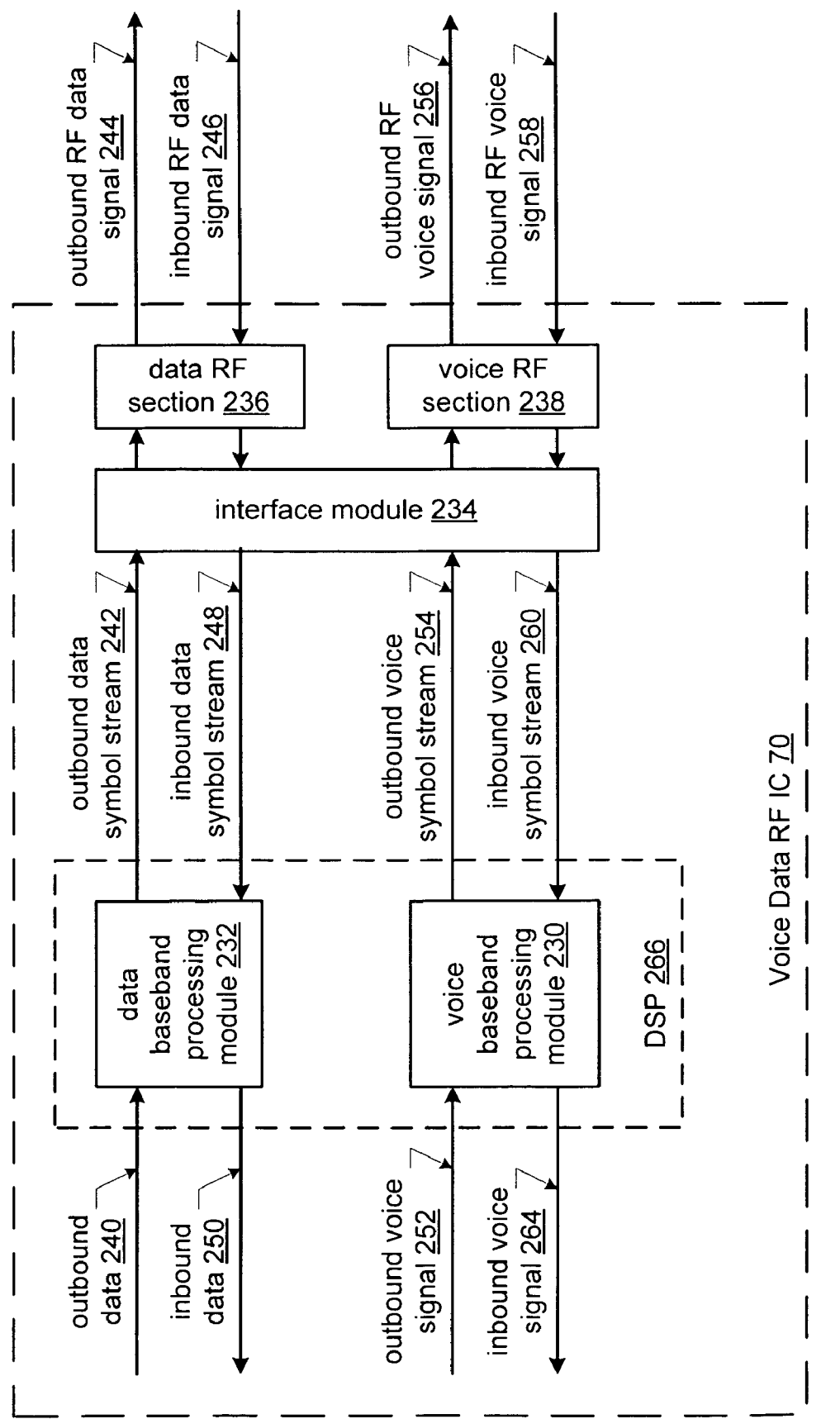
FIG. 14 is a schematic block diagram of another embodiment of a Voice Data RF IC in accordance with the present invention.

FIG. 14 is a schematic block diagram of another embodiment of a Voice Data RF IC 70 that includes a digital signal processor (DSP) 266, an interface module 234, a data RF section 236, and a voice RF section 238. The DSP 266 may be programmed to include a voice baseband processing module 232 and a data baseband processing module 230.

The voice baseband processing module 230 converts an outbound voice signal 252 into an outbound voice symbol stream 254 in accordance with one or more existing wireless communication standards, new wireless communication standards, modifications thereof, and/or extensions thereof (e.g., WCDMA, etc.) corresponding to a second frequency band ($fb_2$). The voice baseband processing module 230 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal 252 into the outbound voice symbol stream 254. Depending on the desired formatting of the outbound voice symbol stream 254, the voice baseband processing module 230 may generate the outbound voice symbol stream 254 as Cartesian coordinates (e.g., having an in-phase signal component and a quadrature signal component to represent a symbol), as Polar or hybrid coordinates (e.g., having a phase component and an amplitude component to represent a symbol).

The interface module 234 conveys the outbound voice symbol stream 254 to the voice RF section 238 when the Voice Data RF IC 70 is in a voice mode. The voice mode may be activated by the user of the communication device 30 by initiating a cellular telephone call, by receiving a cellular telephone call, by initiating a walkie-talkie type call, by receiving a walkie-talkie type call, by initiating a voice record function, and/or by another voice activation selection mechanism.

The voice RF section 238 converts the outbound voice symbol stream 254 into an outbound RF voice signal 256 in accordance with the one or more existing wireless communication standards, new wireless communication standards, modifications thereof, and/or extensions thereof (e.g., WCDMA, etc.), where the outbound RF voice signal 256 has a carrier frequency in the second frequency band (e.g., 1920-1980 MHz). In one embodiment, the voice RF section 238 receives the outbound voice symbol stream 254 as Cartesian coordinates. In this embodiment, the voice RF section 238 mixes the in-phase components of the outbound voice symbol stream 254 with an in-phase local oscillation to produce a first mixed signal and mixes the quadrature components of the outbound voice symbol stream 254 to produce a second mixed signal. The voice RF section 238 combines the first and second mixed signals to produce an up-converted voice signal. The voice RF section 238 then amplifies the up-converted voice signal to produce the outbound RF voice signal 256. Note that further power amplification may occur after the output of the voice RF section 238.

In other embodiments, the voice RF section 238 receives the outbound voice symbol stream 254 as Polar or hybrid coordinates. In these embodiments, the voice RF section 254 modulates a local oscillator based on phase information of the outbound voice symbol stream 254 to produce a phase modulated RF signal. The voice RF section 238 then amplifies the phase modulated RF signal in accordance with amplitude information of the outbound voice symbol stream 254 to produce the outbound RF voice signal 256. Alternatively, the voice RF section 238 may amplify the phase modulated RF signal in accordance with a power level setting to produce the outbound RF voice signal 256.

For incoming voice signals, the voice RF section 238 converts the inbound RF voice signal 258, which has a carrier frequency in the second frequency band (e.g., 2110-2170 MHz) into an inbound voice symbol stream 260. In one embodiment, the voice RF section 238 extracts Cartesian coordinates from the inbound RF voice signal 258 to produce the inbound voice symbol stream 260. In another embodiment, the voice RF section 238 extracts Polar coordinates from the inbound RF voice signal 258 to produce the inbound voice symbol stream 260. In yet another embodiment, the voice RF section 238 extracts hybrid coordinates from the inbound RF voice signal 258 to produce the inbound voice symbol stream 260. The interface module 234 provides the inbound voice symbol stream 260 to the voice baseband processing module 230 when the Voice Data RF IC 70 is in the voice mode.

The voice baseband processing module 230 converts the inbound voice symbol stream 260 into an inbound voice signal 264. The voice baseband processing module 230 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream 260 into the inbound voice signal 264.

For an outgoing data communication (e.g., email, text message, web browsing, and/or non-real-time data), the data baseband processing module 232 converts outbound data 240 into an outbound data symbol stream 242 in accordance with one or more existing wireless communication standards, new wireless communication standards, modifications thereof, and/or extensions thereof (e.g., EDGE, GPRS, etc.) corresponding to a first frequency band ($fb_1$). The data baseband processing module 232 may perform one or more of scrambling, encoding, constellation mapping, modulation, frequency spreading, frequency hopping, beamforming, space-time-block encoding, space-frequency-block encoding, and/or digital baseband to IF conversion to convert the outbound data 240 into the outbound data symbol stream 242. Depending on the desired formatting of the outbound data symbol stream 242, the data baseband processing module 232 may generate the outbound data symbol stream 242 as Cartesian coordinates, as Polar coordinates, or as hybrid coordinates.

The interface module 234 conveys the outbound data symbol stream 242 to the data RF section 236 when the Voice Data RF IC 70 is in a data mode. The data mode may be activated by the user of the communication device 30 by initiating a text message, by receiving a text message, by initiating a web browser function, by receiving a web browser response, by initiating a data file transfer, and/or by another data activation selection mechanism.

The data RF section 236 converts the outbound data symbol stream 242 into an outbound RF data signal 244 having a carrier frequency in the first frequency band (e.g., 890-915 MHz) in accordance with the one or more existing wireless communication standards, new wireless communication standards, modifications thereof, and/or extensions thereof (e.g., EDGE, GPRS, etc.). In one embodiment, the data RF section 236 receives the outbound data symbol stream 242 as Cartesian coordinates. In this embodiment, the data RF section 236 mixes the in-phase components of the outbound data symbol stream 242 with an in-phase local oscillation to produce a first mixed signal and mixes the quadrature components of the outbound data symbol stream 242 to produce a second mixed signal. The data RF section 236 combines the first and second mixed signals to produce an up-converted data signal. The data RF section 236 then amplifies the up-converted data signal to produce the outbound RF data signal 244. Note that further power amplification may occur after the output of the data RF section 236.

In other embodiments, the data RF section 236 receives the outbound data symbol stream 242 as Polar or hybrid coordinates. In these embodiments, the data RF section 236 modulates a local oscillator based on phase information of the outbound data symbol stream 242 to produce a phase modulated RF signal. The data RF section 236 then amplifies the phase modulated RF signal in accordance with amplitude information of the outbound data symbol stream 242 to produce the outbound RF data signal 244. Alternatively, the data RF section 236 may amplify the phase modulated RF signal in accordance with a power level setting to produce the outbound RF data signal 244.

For incoming data communications, the data RF section 236 converts the inbound RF data signal 246, which has a carrier frequency in the first frequency band (e.g., 890-915 MHz) into an inbound data symbol stream 248. In one embodiment, the data RF section 236 extracts Cartesian coordinates from the inbound RF data signal 246 to produce the inbound data symbol stream 248. In another embodiment, the data RF section 236 extracts Polar coordinates from the inbound RF data signal 246 to produce the inbound data symbol stream 248. In yet another embodiment, the data RF section 236 extracts hybrid coordinates from the inbound RF data signal 246 to produce the inbound data symbol stream 248. The interface module 234 provides the inbound data symbol stream 248 to the data baseband processing module 232 when the Voice Data RF IC 70 is in the data mode.

The data baseband processing module 232 converts the inbound data symbol stream 248 into inbound data 250. The data baseband processing module 232 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound data symbol stream 248 into the inbound data 250.

Figure 15:
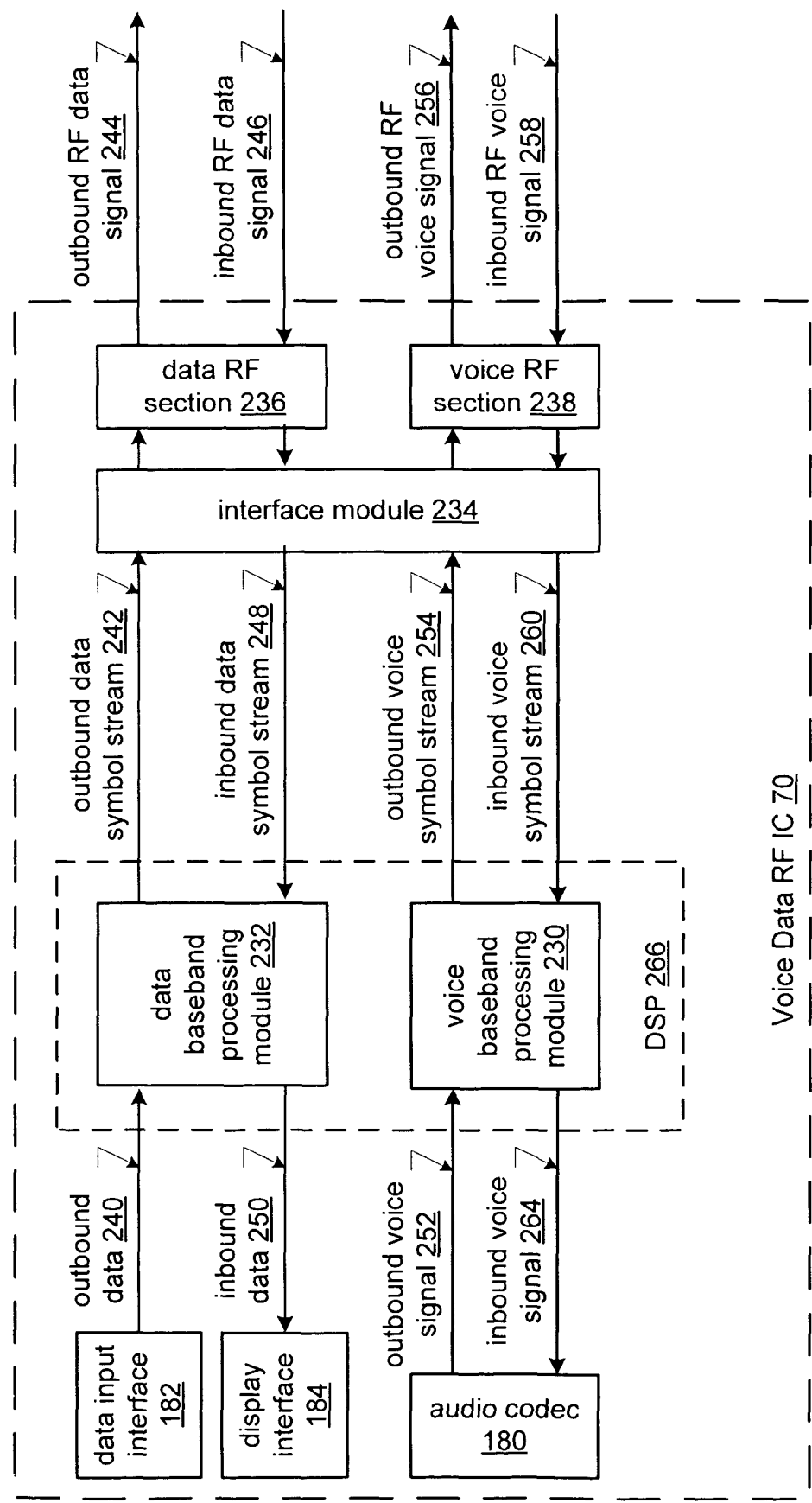
FIG. 15 is a schematic block diagram of another embodiment of a Voice Data RF IC in accordance with the present invention.

FIG. 15 is a schematic block diagram of another embodiment of a Voice Data RF IC 70 that includes the DSP 266, the interface module 234, the data RF section 236, the voice RF section 238, the data input interface 182, the display interface 184, and the audio codec 180. In this embodiment, the DSP 266, the interface module 234, the data RF section 236, and the voice RF section 238 function as previously described with reference to FIG. 14. The data input interface 182 functions as previously described to provide the outbound data 240 to the data baseband processing module 232. The display interface 184 functions as previously described to provide the inbound data 250 for display. The audio codec 180 functions as previously described to provide the outbound voice signal 252 to the voice baseband processing module 230 and to receive the inbound voice signal 264 from the voice baseband processing module 230.

Figure 16:
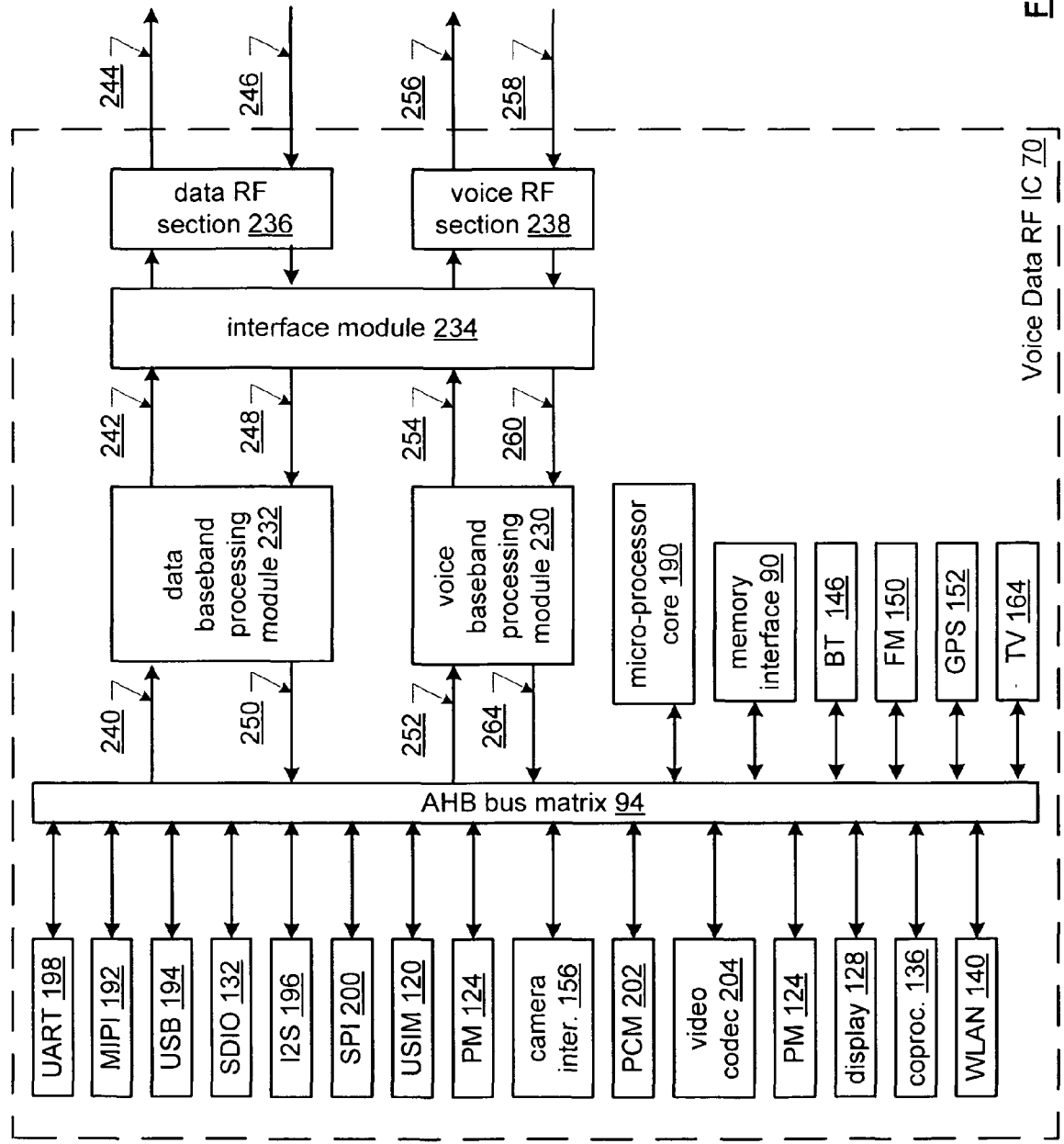
FIG. 16 is a schematic block diagram of another embodiment of a Voice Data RF IC in accordance with the present invention.

FIG. 16 is a schematic block diagram of another embodiment of a Voice Data RF IC 70 includes the data RF section 236, the voice RF section 238, the interface module 234, the voice baseband processing module 230, the data baseband processing module 232, the AHB bus matrix 94, the microprocessor core 190, the memory interface 90, and one or more of a plurality of interface modules. The plurality of interface modules includes the mobile industry processor interface (MIPI) interface 192, the universal serial bus (USB) interface 194, the secure digital input/output (SDIO) interface 132, the I2S interface 196, the Universal Asynchronous Receiver-Transmitter (UART) interface 198, the Serial Peripheral Interface (SPI) interface 200, the power management (PM) interface 124, the universal subscriber identity module (USIM) interface 120, the camera interface 156, the pulse code modulation (PCM) interface 202, the video codec 204, the second display interface 126, the coprocessor interface 136, the WLAN interface 140, the Bluetooth interface 146, the FM interface 150, the GPS interface 152, the camcorder interface 160, and the TV interface 164.

Figure 17:
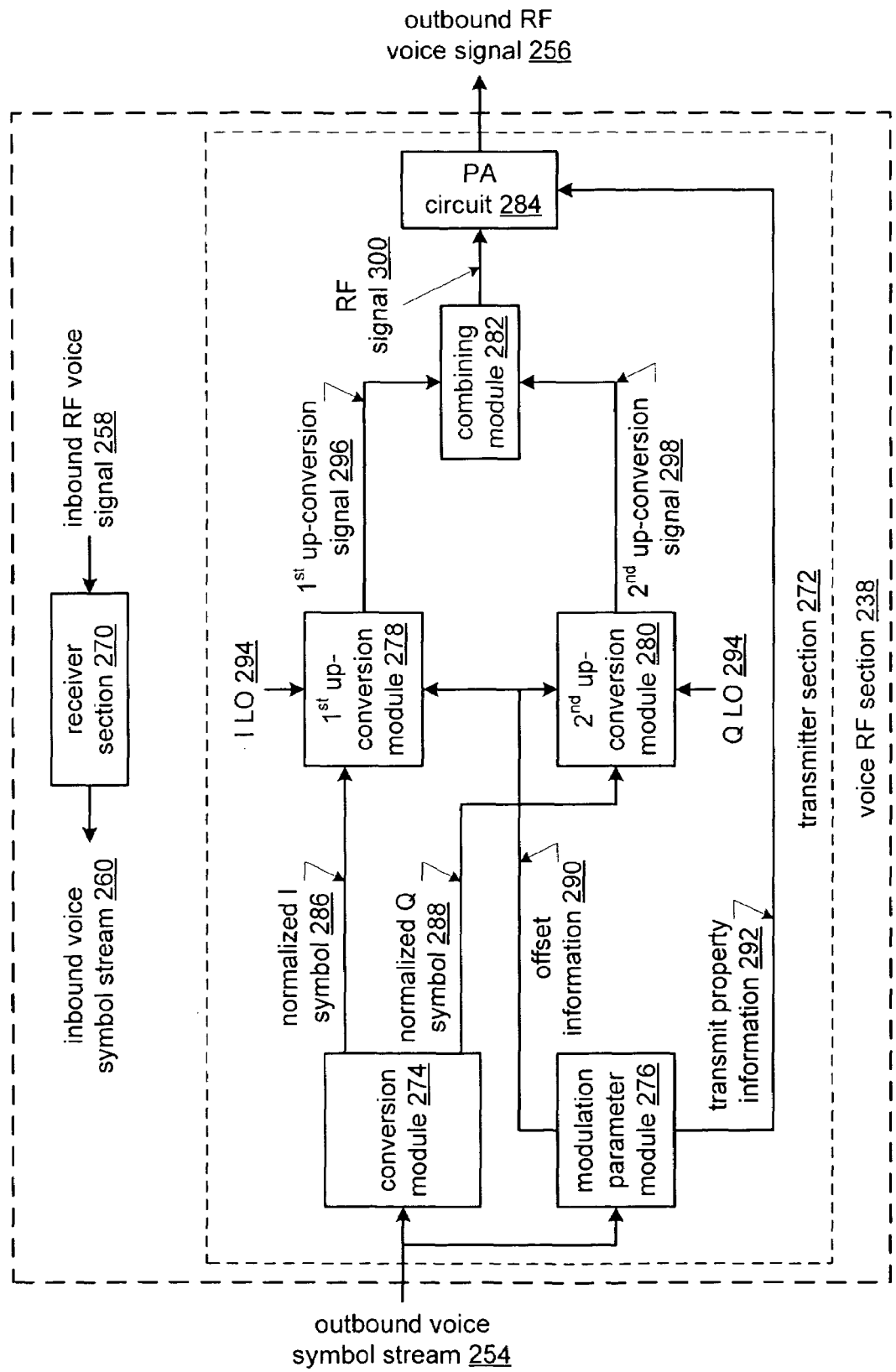
FIG. 17 is a schematic block diagram of an embodiment of a voice RF section in accordance with the present invention.

FIG. 17 is a schematic block diagram of an embodiment of a voice RF section 238 that includes a receiver section 270 and a transmitter section 272. The receiver section is coupled to convert the inbound RF voice signal 258 into the inbound symbol stream 260.

The transmitter section 272 includes a conversion module 274, a modulation parameter module 276, $1^{st}$ up-conversion module 278, a $2^{nd}$ up-conversion module 280, a combining module 282, and a power amplifier circuit 284. The power amplifier circuit 284 may include one or more power amplifier drivers coupled in series and/or in parallel and/or one or more power amplifiers coupled in series and/or in parallel.

In operation, the conversion module 274 and the modulation parameter module 276 receive the outbound voice symbol stream 254, where each symbol is expressed as a hybrid coordinate having an in-phase component and a quadrature component. The conversion module 274 converts the in-phase component and the quadrature component of a symbol into a normalized I symbol 286 and a normalized Q symbol 288. This may be done by setting the amplitude of the in-phase component and the quadrature component of the symbol to the same value. For example, the in-phase component is $A_I \sin(\omega_d(t))$ and the quadrature component is $A_Q \cos(\omega_d(t))$, where $A_I$ and $A_Q$ are the amplitudes of the in-phase and quadrature components, respectively. By setting the amplitudes $A_I$ and $A_Q$ to the same value (e.g., 1 or $A_0$), then the normalized I symbol 286 would be $\sin(\omega_d(t))$ and the normalized Q symbol 288 would be $\cos(\omega_d(t))$.

The modulation parameter module 276 generates offset information 290 and transmit property information 292 from the outbound voice symbol stream 254. In one embodiment, the offset information 290 corresponds to phase information of the symbol (e.g., $\Phi(t)$), which may be calculated as $\tan-1$ $(A_Q/A_I)$. Alternatively, the offset information 290 may correspond to frequency information of the symbol.

The modulation parameter module 276 generates the transmit property information 292 as a power level setting or as amplitude modulation information. For example, if the data modulation scheme uses phase modulation (e.g., QPSK, GMSK) or frequency modulation (e.g., frequency shift keying) without amplitude modulation, then the transmit property information 292 would correspond to the power level setting. In the alternative to the modulation parameter module 276 generating the power level setting, the voice baseband processing module 230 may generate it.

If the data modulation scheme using both phase and amplitude modulation (e.g., 8-PSK, QAM) or both frequency and amplitude modulation, then the modulation parameter module 276 would generate the amplitude information. In one embodiment, the amplitude information (e.g., A(t)) is generated as the square root of $(A_I^2 + A_Q^2)$.

The $1^{st}$ up-conversion module 278 combines the normalized I symbol 286 with the offset information 290 to produce an offset normalized I symbol 286 (e.g., $\sin(\omega_d(t) + \Phi(t))$. This signal is mixed with an in-phase local oscillation that has a frequency corresponding to the second frequency band (e.g., 1920-1980 MHz) to produce a $1^{st}$ up-converted signal 296 (e.g., ½ $\cos(\omega_{RF}(t) - \omega_d(t) - \Phi(t)) - ½ \cos(\omega_{RF}(t) + \omega_d(t) + \Phi(t))$). The $2^{nd}$ up-conversion module 280 combines the normalized Q symbol 288 with the offset information 290 to produce an offset normalized Q symbol 288 (e.g., $\cos(\omega_d(t) + \Phi(t))$. This signal is mixed with a quadrature local oscillation that has a frequency corresponding to the second frequency band and filtered to produce the $2^{nd}$ up-converted signal 298 (e.g., ½ $\cos(\omega_{RF}(t) - \omega_d(t) - \Phi(t)) - ½ \cos(\omega_{RF}(t) + \omega_d(t) + \Phi(t))$). The combining module 282 combines the first and second up-converted signals 296 and 298 to produce an RF signal 300 (e.g., $\cos(\omega_{RF}(t) + \omega_d(t) + \Phi(t))$).

The power amplifier circuit 284 amplifies the RF signal 300 in accordance with the transmit property information 292. In one embodiment, the transmit property information 292 is a power level setting (e.g., $A_P$) such that the outbound RF voice signal 256 may be expressed as $A_P * \cos(\omega_{RF}(t) + \omega_d(t) + \Phi(t))$. In another embodiment, the transmit property information 292 is the amplitude information (e.g., A(t)) such that the outbound RF voice signal 256 may be expressed as $A(t) * \cos(\omega_{RF}(t) + \omega_d(t) + \Phi(t))$.

Figure 18:
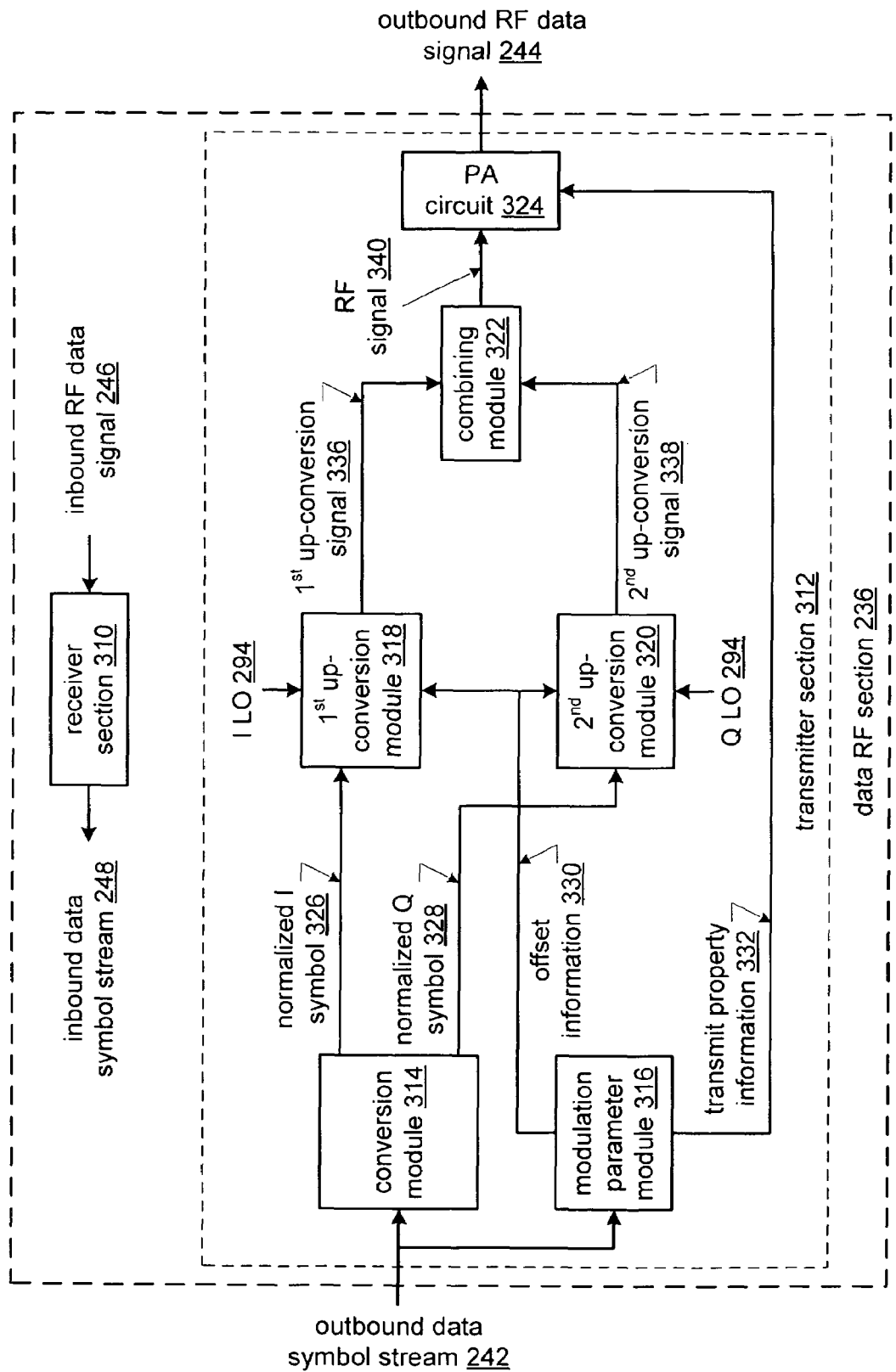
FIG. 18 is a schematic block diagram of an embodiment of a data RF section in accordance with the present invention.

FIG. 18 is a schematic block diagram of an embodiment of a data RF section 236 that includes a receiver section 310 and a transmitter section 312. The receiver section 310 is coupled to convert the inbound RF data signal 246 into the inbound symbol stream 248.

The transmitter section 312 includes a conversion module 314, a modulation parameter module 316, $1^{st}$ up-conversion module 318, a $2^{nd}$ up-conversion module 320, a combining module 322, and a power amplifier circuit 324. The power amplifier circuit 324 may include one or more power amplifier drivers coupled in series and/or in parallel and/or one or more power amplifiers coupled in series and/or in parallel.

In operation, the conversion module 314 and the modulation parameter module 316 receive the outbound data symbol stream 242, where each symbol is expressed as a hybrid coordinate having an in-phase component and a quadrature component. The conversion module 314 converts the in-phase component and the quadrature component of a symbol into a normalized I symbol 326 and a normalized Q symbol 328. This may be done by setting the amplitude of the in-phase component and the quadrature component of the symbol to the same value. For example, the in-phase component is $A_I \sin(\omega_d(t))$ and the quadrature component is $A_Q \cos(\omega_d(t))$, where $A_I$ and $A_Q$ are the amplitudes of the in-phase and quadrature components, respectively. By setting the amplitudes $A_I$ and $A_Q$ to the same value (e.g., 1 or $A_0$), then the normalized I symbol 326 would be $\sin(\omega_d(t))$ and the normalized Q symbol 328 would be $\cos(\omega_d(t))$.

The modulation parameter module 316 generates offset information 330 and transmit property information 332 from the outbound data symbol stream 242. In one embodiment, the offset information 330 corresponds to phase information of the symbol (e.g., $\Phi(t)$), which may be calculated as $\tan-1$ $(A_Q/A_I)$. Alternatively, the offset information 330 may correspond to frequency information of the symbol.

The modulation parameter module 316 generates the transmit property information 332 as a power level setting or as amplitude modulation information. For example, if the data modulation scheme uses phase modulation (e.g., QPSK, GMSK) or frequency modulation (e.g., frequency shift keying) without amplitude modulation, then the transmit property information 332 would correspond to the power level setting. As an alternative, the data baseband processing module 232 may generate the power level setting.

If the data modulation scheme using both phase and amplitude modulation (e.g., 8-PSK, QAM) or both frequency and amplitude modulation, then the modulation parameter module 316 would generate the amplitude information. In one embodiment, the amplitude information (e.g., A(t)) is generated as the square root of $(A_I^2 + A_Q^2)$.

The $1^{st}$ up-conversion module 318 combines the normalized I symbol 326 with the offset information 330 to produce an offset normalized I symbol (e.g., $\sin(\omega_d(t) + \Phi(t))$) 326. This signal is mixed with an in-phase local oscillation 294 that has a frequency corresponding to the first frequency band (e.g., 890-915 MHz) to produce a $1^{st}$ up-converted signal 336 (e.g., ½ $\cos(\omega_{RF}(t) - \omega_d(t) - \Phi(t)) - ½ \cos(\omega_{RF}(t) + \omega_d(t) + \Phi(t))$). The $2^{nd}$ up-conversion module 320 combines the normalized Q symbol 328 with the offset information 330 to produce an offset normalized Q symbol (e.g., $\cos(\omega_d(t) + \Phi(t))$. This signal is mixed with a quadrature local oscillation 294 that has a frequency corresponding to the first frequency band and filtered to produce the $2^{nd}$ up-converted signal 338 (e.g., ½ $\cos(\omega_{RF}(t) - \omega_d(t) - \Phi(t)) + ½ \cos(\omega_{RF}(t) + \omega_d(t) + \Phi(t))$). The combining module 322 combines the first and second up-converted signals 336 and 338 to produce an RF signal 340 (e.g., $\cos(\omega_{RF}(t) + \omega_d(t) + \Phi(t))$).

The power amplifier circuit 324 amplifies the RF signal 340 in accordance with the transmit property information 332. In one embodiment, the transmit property information 332 is a power level setting (e.g., $A_P$) such that the outbound RF data signal 244 may be expressed as $A_P * \cos(\omega_{RF}(t) + \omega_d(t) + \Phi(t))$. In another embodiment, the transmit property information 332 is the amplitude information (e.g., A(t)) such that the outbound RF data signal 244 may be expressed as $A(t) * \cos(\omega_{RF}(t) + \omega_d(t) + \Phi(t))$.

Figure 19:
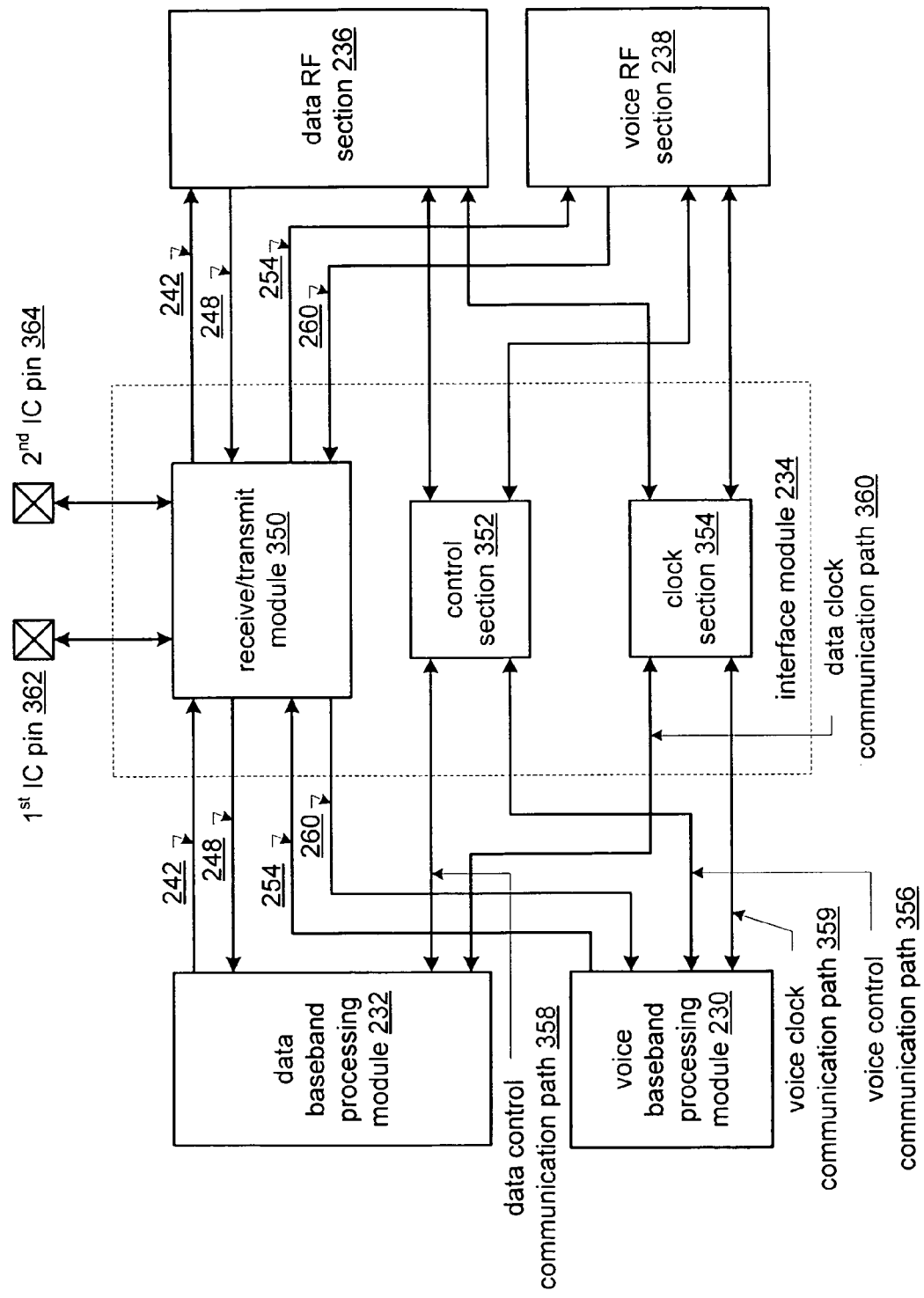
FIG. 19 is a schematic block diagram of another embodiment of a Voice Data RF IC in accordance with the present invention.

FIG. 19 is a schematic block diagram of another embodiment of a Voice Data RF IC 70 that includes the voice baseband processing module 230, the data baseband processing module 232, the interface module 234, the data RF section 236, and the voice RF section 238. The interface module 234 includes a receive/transmit module 350, a control section 352, and a clock section 354.

In an embodiment, the receive/transmit section 350 provides a baseband to RF communication path. When the Voice Data RF IC 70 is a voice receive mode, the receive/transmit section 350 provides the inbound voice symbol stream 260 from the voice RF section 238 to the voice baseband processing module 230. When the Voice Data RF IC 70 is a voice transmit mode, the receive/transmit section 350 provides the outbound voice symbol stream 254 from the voice baseband processing module 230 to the voice RF section 238. When the Voice Data RF IC 70 is a data receive mode, the receive/transmit section 350 provides the inbound data symbol stream 248 from the data RF section 236 to the data baseband processing module 232. When the Voice Data RF IC 70 is a data transmit mode, the receive/transmit section 350 provides the outbound data symbol stream 242 from the data baseband processing module 232 to the data RF section 236.

The receive/transmit section 350 also provides the inbound voice symbol stream 258 from the voice RF section 238 to a first IC pin 362 when the Voice Data RF IC 70 is in an auxiliary voice receive mode. When the Voice Data RF IC 70 is in an auxiliary voice transmit mode, the receive/transmit section 350 provides an auxiliary outbound voice symbol stream from the first IC pin 362 to the voice RF section 238. When the Voice Data RF IC 70 is in an auxiliary data receive mode, the receive/transmit section 350 provides the inbound data symbol stream 246 from the data RF section 236 to a second IC pin 364. When the Voice Data RF IC 70 is in an auxiliary data transmit mode, the receive/transmit section 350 provides auxiliary outbound data symbol stream from the second IC pin 34 to the data RF section 236.

When the Voice Data RF IC 70 is in one of the above mentioned auxiliary modes, each of the baseband modules 230 and 232 and the RF sections 236 and 238 may be individually tested. Alternatively, an off-chip baseband module may be used to produce the outbound voice or data symbol stream 242 or 254 that are subsequently processed by the data or voice RF section 236 or 238. As another alternative, the voice and/or data baseband processing modules 230 and/or 232 may provide the outbound voice and/or data symbol stream 242 or 254 to an off-chip RF section for conversion to RF signals.

The control section 352 provides a voice control communication path 356 for conveying voice control signals between the voice baseband processing module 230 and the voice RF section 238. The voice control signal includes a read bit, address bits and voice control bits of the physical content of a control telegram. The voice baseband processing module 230 outputs the read bit and the address bits. The voice baseband processing module 230 may output the voice control bits for a write operation and the voice RF section 238 may be output the voice control bits for a read operation. Note that the read bit is set to 1 for a read operation and to 0 for a write operation. Further note that the voice control bits are for a voice communication correspond to at least some of the control data of a control telegram as described in the "DigRF BASEBAND/RF DIGITAL INTERFACE SPECIFICATION", Logical, Electrical and Timing Characteristics, EGPRS Version, Digital Interface Working Group, Version 1.12 or subsequent versions thereof.

The control section 352 also provides a data control communication path 358 for conveying data control signals between the data baseband processing module 232 and the data RF section 236. The data control signal includes a read bit, address bits and data control bits of the physical content of a control telegram. The data baseband processing module 232 outputs the read bit and the address bits. The data baseband processing module 232 may output the data control bits for a write operation and the data RF section 236 may be output the data control bits for a read operation. Note that the read bit is set to 1 for a read operation and to 0 for a write operation. Further note that the data control bits are for a data communication correspond to at least some of the control data of a control telegram as described in the "DigRF BASEBAND/RF DIGITAL INTERFACE SPECIFICATION", Logical, Electrical and Timing Characteristics, EGPRS Version, Digital Interface Working Group, Version 1.12 or subsequent versions thereof.

The clock section 354 provides a voice clock communication path 359 for conveying voice clock information (e.g., clock enable, clock signal, and strobe) between the voice baseband processing module 230 and the voice RF section 238. The clock section 354 also provides a data clock communication path 360 for conveying data clock information (e.g., clock enable, clock signal, and strobe) between the data baseband processing module and the data RF section.

Figure 20:
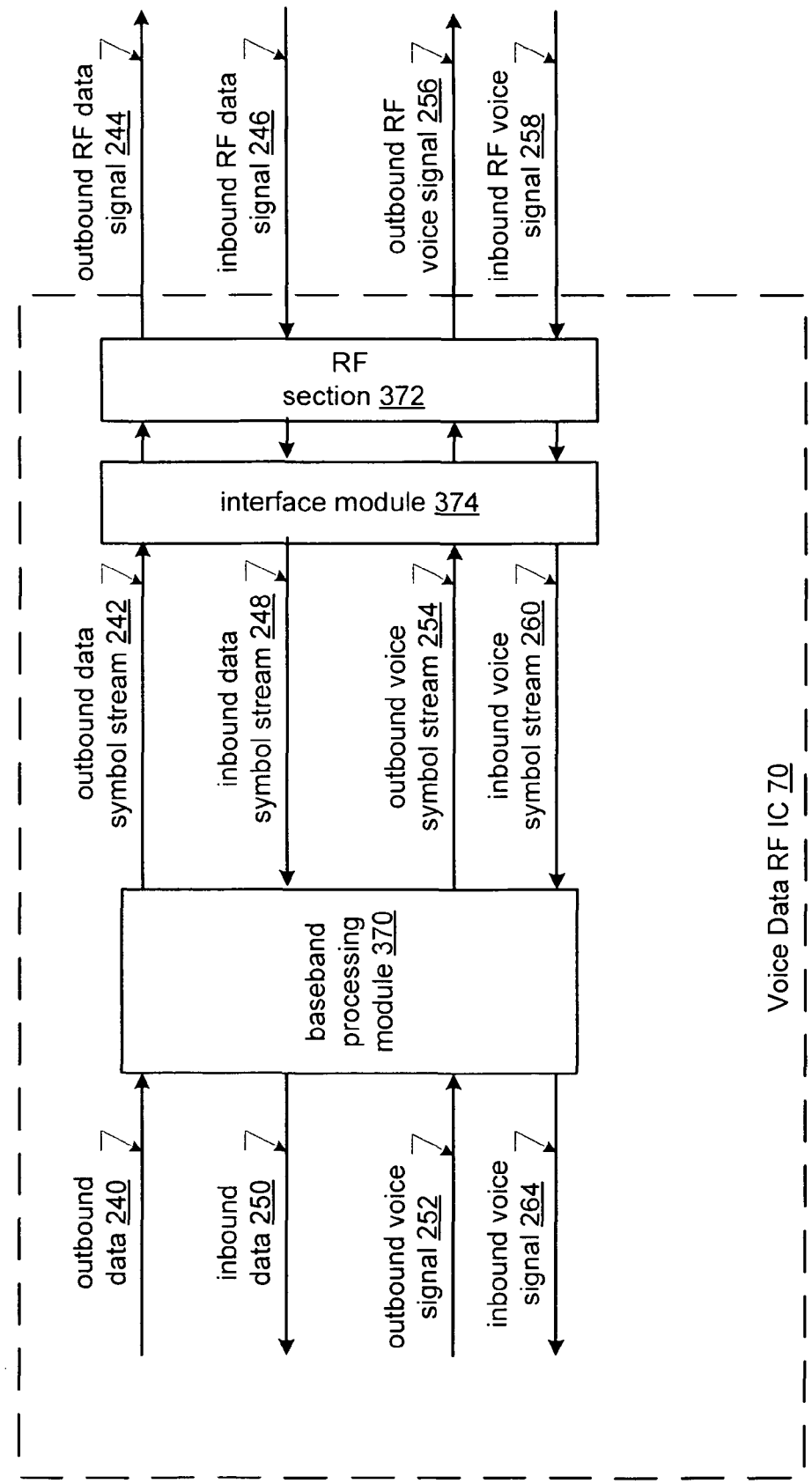
FIG. 20 is a schematic block diagram of another embodiment of a Voice Data RF IC in accordance with the present invention.

FIG. 20 is a schematic block diagram of another embodiment of a Voice Data RF IC 70 that includes a baseband processing module 370, an interface module 374, and an RF section 372. The Voice Data RF IC 70 may be is in a voice mode or a data mode. The voice mode may be activated by the user of the communication device 30 by initiating a cellular telephone call, by receiving a cellular telephone call, by initiating a walkie-talkie type call, by receiving a walkie-talkie type call, by initiating a voice record function, and/or by another voice activation selection mechanism. The data mode may be activated by the user of the communication device 30 by initiating a text message, by receiving a text message, by initiating a web browser function, by receiving a web browser response, by initiating a data file transfer, and/or by another data activation selection mechanism.

When the Voice Data RF IC 70 is in the voice mode, the baseband processing module 370 converts an outbound voice signal 252 into an outbound voice symbol stream 254 in accordance with one or more existing wireless communication standards, new wireless communication standards, modifications thereof, and/or extensions thereof (e.g., WCDMA, etc.) corresponding to a second frequency band (fb$_2$). The baseband processing module 370 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal 252 into the outbound voice symbol stream 254. Depending on the desired formatting of the outbound voice symbol stream 254, the baseband processing module 370 may generate the outbound voice symbol stream 254 as Cartesian coordinates, as Polar coordinates, or as hybrid coordinates. The interface module 374 conveys the outbound voice symbol stream 254 to the RF section 372 when the Voice Data RF IC 70 is in a voice mode.

The RF section 372 converts the outbound voice symbol stream 254 into an outbound RF voice signal 256 in accordance with the one or more existing wireless communication standards, new wireless communication standards, modifications thereof, and/or extensions thereof (e.g., WCDMA, etc.), where the outbound RF voice signal 256 has a carrier frequency in the second frequency band (e.g., 1920-1980 MHz). In one embodiment, the RF section 372 receives the outbound voice symbol stream 254 as Cartesian coordinates. In this embodiment, the RF section 372 mixes the in-phase components of the outbound voice symbol stream 254 with an in-phase local oscillation to produce a first mixed signal and mixes the quadrature components of the outbound voice symbol stream 254 to produce a second mixed signal. The RF section 372 combines the first and second mixed signals to produce an up-converted voice signal. The RF section 372 then amplifies the up-converted voice signal to produce the outbound RF voice signal 256. Note that further power amplification may occur after the output of the RF section 372.

In other embodiments, the RF section 372 receives the outbound voice symbol stream 254 as Polar or hybrid coordinates. In these embodiments, the RF section 372 modulates a local oscillator based on phase information of the outbound voice symbol stream 254 to produce a phase modulated RF signal. The RF section 372 then amplifies the phase modulated RF signal in accordance with amplitude information of the outbound voice symbol stream 254 to produce the outbound RF voice signal 256. Alternatively, the RF section 372 may amplify the phase modulated RF signal in accordance with a power level setting to produce the outbound RF voice signal 256.

For incoming voice signals, the RF section 372 converts the inbound RF voice signal 258, which has a carrier frequency in the second frequency band (e.g., 2110-2170 MHz) into an inbound voice symbol stream 260. In one embodiment, the RF section 372 extracts Cartesian coordinates from the inbound RF voice signal 258 to produce the inbound voice symbol stream 260. In another embodiment, the RF section 372 extracts Polar coordinates from the inbound RF voice signal 258 to produce the inbound voice symbol stream 260. In yet another embodiment, the RF section 372 extracts hybrid coordinates from the inbound RF voice signal 258 to produce the inbound voice symbol stream 260. The interface module 374 provides the inbound voice symbol stream 260 to the baseband processing module 370.

The baseband processing module 370 converts the inbound voice symbol stream 260 into an inbound voice signal 264. The baseband processing module 370 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream 260 into the inbound voice signal 264.

When the Voice Data RF IC 70 is in the data mode (e.g., transceiving email, text message, web browsing, and/or non-real-time data), the baseband processing module 370 converts outbound data 240 into an outbound data symbol stream 242 in accordance with one or more existing wireless communication standards, new wireless communication standards, modifications thereof, and/or extensions thereof (e.g., EDGE, GPRS, etc.) corresponding to a first frequency band ($fb_1$). The baseband processing module 370 may perform one or more of scrambling, encoding, constellation mapping, modulation, frequency spreading, frequency hopping, beamforming, space-time-block encoding, space-frequency-block encoding, and/or digital baseband to IF conversion to convert the outbound data 240 into the outbound data symbol stream 242. Depending on the desired formatting of the outbound data symbol stream 242, the baseband processing module 370 may generate the outbound data symbol stream 242 as Cartesian coordinates, as Polar coordinates, or as hybrid coordinates. The interface module 374 conveys the outbound data symbol stream 242 to the data RF section 236.

The RF section 372 converts the outbound data symbol stream 242 into an outbound RF data signal 244 having a carrier frequency in the first frequency band (e.g., 890-915 MHz) in accordance with the one or more existing wireless communication standards, new wireless communication standards, modifications thereof, and/or extensions thereof (e.g., EDGE, GPRS, etc.). In one embodiment, the data RF section 236 receives the outbound data symbol stream 242 as Cartesian coordinates. In this embodiment, the RF section 372 mixes the in-phase components of the outbound data symbol stream 242 with an in-phase local oscillation to produce a first mixed signal and mixes the quadrature components of the outbound data symbol stream 242 to produce a second mixed signal. The RF section 372 combines the first and second mixed signals to produce an up-converted data signal. The RF section 372 then amplifies the up-converted data signal to produce the outbound RF data signal 244. Note that further power amplification may occur after the output of the RF section 372.

In other embodiments, the RF section 372 receives the outbound data symbol stream 242 as Polar or hybrid coordinates. In these embodiments, the RF section 372 modulates a local oscillator based on phase information of the outbound data symbol stream 242 to produce a phase modulated RF signal. The RF section 372 then amplifies the phase modulated RF signal in accordance with amplitude information of the outbound data symbol stream 242 to produce the outbound RF data signal 244. Alternatively, the RF section 372 may amplify the phase modulated RF signal in accordance with a power level setting to produce the outbound RF data signal 244.

For incoming data communications, the RF section 372 converts the inbound RF data signal 246, which has a carrier frequency in the first frequency band (e.g., 890-915 MHz) into an inbound data symbol stream 248. In one embodiment, the RF section 372 extracts Cartesian coordinates from the inbound RF data signal 246 to produce the inbound data symbol stream 248. In another embodiment, the RF section 372 extracts Polar coordinates from the inbound RF data signal 246 to produce the inbound data symbol stream 248. In yet another embodiment, the RF section 372 extracts hybrid coordinates from the inbound RF data signal 246 to produce the inbound data symbol stream 248. The interface module 374 provides the inbound data symbol stream 248 to the baseband processing module 370.

The baseband processing module 370 converts the inbound data symbol stream 248 into inbound data 250. The baseband processing module 370 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound data symbol stream 248 into the inbound data 250.

Figure 21:
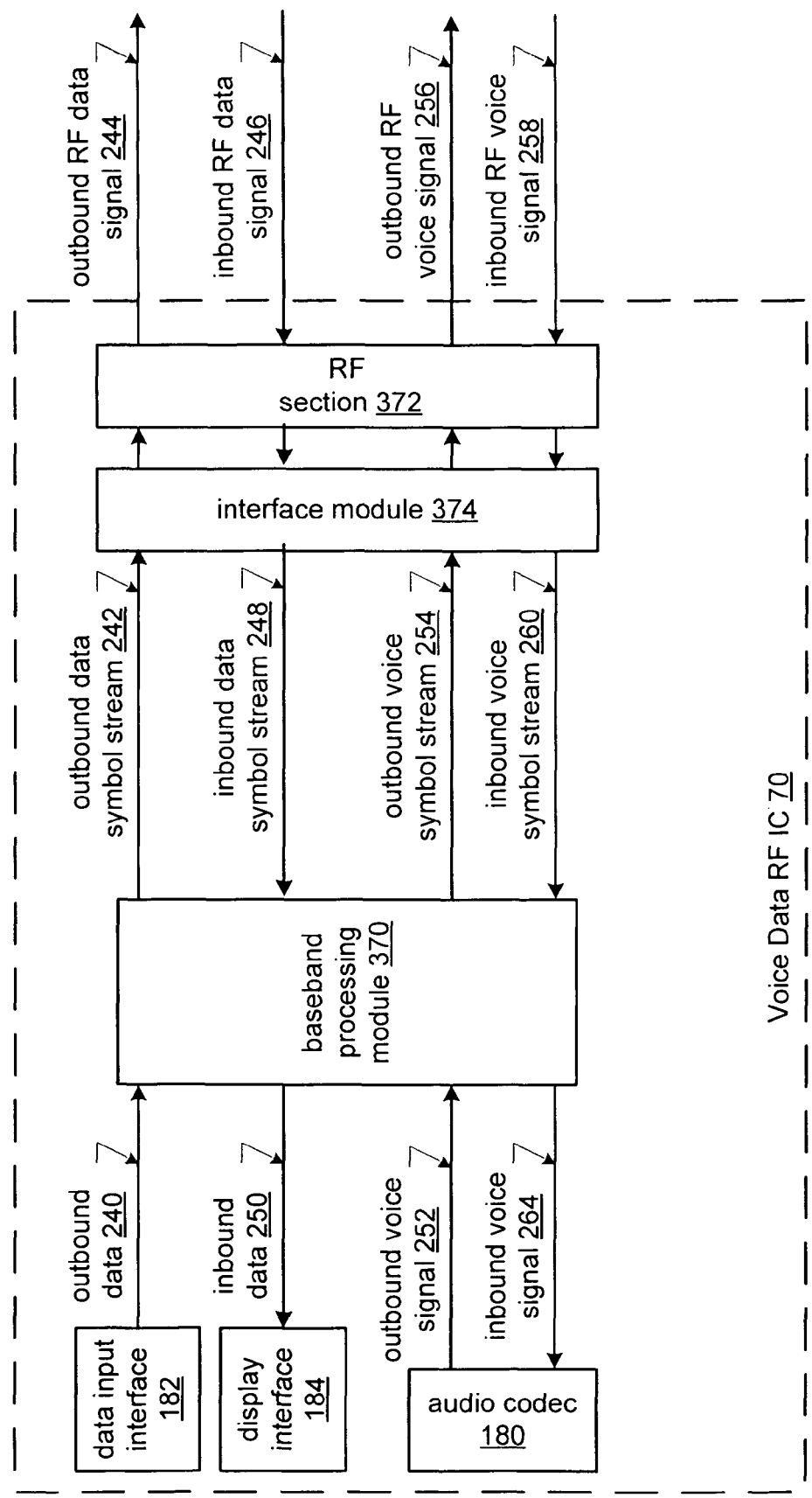
FIG. 21 is a schematic block diagram of another embodiment of a Voice Data RF IC in accordance with the present invention.

FIG. 21 is a schematic block diagram of another embodiment of a Voice Data RF IC 70 50 that includes the baseband processing module 370, the RF section 372, the interface module 374, a data input interface 182, a display interface 184, and an audio codec section 180. In this embodiment, the RF section 372, the interface module 374 and the baseband processing module 370 function as previously described with reference to FIG. 20.

In this embodiment, the data input interface 182 receives the outbound data 240 for a component of the communication device 30. For example, the data input interface 182 may be a keypad interface, a keyboard interface, a touch screen interface, a serial interface (e.g., USB, etc.), a parallel interface, and/or any other type of interface for receiving data. The display interface 184 is coupled to provide the inbound data 250 to one or more displays. The display interface 184 may be a liquid crystal (LCD) display interface, a plasma display interface, a digital light project (DLP) display interface, a mobile industry processor interface (MIPI), and/or any other type of portable video display interface.

The audio codec 180 is coupled to provide the outbound voice signal 252 to the baseband processing module 370 and to receive the inbound voice signal 264 from the baseband processing module 370. In one embodiment, the audio codec section 180 receives an analog voice input signal from a microphone. The audio codec section 180 converts the analog voice input signal into a digitized voice signal that is provided to the voice baseband processing module 170 as the outbound voice signal 252. The audio codec section 180 may perform an analog to digital conversion to produce the digitized voice signal from the analog voice input signal, may perform pulse code modulation (PCM) to produce the digitized voice signal, and/or may compress a digital representation of the analog voice input signal to produce the digitized voice signal.

The audio codec section 180 processes the inbound voice signal 264 to produce an analog inbound voice signal that may be provided to a speaker. The audio codec section 86 may process the inbound voice signal 264 by performing a digital to analog conversion, by PCM decoding, and/or by decompressing the inbound voice signal 264.

Figure 22:
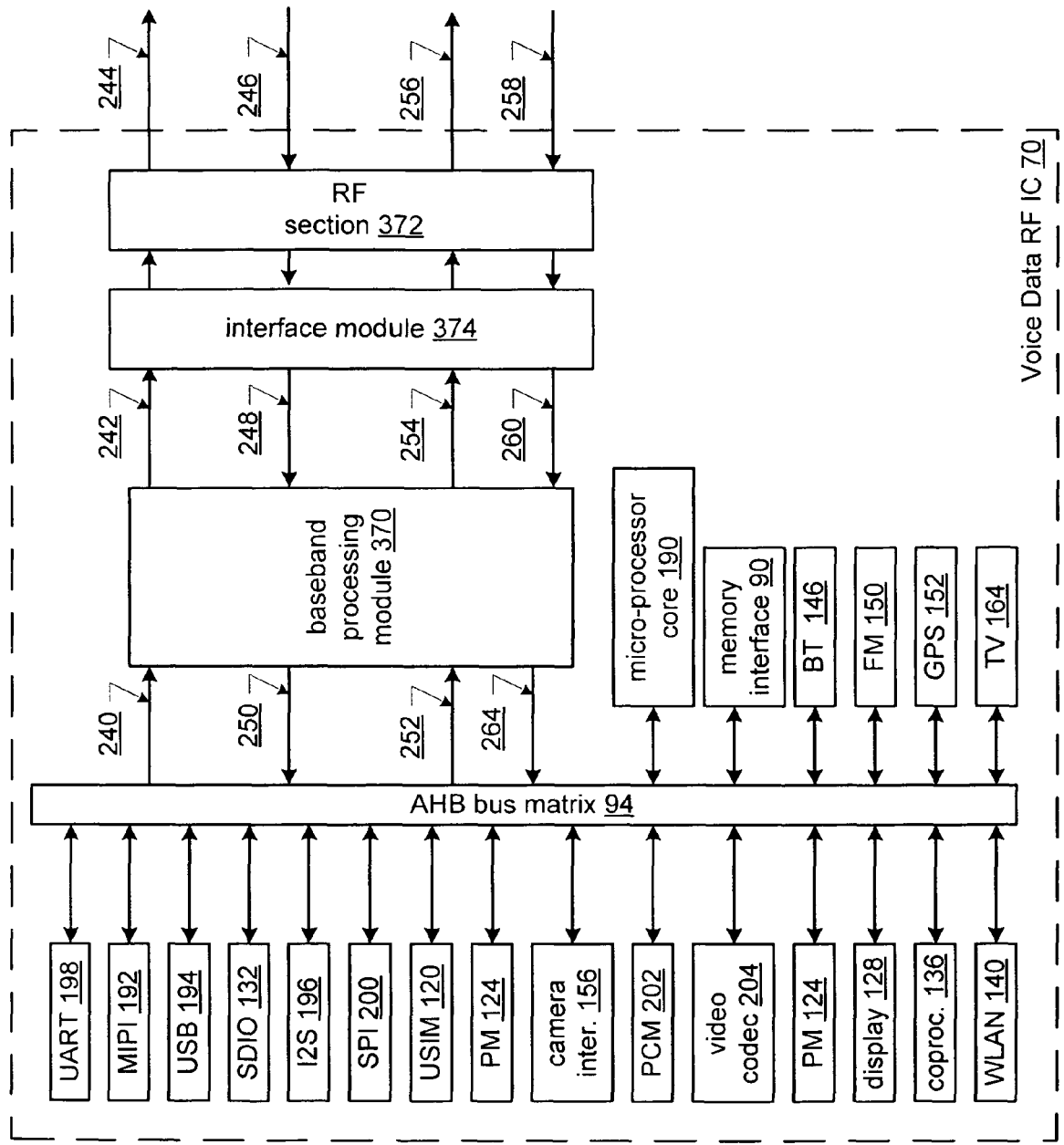
FIG. 22 is a schematic block diagram of another embodiment of a Voice Data RF IC in accordance with the present invention.

FIG. 22 is a schematic block diagram of another embodiment of a Voice Data RF IC 70 includes the RF section 372, the interface module 234, the baseband processing module 370, the AHB bus matrix 94, the microprocessor core 190, the memory interface 90, and one or more of a plurality of interface modules. The plurality of interface modules includes the mobile industry processor interface (MIPI) interface 192, the universal serial bus (USB) interface 194, the secure digital input/output (SDIO) interface 132, the I2S interface 196, the Universal Asynchronous Receiver-Transmitter (UART) interface 198, the Serial Peripheral Interface (SPI) interface 200, the power management (PM) interface 124, the universal subscriber identity module (USIM) interface 120, the camera interface 156, the pulse code modulation (PCM) interface 202, the video codec 204, the second display interface 126, the coprocessor interface 136, the WLAN interface 140, the Bluetooth interface 146, the FM interface 150, the GPS interface 152, the camcorder interface 160, and the TV interface 164.

Figure 23:
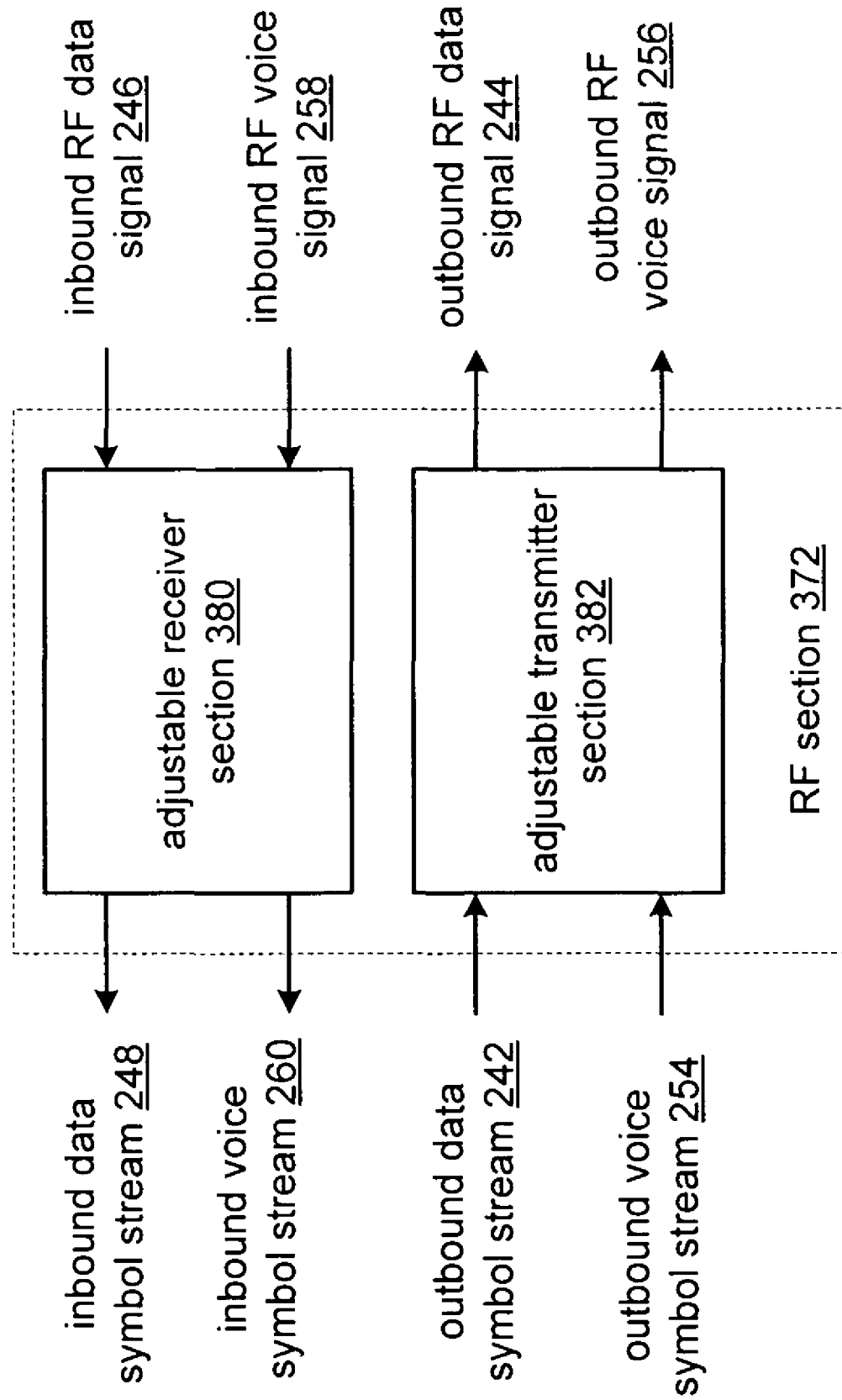
FIG. 23 is a schematic block diagram of an embodiment of an RF section in accordance with the present invention.

FIG. 23 is a schematic block diagram of an embodiment of an RF section 372 that includes an adjustable receiver section 380 and an adjustable transmitter section 382. The adjustable receiver section 380 and the adjustable transmitter section 382 may be implemented in a variety of ways. For example, FIGS. 17 and 18 illustrate two embodiments of an adjustable transmitter section 382.

As another example, the adjustable receiver section 380 is tuned in accordance with a frequency band of the inbound RF voice signal 258 (e.g., 2110-2170 MHz of the second frequency band) for converting the inbound RF voice signal 258 into the inbound voice symbol stream 260. The tuning of the adjustable receiver section 380 includes setting the local oscillation to correspond to the carrier frequency of the inbound RF voice signal 258, tuning the low noise amplifier to the second frequency band, tuning a band pass filter to the second frequency band, and/or adjusting mixers of a down conversion module based on the second frequency band.

In this example, the adjustable receiver section 380 may also be tuned in accordance with a frequency band of the inbound RF data signal 246 (e.g., 935-960 MHz of the first frequency band) for converting the inbound RF data signal 246 into the inbound data symbol stream 248. The tuning of the adjustable receiver section 380 includes setting the local oscillation to correspond to the carrier frequency of the inbound RF data signal 246, tuning the low noise amplifier to the first frequency band, tuning a band pass filter to the first frequency band, and/or adjusting mixers of a down conversion module based on the first frequency band.

As a continuation of the above example, the adjustable transmitter section 382 is tuned in accordance with a frequency band of the outbound RF voice signal 256 (e.g., 1920-1980 MHz of the second frequency band) for converting the outbound voice symbol stream 254 into the outbound RF voice signal 256. The tuning of the adjustable transmitter section 382 includes setting the local oscillation to correspond to the carrier frequency of the outbound RF voice signal 256, tuning the power amplifier to the second frequency band, tuning a band pass filter to the second frequency band, and/or adjusting mixers of an up conversion module based on the second frequency band.

In this example, the adjustable transmitter section 382 is tuned in accordance with a frequency band of the outbound RF data signal 244 (e.g., 890-915 MHz of the first frequency band) for converting the outbound data symbol stream 242 into the outbound RF data signal 244. The tuning of the adjustable transmitter section 382 includes setting the local oscillation to correspond to the carrier frequency of the outbound RF data signal 244, tuning the power amplifier to the first frequency band, tuning a band pass filter to the first frequency band, and/or adjusting mixers of an up conversion module based on the first frequency band.

Figure 24:
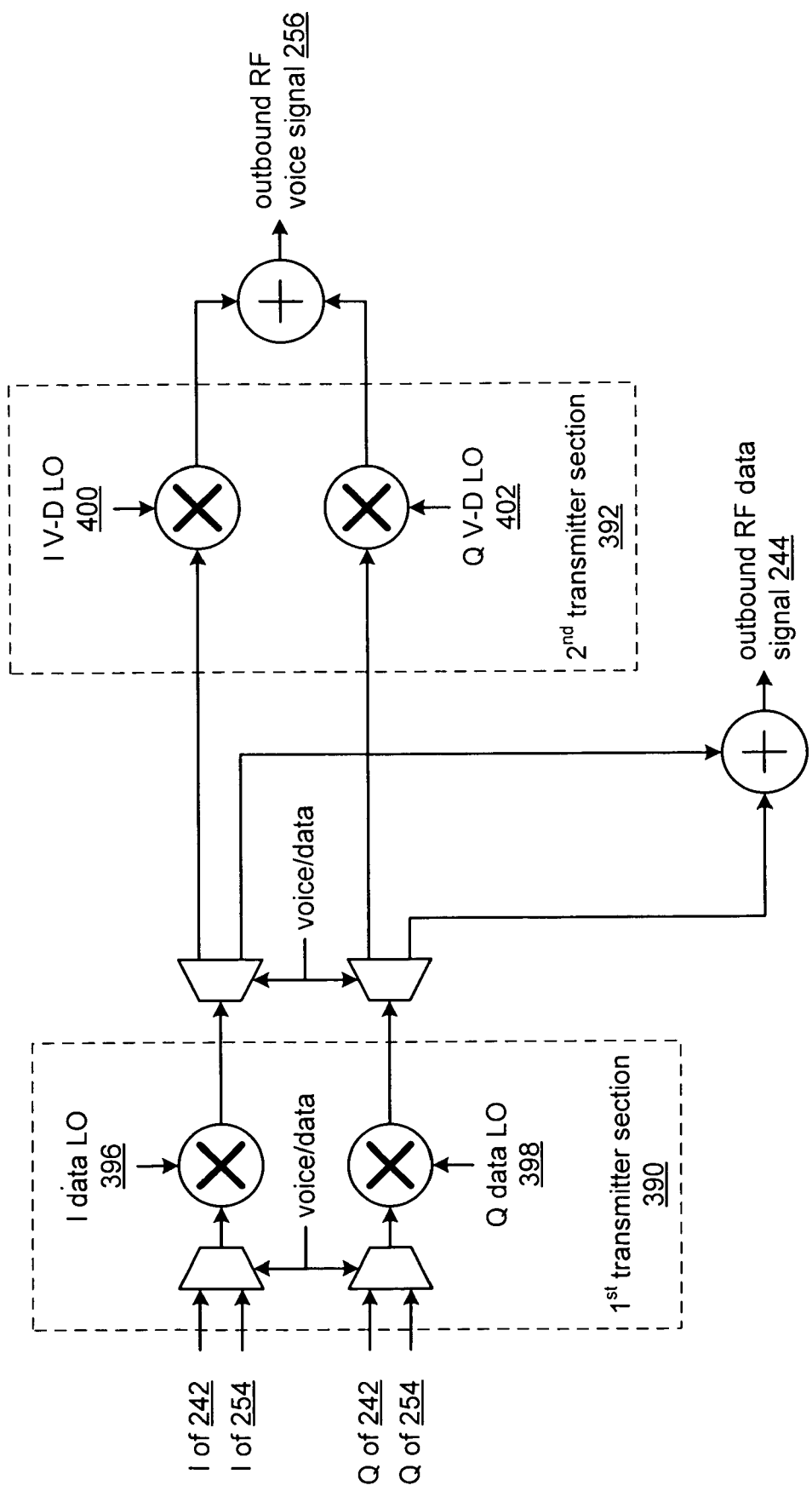
FIG. 24 is a schematic block diagram of another embodiment of an RF section in accordance with the present invention.

FIG. 24 is a schematic block diagram of another embodiment of an RF section 372 that includes a $1^{st}$ transmitter section 390, a $2^{nd}$ transmitter section 392, multiplexers, a $1^{st}$ adder, and a $2^{nd}$ adder. The $1^{st}$ transmitter section 390 includes a pair of multiplexers and a pair of mixers. The $2^{nd}$ transmitter section 392 includes a pair of mixers.

When the Voice Data RF IC 70 is in the data mode, the multiplexers of the $1^{st}$ transmitter section 390 provide the in-phase (I) component of the outbound data symbol stream 242 to a $1^{st}$ mixer and provide the quadrature (Q) component of the outbound data symbol stream 242 to a $2^{nd}$ mixer. The $1^{st}$ mixer mixes the I component of the data symbol stream 242 with an I component of a data local oscillation (LO) 396 to produce a first mixed signal. The $2^{nd}$ mixer mixes the Q component of the data symbol stream 242 with a Q component of the data LO 396 to produce a second mixed signal. The data LO 396 has a frequency corresponding to the desired carrier frequency of the outbound RF data signal 244 (e.g., 890-915 MHz of the first frequency band).

The multiplexer between the $1^{st}$ and $2^{nd}$ transmitter sections 390 and 392 provide the $1^{st}$ and $2^{nd}$ mixed signals to the first adder. The first adder sums the $1^{st}$ and $2^{nd}$ mixed signals to the produce the outbound RF data signal 244.

When the Voice Data RF IC 70 is in the voice mode, the multiplexers of the $1^{st}$ transmitter section 390 provide the in-phase (I) component of the outbound voice symbol stream 254 to a $1^{st}$ mixer and provide the quadrature (Q) component of the outbound voice symbol stream 254 to a $2^{nd}$ mixer. The $1^{st}$ mixer mixes the I component of the voice symbol stream 242 with the I component of the data LO 396 to produce a $1^{st}$ mixed signal. The $2^{nd}$ mixer mixes the Q component of the voice symbol stream 254 with a Q component of the data LO 396 to produce a $2^{nd}$ mixed signal. The data LO 396 has a frequency corresponding to the desired carrier frequency of the outbound RF data signal 244 (e.g., 890-915 MHz of the first frequency band).

The multiplexer between the $1^{st}$ and $2^{nd}$ transmitter sections 390 and 392 provide the $1^{st}$ and $2^{nd}$ mixed signals to the $2^{nd}$ transmitter section 392. The $1^{st}$ mixer mixes the $1^{st}$ mixed signal with an in-phase (I) component of a voice/data local oscillation (V-D LO) 400 to produce a $3^{rd}$ mixed signal. The $2^{nd}$ mixer mixes the $2^{nd}$ mixed signal with a quadrature (Q)

component of the V-D LO 400 to produce a $4^{th}$ mixed signal. The V-D LO 400 has a frequency corresponding to the desired carrier frequency of the outbound RF voice signal 256 (e.g., 1920-1980 MHz of the second frequency band) minus the carrier frequency of the RF data signal 244 (e.g., 890-915 MHz of the first frequency band). For example, the V-D LO 400 may have a frequency in the range of 1010-1065 MHz.

The $2^{nd}$ adder sums the $3^{rd}$ and $4^{th}$ mixed signals to the produce the outbound RF voice signal 256.

Figure 25:
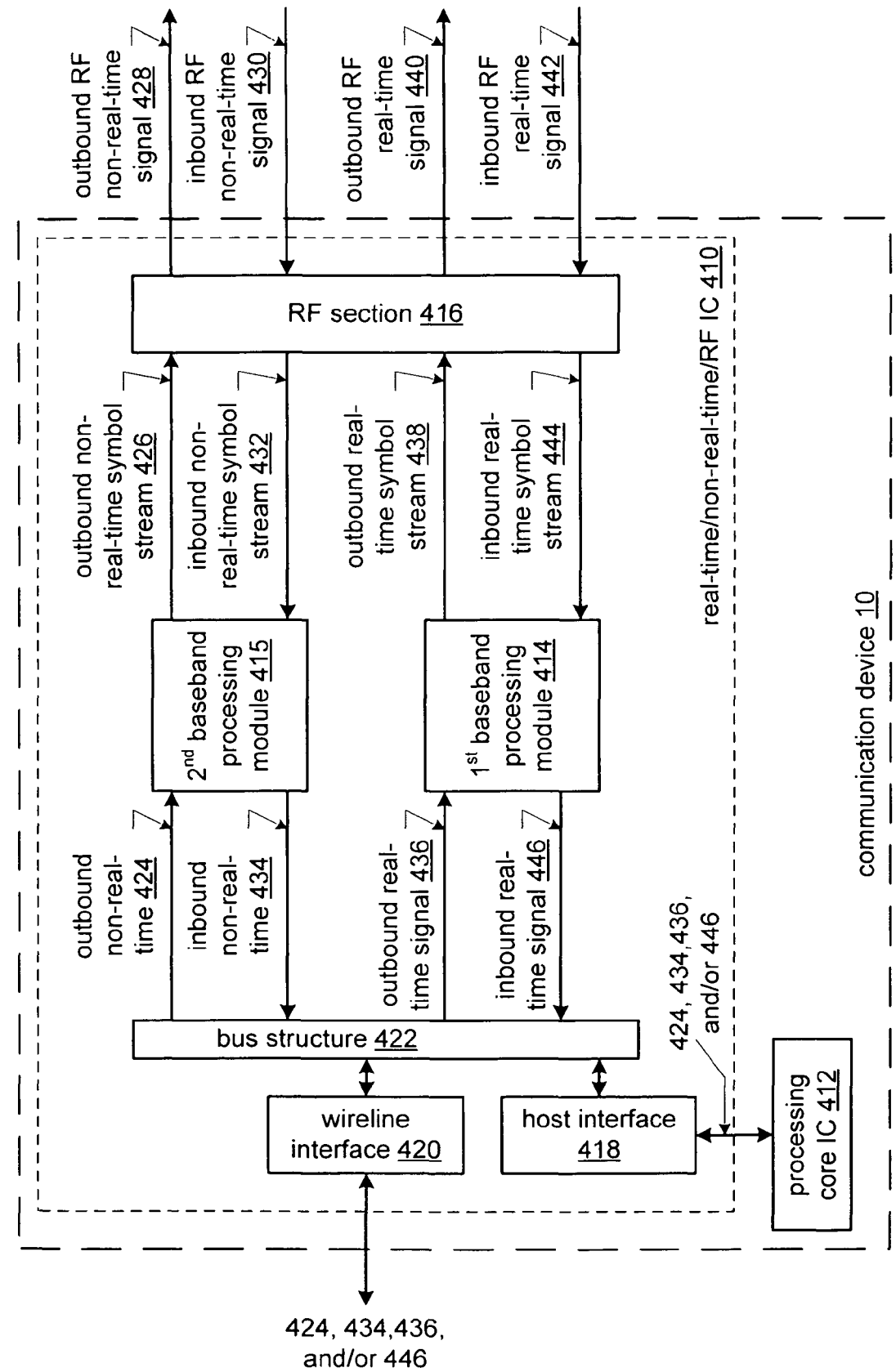
FIG. 25 is a schematic block diagram of another embodiment of a communication device in accordance with the present invention.

FIG. 25 is a schematic block diagram of another embodiment of a communication device 10 that includes a real-time/non-real-time RF IC 410 and a processing core IC 412. The processing core IC 410 may include one or more processing modules. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

The real-time/non-real-time RF IC 410 includes a $1^{st}$ baseband processing module 414, a $2^{nd}$ baseband processing module 415, an RF section 416, a bus structure 422, a wireline interface 420, and a host interface 418. The first and second baseband processing modules 414 and 415 may be separate processing modules or contained in a shared processing module. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

When the IC 410 is in a real-time mode, the $1^{st}$ baseband processing module 414 receives an outbound real-time signal 436 from the wireline connection 28 the wireline interface 420 and/or from the processing core IC via the host interface 418. The $1^{st}$ baseband processing module 414 converts the outbound real-time signal 436 (e.g., voice signal, video signal, multimedia signal, etc.) into an outbound real-time symbol stream 438 in accordance with one or more existing wireless communication standards, new wireless communication standards, modifications thereof, and/or extensions thereof (e.g., WCDMA, etc.) corresponding to a first ($fb_1$) or a second frequency band ($fb_2$). The $1^{st}$ baseband processing module 414 may perform one or more of scrambling, encoding, constellation mapping, modulation, frequency spreading, frequency hopping, beamforming, space-time-block encoding, space-frequency-block encoding, and/or digital baseband to IF conversion to convert the outbound real-time signal 436 into the outbound real-time symbol stream 438. Depending on the desired formatting of the outbound real-time symbol stream 438, the $1^{st}$ baseband processing module 414 may generate the outbound real-time symbol stream 438 as Cartesian coordinates, as Polar coordinates, or hybrid coordinates.

The RF section 416 converts the outbound real-time symbol stream 438 into an outbound RF real-time signal 440 in accordance with the one or more existing wireless communication standards, new wireless communication standards, modifications thereof, and/or extensions thereof (e.g., WCDMA, etc.), where the outbound RF voice signal 256 has a carrier frequency in the first frequency band (e.g., 890-915 MHz) or the second frequency band (e.g., 1920-1980 MHz). In one embodiment, the RF section 416 receives the outbound real-time symbol stream 438 as Cartesian coordinates. In this embodiment, the RF section 416 mixes the in-phase components of the outbound real-time symbol stream 438 with an in-phase local oscillation to produce a first mixed signal and mixes the quadrature components of the outbound real-time symbol stream 438 to produce a second mixed signal. The RF section 416 combines the first and second mixed signals to produce an up-converted voice signal. The RF section 416 then amplifies the up-converted voice signal to produce the outbound RF real-time signal 440. Note that further power amplification may occur after the output of the RF section 416.

In other embodiments, the RF section 416 receives the outbound real-time symbol stream 438 as Polar or hybrid coordinates. In these embodiments, the RF section 416 modulates a local oscillator based on phase information of the outbound real-time symbol stream 438 to produce a phase modulated RF signal. The RF section 416 then amplifies the phase modulated RF signal in accordance with amplitude information of the outbound real-time symbol stream 438 to produce the outbound RF real-time signal 440. Alternatively, the RF section 416 may amplify the phase modulated RF signal in accordance with a power level setting to produce the outbound RF real-time signal 440.

For incoming voice real-time, the RF section 416 converts the inbound RF real-time signal 442, which has a carrier frequency in the first frequency band (e.g., 935-960 MHz) or the second frequency band (e.g., 2110-2170 MHz) into an inbound real-time symbol stream 444. In one embodiment, the RF section 416 extracts Cartesian coordinates from the inbound RF real-time signal 442 to produce the inbound real-time symbol stream 444. In another embodiment, the RF section 416 extracts Polar coordinates from the inbound RF real-time signal 442 to produce the inbound real-time symbol stream 442. In yet another embodiment, the RF section 416 extracts hybrid coordinates from the inbound RF real-time signal 442 to produce the inbound real-time symbol stream 444.

The $1^{st}$ baseband processing module 414 converts the inbound real-time symbol stream 444 into an inbound real-time signal 446. The $1^{st}$ baseband processing module 414 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound real-time symbol stream 444 into the inbound real-time signal 446. The $1^{st}$ baseband processing module 414 may provide the inbound real-time signal 446 to wireline interface 420 (e.g., USB, SPI, I2S, etc.) and/or the host interface 418 via the bus structure 422.

For an outgoing data communication (e.g., email, text message, web browsing, and/or non-real-time data), the $2^{nd}$ baseband processing module 415 receives outbound non-real-time data 424 from the wireline interface 420 and/or the host interface 418. The $2^{nd}$ baseband processing module 415 converts outbound non-real-time data 424 into an outbound non-real-time data symbol stream 426 in accordance with one or more existing wireless communication standards, new wireless communication standards, modifications thereof, and/or extensions thereof (e.g., EDGE, GPRS, etc.) corresponding to a first frequency band ($fb_1$) and/or a second frequency band. The $2^{nd}$ baseband processing module 415 may perform one or more of scrambling, encoding, constellation mapping, modulation, frequency spreading, frequency hopping, beamforming, space-time-block encoding, space-frequency-block encoding, and/or digital baseband to IF conversion to convert the outbound non-real-time data 424 into the outbound non-real-time data symbol stream 426. Depending on the desired formatting of the outbound non-real-time data symbol stream 426, the $2^{nd}$ baseband processing module 415 may generate the outbound non-real-time data symbol stream 426 as Cartesian coordinates, as Polar coordinates, or as hybrid coordinates.

The RF section 416 converts the outbound non-real-time data symbol stream 426 into an outbound RF non-real-time data signal 428 having a carrier frequency in the first frequency band (e.g., 890-915 MHz) and/or the second frequency band (e.g., 1920-1980 MHz) in accordance with the one or more existing wireless communication standards, new wireless communication standards, modifications thereof, and/or extensions thereof (e.g., EDGE, GPRS, etc.). In one embodiment, the RF section 416 receives the outbound non-real-time data symbol stream 426 as Cartesian coordinates. In this embodiment, the RF section 416 mixes the in-phase components of the outbound non-real-time data symbol stream 426 with an in-phase local oscillation to produce a first mixed signal and mixes the quadrature components of the outbound non-real-time data symbol stream 426 to produce a second mixed signal. The RF section 416 combines the first and second mixed signals to produce an up-converted data signal. The RF section 416 then amplifies the up-converted data signal to produce the outbound RF non-real-time data signal 428. Note that further power amplification may occur after the output of the RF section 416.

In other embodiments, the RF section 416 receives the outbound non-real-time data symbol stream 426 as Polar or hybrid coordinates. In these embodiments, the RF section 416 modulates a local oscillator based on phase information of the outbound non-real-time data symbol stream 426 to produce a phase modulated RF signal. The RF section 416 then amplifies the phase modulated RF signal in accordance with amplitude information of the outbound non-real-time data symbol stream 426 to produce the outbound RF non-real-time data signal 428. Alternatively, the RF section 416 may amplify the phase modulated RF signal in accordance with a power level setting to produce the outbound RF non-real-time data signal 428.

For incoming data communications, the RF section 416 converts the inbound RF non-real-time data signal 430, which has a carrier frequency in the first frequency band (e.g., 890-915 MHz) and/or in the second frequency band (e.g., 2110-2170 MHz) into an inbound non-real-time data symbol stream 432. In one embodiment, the RF section 416 extracts Cartesian coordinates from the inbound RF non-real-time data signal 430 to produce the inbound non-real-time data symbol stream 432. In another embodiment, the RF section 416 extracts Polar coordinates from the inbound RF non-real-time data signal 430 to produce the inbound non-real-time data symbol stream 432. In yet another embodiment, the RF section 416 extracts hybrid coordinates from the inbound RF non-real-time data signal 430 to produce the inbound non-real-time data symbol stream 432.

The $2^{nd}$ baseband processing module 415 converts the inbound non-real-time data symbol stream 432 into inbound non-real-time data 434. The $2^{nd}$ baseband processing module 415 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound non-real-time data symbol stream 432 into the inbound non-real-time data 434. The $2^{nd}$ baseband processing module 415 may provide the inbound non-real-time data 434 to the wireline interface 420 and/or to the host interface 418.

Figure 26:
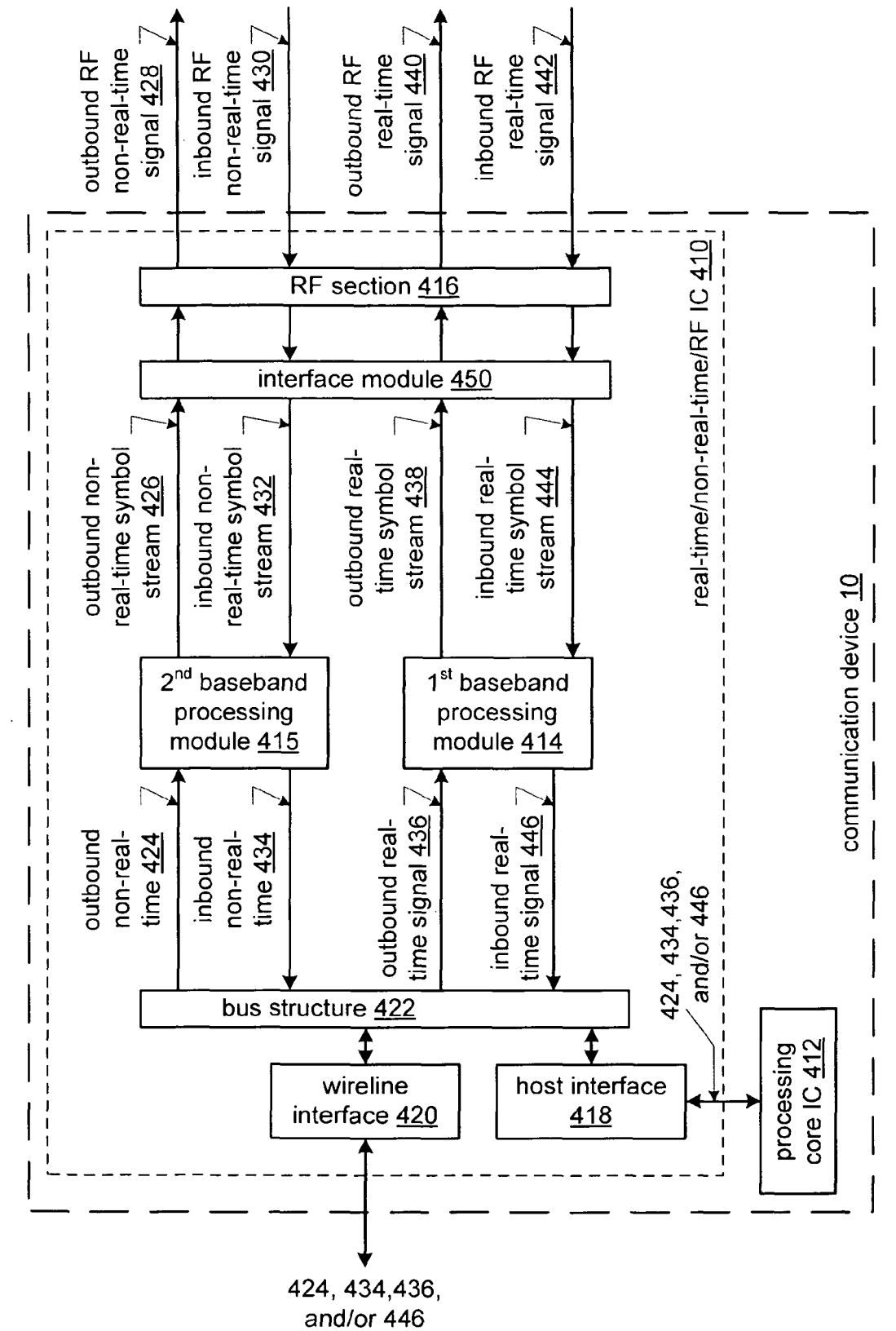
FIG. 26 is a schematic block diagram of another embodiment of a communication device in accordance with the present invention.

FIG. 26 is a schematic block diagram of another embodiment of a communication device 10 that includes a real-time/non-real-time RF IC 410 and a processing core IC 412. The real-time/non-real-time RF IC 410 includes the $1^{st}$ baseband processing module 414, the $2^{nd}$ baseband processing module 415, the RF section 416, the bus structure 422, the wireline interface 420, the host interface 418, and an interface module 450.

In this embodiment, the real-time/non-real-time RF IC 410 may be is in a real-time mode or a non-real time mode. The real-time mode may be activated by the user of the communication device 10 and/or 30 by initiating a cellular telephone call, by receiving a cellular telephone call, by initiating a walkie-talkie type call, by receiving a walkie-talkie type call, by initiating a voice record function, by receiving and/or transmitting streaming video, and/or by another voice activation selection mechanism. The non-real-time mode may be activated by the user of the communication device 10 and/or 30 by initiating a text message, by receiving a text message, by initiating a web browser function, by receiving a web browser response, by initiating a data file transfer, and/or by another data activation selection mechanism.

When the real-time/non-real-time RF IC 410 is in the real-time mode, the interface module 450 provides the inbound real-time symbols 444 from the RF section 416 to the $1^{st}$ baseband processing module 414 and provides the outbound real-time symbols 438 from the $1^{st}$ baseband processing module 414 to the RF section 416. When the real-time/non-real-time RF IC 410 is in the non-real-time mode, the interface module 450 provides the inbound non-real-time symbols 432 from the RF section 416 to the $2^{nd}$ baseband processing module 415 and provides the outbound non-real-time symbols 426 from the $2^{nd}$ baseband processing module 415 to the RF section 416. Otherwise, the $1^{st}$ baseband processing module

414, the $2^{nd}$ baseband processing module 415, and the RF section 416 function as previously described with reference to FIG. 25.

Figure 27:
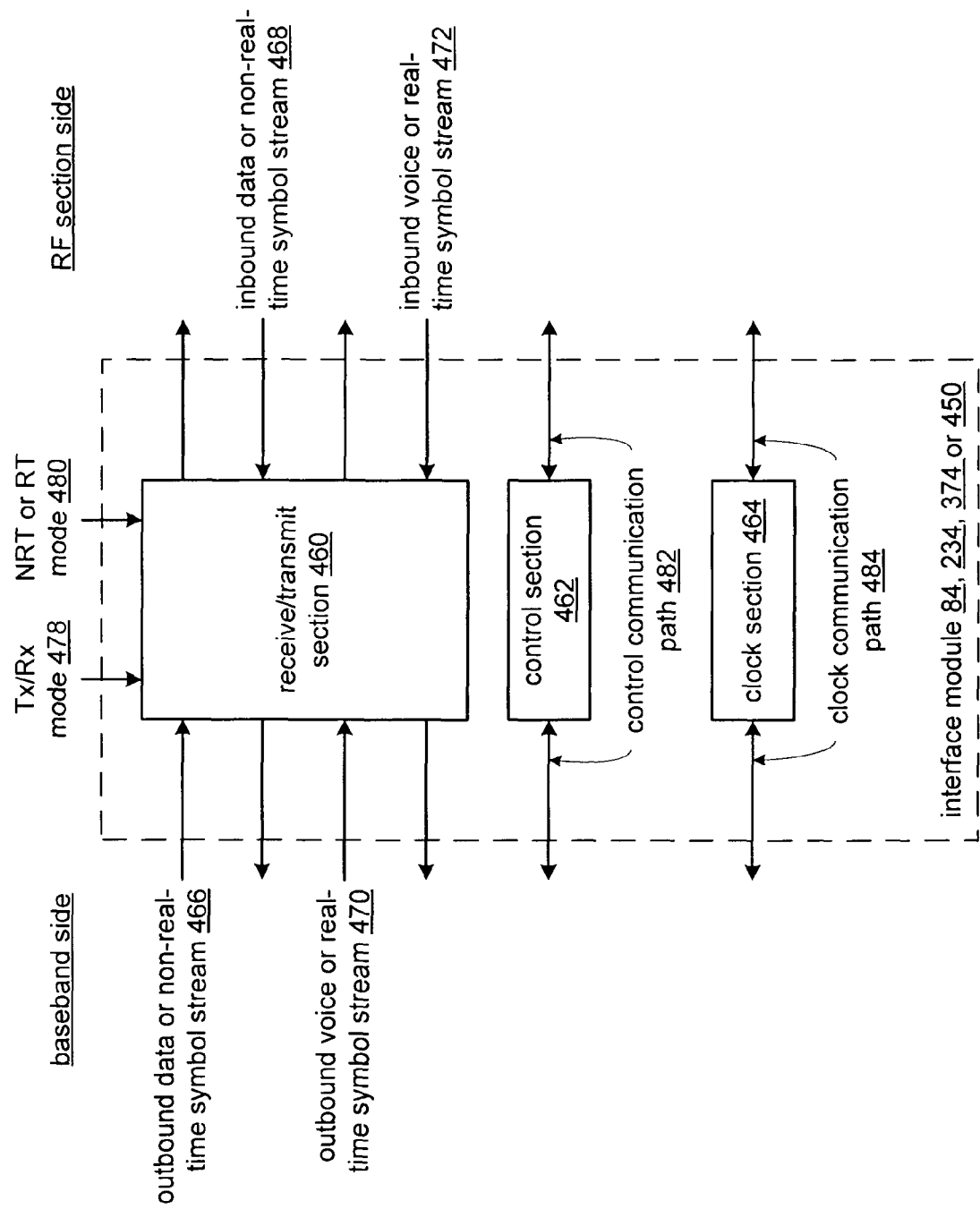
FIG. 27 is a schematic block diagram of an embodiment of an interface module in accordance with the present invention.

FIG. 27 is a schematic block diagram of an embodiment of an interface module 84, 234, 374, or 450 that includes a receive/transmit section 460, a control section 462, and a clock section 464. The control section 462 provides a control communication path 482 between the baseband processing module and the RF section or circuit without the need for IC pads, line drivers, and/or voltage level shifting circuits as are often needed for IC to IC communication. The clock section 464 provides a clock communication path 484 between the baseband processing module and the RF section or circuit without the need for IC pads, line drivers, and/or voltage level shifting circuits as are often needed for IC to IC communication. The control section 462 will be described in greater detail with reference to FIG. 30 and the clock section 464 will be described in greater detail with reference to FIGS. 27-29.

Figure 31:
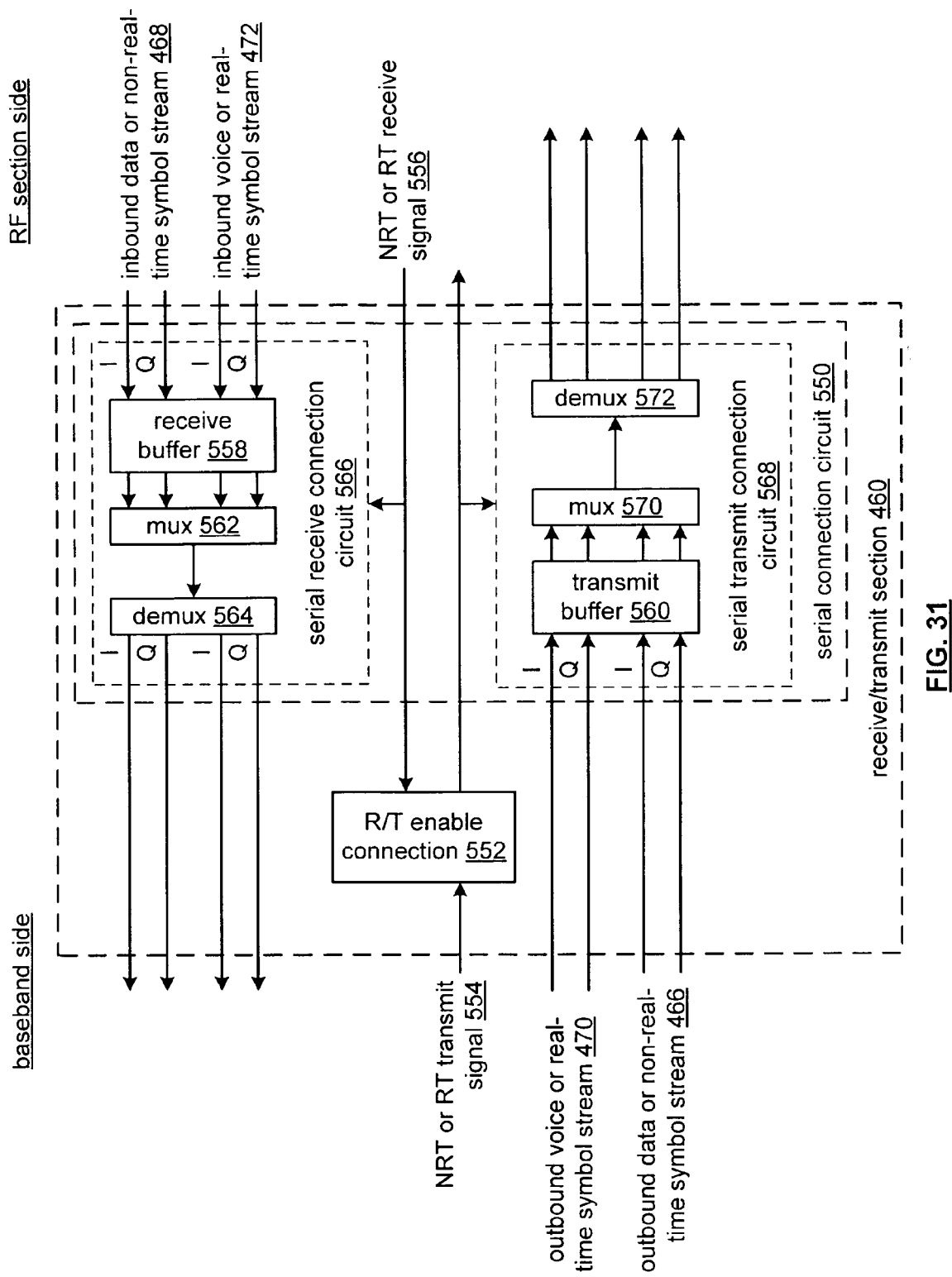
FIG. 31 is a schematic block diagram of an embodiment of a transmit/receive section of an interface module in accordance with the present invention.

The receive/transmit section 460, which will be described in greater detail with reference to FIG. 31, provides the stream of inbound symbols (e.g., inbound data or non-real-time symbol stream 468 and/or the inbound voice or real-time symbol stream 472) from the RF circuit to the baseband processing module when the IC 50, 70 and/or 410 is in a receive mode. This is done without the need for IC pads, line drivers, and/or voltage level shifting circuits as are often needed for IC to IC communication. Note that the inbound data or non-real-time symbol stream 468 includes one or more of the inbound data and/or non-real-time symbol streams 104, 248, 432. Further note that the inbound voice or real-time symbol stream 472 includes one or more of the inbound voice and/or real-time symbol streams 100, 260, 444.

The receive/transmit section 460 provides the stream of outbound symbols (e.g., outbound data or non-real-time data symbol stream 466 and/or outbound voice or real-time symbol stream 470) from the baseband processing module to the RF circuit when the IC 50, 70, and/or 410 in a transmit mode. Note that the outbound data or non-real-time symbol stream 466 includes one or more of the outbound data and/or non-real-time symbol streams 110, 242, 426. Further note that the inbound voice or real-time symbol stream 472 includes one or more of the inbound voice and/or real-time symbol streams 98, 254, 438.

Figure 28:
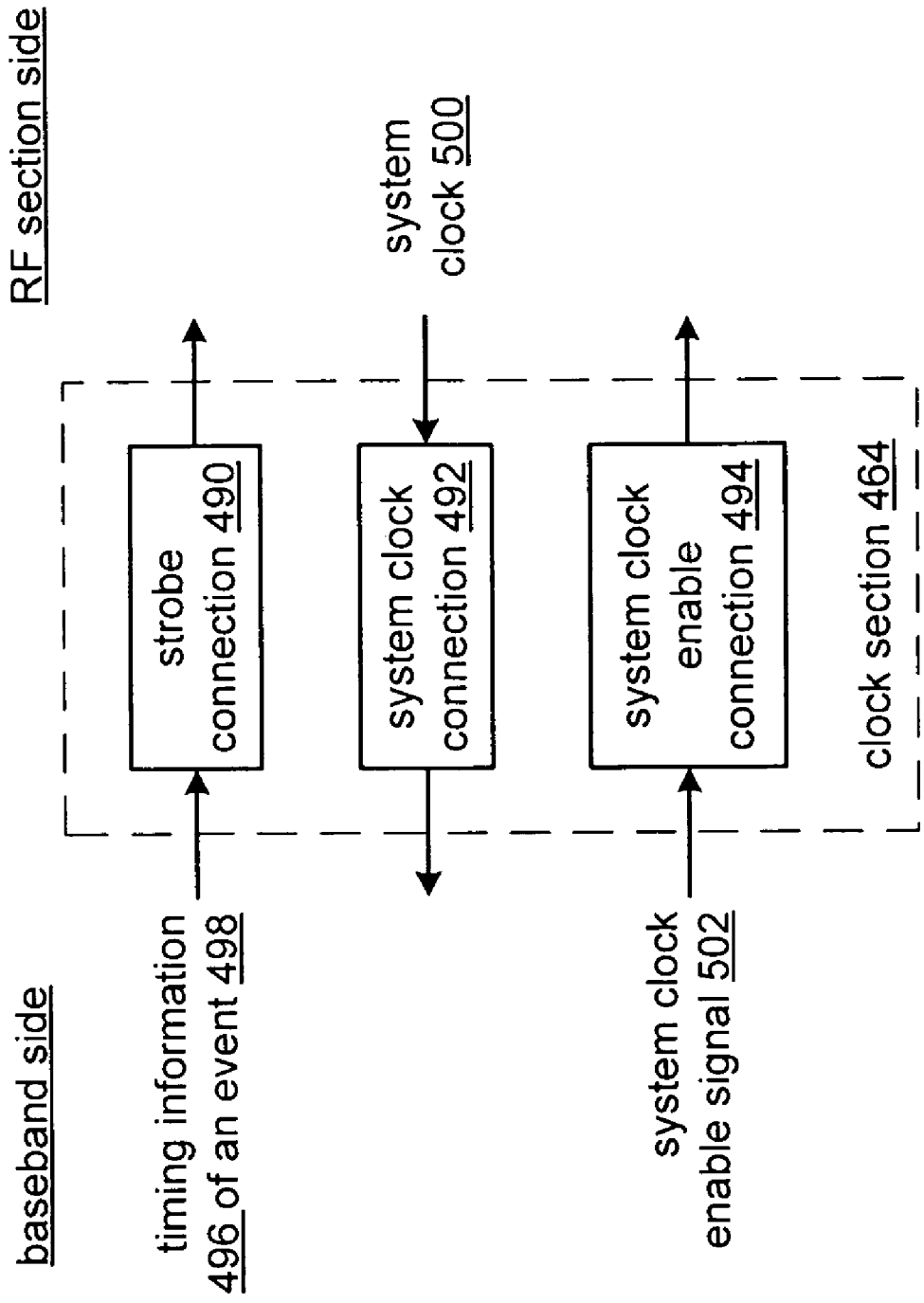
FIG. 28 is a schematic block diagram of an embodiment of a clock section of an interface module in accordance with the present invention.

FIG. 28 is a schematic block diagram of an embodiment of a clock section 464 that includes a strobe connection 490, a system clock connection 492, and a system clock enable connection 494. The strobe connection 490 provides timing information 496 of an event 498 from the baseband processing module to the RF circuit. For example, the strobe connection 490 may be used to support the baseband section transmitting preamble symbols to the RF section at the beginning of a transmit event (e.g., outbound data and/or voice signal). As another example, the strobe connection 490 may be used to support the baseband section transmitting postamble symbols to the RF section at the end of a transmit event. As yet another example, the strobe connection may be used for the baseband section to indicate how many symbols are to be transmitted for a given transmit event. Other uses of the strobe connection 490 may include power ramping, advancing a state machine within the RF section, triggering a next event in an event first in first out (FIFO) buffer, and/or synchronizing events within the RF section.

The system clock connection 492 provides a system clock 500 from the RF circuit to the baseband processing module when the connection 492 is enabled. The system clock enable connection 494 provides a system clock enable signal 502 from the baseband processing module to the RF circuit.

Figure 29:
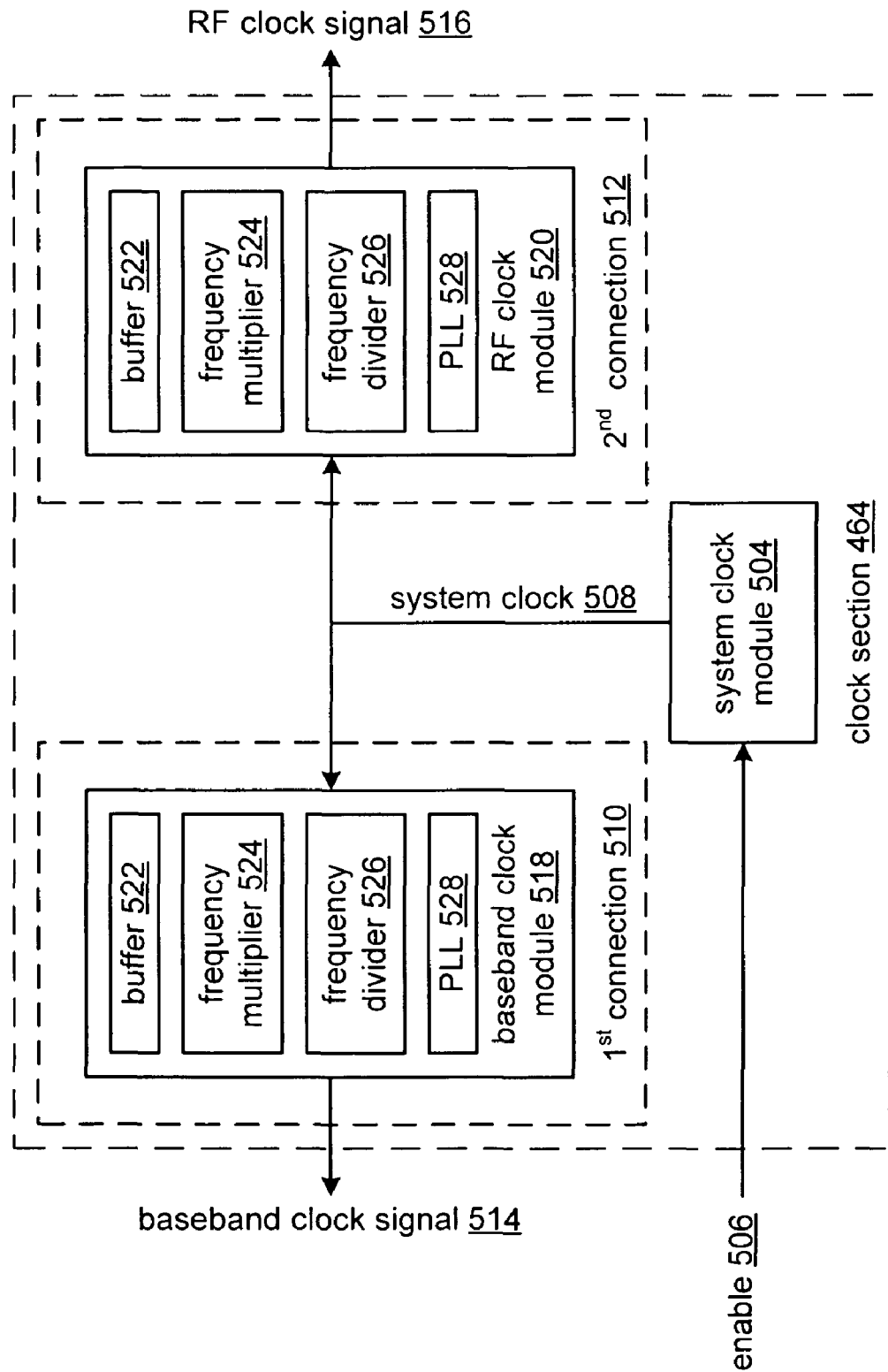
FIG. 29 is a schematic block diagram of another embodiment of a clock section of an interface module in accordance with the present invention.

FIG. 29 is a schematic block diagram of another embodiment of a clock section 464 that includes a $1^{st}$ connection section 510, a $2^{nd}$ connection section 512, and a system clock module 504. The system clock module 504, which may be a crystal oscillator circuit, phase locked loop, frequency multiplier circuit, frequency divider circuit, and/or counter, generates a system clock 508 when enabled via an enable signal 506 provided by the baseband processing module.

The $1^{st}$ connection 510 may include a baseband clock module 518 that generates a baseband clock signal 514 from the system clock 508 and provides the baseband clock signal 514 to the baseband processing module. The baseband clock module 518 may generate the baseband clock signal 514 in a variety of ways. For example, the baseband clock module 518 may include a buffer that drives the system clock 508 as the baseband clock signal 514. As another example, the baseband clock module 518 may include a frequency multiplier that multiples frequency of the system clock 508 by a multiplicand to produce the baseband clock signal 514. As another example, the baseband clock module 518 may include a frequency divider that divides frequency of the system clock 508 by a divisor to produce the baseband clock signal 514. As another example, the baseband clock module 518 may include a phase locked loop to generate the baseband clock signal 514 from the system clock 508. As yet another example, the baseband clock module 518 may include a combination of one or more of the buffer, frequency multiplier, frequency divider, and phase locked loop to produce the baseband clock signal 514 from the system clock 508.

The $2^{nd}$ connection 512 may include an RF clock module 520 that generates an RF clock signal 516 from the system clock 508 and provides the RF clock signal 516 to the RF section. The RF clock module 520 may generate the RF clock signal 516 in a variety of ways. For example, the RF clock module 520 may include a buffer that drives the system clock 508 as the RF clock signal 516. As another example, the RF clock module 520 may include a frequency multiplier that multiples frequency of the system clock 508 by a multiplicand to produce the RF clock signal 516. As another example, the baseband clock module 520 may include a frequency divider that divides frequency of the system clock 508 by a divisor to produce the RF clock signal 516. As another example, the RF clock module 520 may include a phase locked loop to generate the RF clock signal 516 from the system clock 508. As yet another example, the RF clock module 520 may include a combination of one or more of the buffer, frequency multiplier, frequency divider, and phase locked loop to produce the RF clock signal 516 from the system clock 508.

Figure 30:
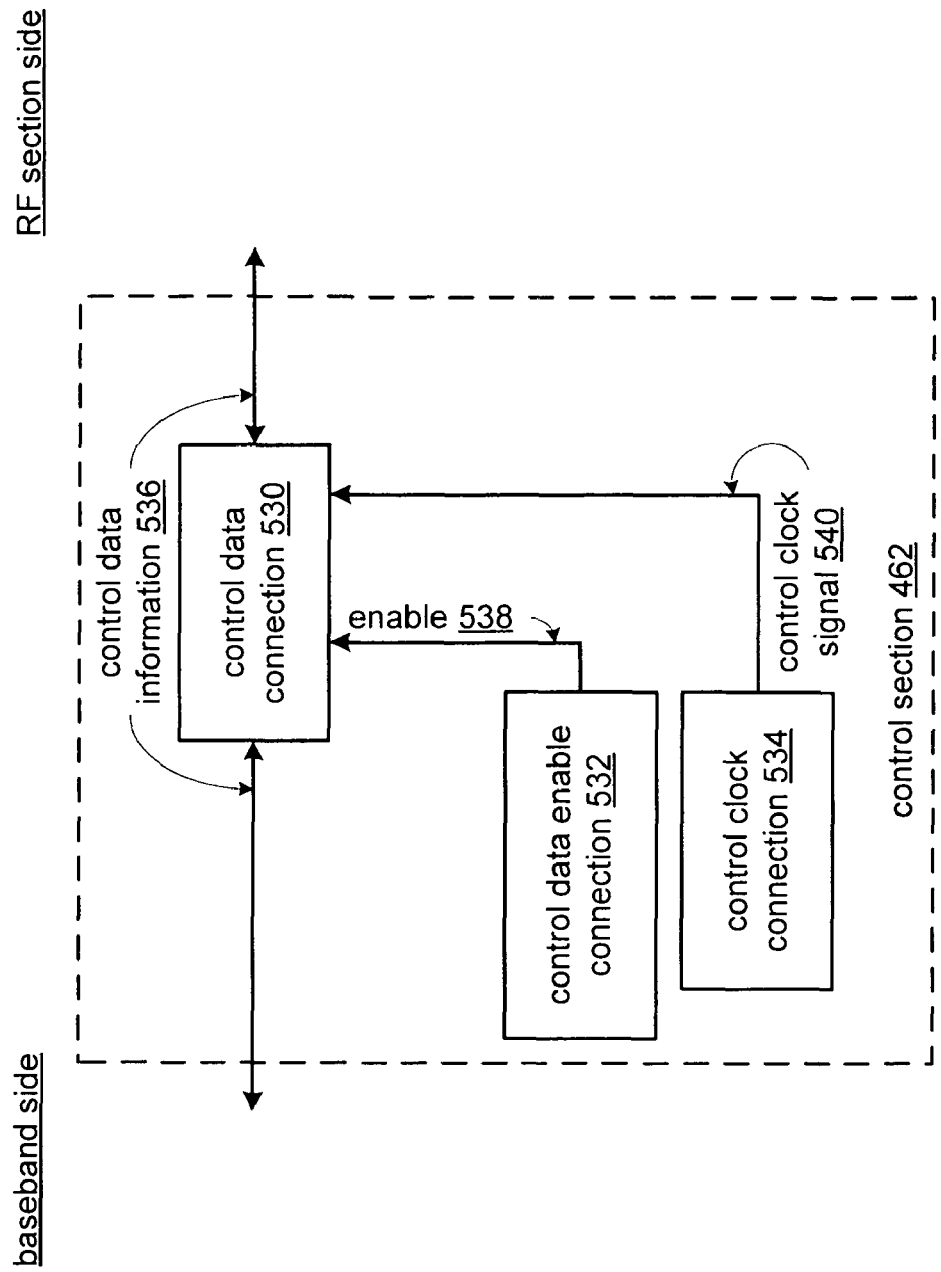
FIG. 30 is a schematic block diagram of an embodiment of a control section of an interface module in accordance with the present invention.

FIG. 30 is a schematic block diagram of an embodiment of a control section 462 that includes a control data connection 530, a control data enable connection 532, and a control clock connection 534. The control data connection 530, when enabled 538 via the control data enable connection 532, carries control data information 536 between the baseband processing module and the RF circuit or section. The control data information 538 includes one or more of: a read/write signal, address bits, and control data bits. The control data bits may contain one or more of: power level settings, amplitude modulation information, automatic gain settings, calibration settings, channel selection, and/or received signal strength indications.

The control data enable connection 532 provides an enable signal 538 that indicates the start and end of the control data information. The control clock connection 534 provides a control clock signal 540 to the control data connection for clocking of the control data information 536.

FIG. 31 is a schematic block diagram of an embodiment of a transmit/receive section 460 that includes a serial connection circuit 550 and a receive/transmit (R/T) enable connection 552. The serial connection circuit 550 includes a serial receive connection circuit 566 and a serial transmit connection circuit 568. The serial receive connection circuit 566 includes a receive buffer 558, a multiplexer 562, and a demultiplexer 564. The serial transmit connection circuit includes a transmit buffer 560, a multiplexer 570, and a demultiplexer 572.

In general, the serial connection circuit 550 provides the stream of inbound symbols 468 and/or 472 from the RF circuit to the baseband processing module when the R/T enable connection 552 indicates the receive mode. The serial connection circuit 550 also provides the stream of outbound symbols 466 and/or 470 from the baseband processing module to the RF circuit when the R/T enable connection 552 indicates the transmit mode. The R/T enable connection 552 receives a transmit mode signal 554 from the baseband processing module and provides it to the RF circuit to establish the transmit mode and receives a receive mode signal 556 from the RF circuit and provides it to the baseband processing module to establish the receive mode.

The serial receive connection circuit 566 receives an in-phase (I) component and a quadrature component (Q) of the inbound data or non-real-time data symbol stream 468 when the receive/transmit section is in a receive non-real-time (NRT) data mode as indicated by NRT or RT receive signal 556. In this mode, the buffer stores the I and Q components of the inbound data or non-real-time data symbol stream 468. The multiplexer 562, which may be a multiplexer, interleaving circuit, switching circuit, and/or any other circuit that provides two signals on a same transmission line, multiplexes between the I component and the Q component to create a serial stream of multiplexed I and Q data, which may be routed on the IC to the baseband processing module.

The demultiplexer 564, which may be a demultiplexer, deinterleaving circuit, switching circuit and/or any other circuit that separates two multiplexed signals from the same transmission line, separates the I and Q components from the serial stream of multiplexed I and Q data. In this embodiment, the demultiplexer 564 is proximal on the IC to the baseband processing module while the receive buffer 558 and the multiplexer 562 is proximal on the IC to the RF section.

The serial receive connection circuit 566 also receives an in-phase (I) component and a quadrature component (Q) of the inbound voice or real-time data symbol stream 472 when the receive/transmit section is in a receive real-time (RT) data mode as indicated by NRT or RT receive signal 556. In this mode, the buffer 558 stores the I and Q components of the inbound voice or real-time data symbol stream 472. The multiplexer 562 multiplexes between the I component and the Q component to create a serial stream of multiplexed I and Q data, which may be routed on the IC to the baseband processing module. The demultiplexer 564 separates the I and Q components from the serial stream of multiplexed I and Q data.

The serial transmit connection circuit 568 receives an in-phase (I) component and a quadrature component (Q) of the outbound data or non-real-time data symbol stream 466 when the receive/transmit section is in a transmit non-real-time (NRT) data mode as indicated by NRT or RT transmit signal 554. In this mode, the buffer 560 stores the I and Q components of the outbound data or non-real-time data symbol stream 466. The multiplexer 570, which may be a multiplexer, interleaving circuit, switching circuit, and/or any other circuit that provides two signals on a same transmission line, multiplexes between the I component and the Q component to create a serial stream of multiplexed I and Q data, which may be routed on the IC to the RF section.

The demultiplexer 572, which may be a demultiplexer, deinterleaving circuit, switching circuit and/or any other circuit that separates two multiplexed signals from the same transmission line, separates the I and Q components from the serial stream of multiplexed I and Q data. In this embodiment, the demultiplexer 572 is proximal on the IC to the RF section while the multiplexer 570 and the transmit buffer 560 are proximal on the IC to the baseband processing module.

Figure 32:
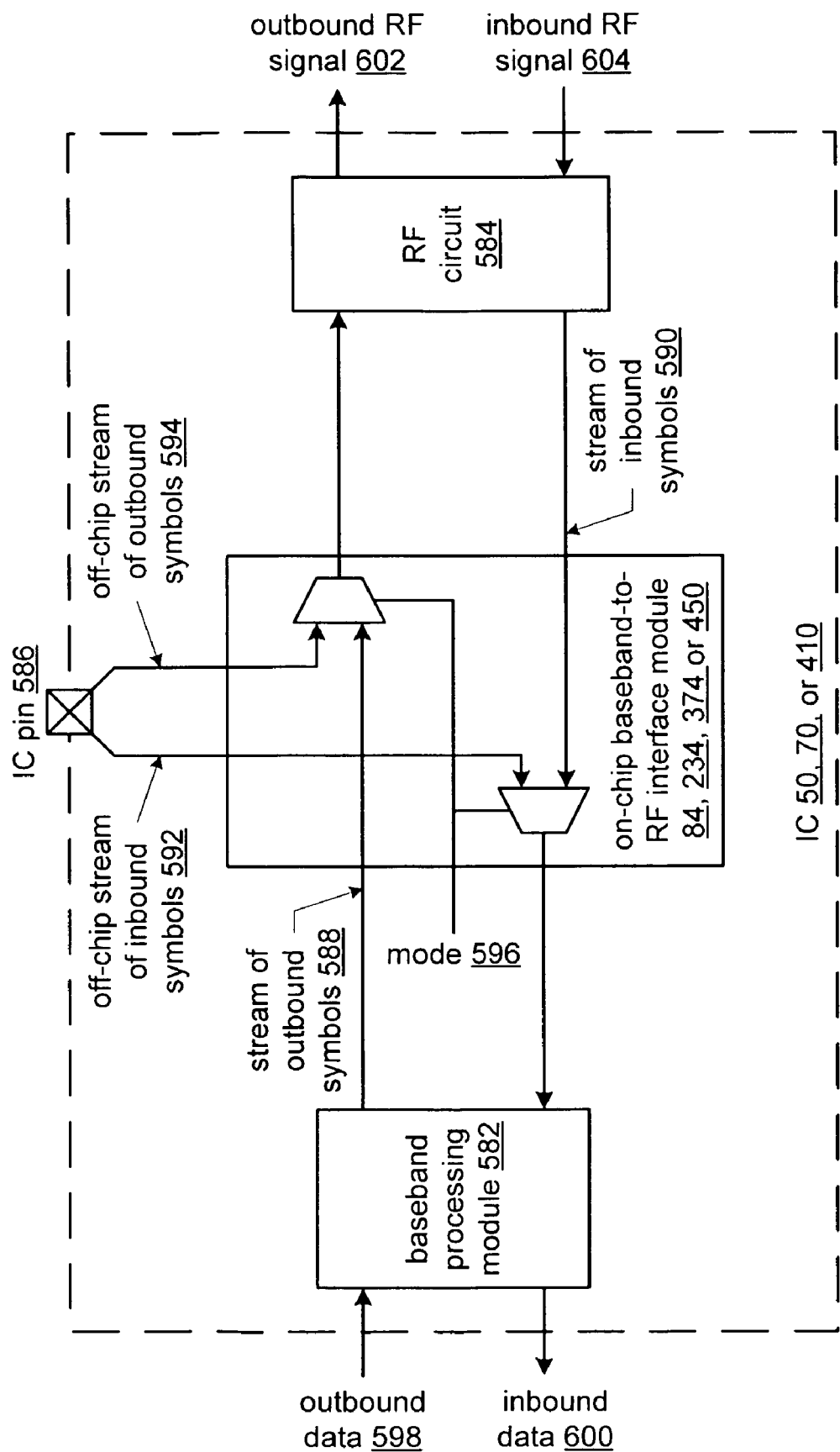
FIG. 32 is a schematic block diagram of another embodiment of a Voice Data RF IC in accordance with the present invention.

FIG. 32 is a schematic block diagram of another embodiment of a Voice Data RF IC 50, 70 and/or 410 that includes a baseband processing module 582, an on-chip baseband-to-FR interface module 84, 234, 374, or 450, an RF circuit 584, and at least one IC pin 586. The baseband processing module 582 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 582 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

In this embodiment, the baseband processing module 582 converts outbound data 588 into a stream of outbound symbols 588. The outbound data 582 may be outbound voice signals, outbound data, outbound real-time data, and/or outbound non-real-time data that the baseband processing module 582 converts into the stream of outbound symbols 588 in a manner as previously described with reference to baseband processing modules 80, 170, 172, 230, 232, 370, 414, or 415.

When the IC 50, 70, or 410 is in a first mode as indicated by mode signal 596, the interface module 84, 234, 374, or 450 provides the stream of outbound symbols 588 to the RF circuit 584. In this mode, the RF circuit 584 converts the stream of outbound symbols 588 into outbound RF signals 602 in a manner as previously discussed with reference to the RF sections 82, 236, 238, 372, or 416.

When the IC 50, 70, or 410 is in a second mode as indicated by the mode signal 596, the interface module 84, 234, 374, or 450 provides an off-chip stream of outbound symbols 594 to the RF circuit 594. In this mode, the RF circuit 594 converts the off-chip stream of outbound symbols 594 into the outbound RF signals 602. In one embodiment, the off-chip stream of outbound symbols 594 is a stream of test symbols provided by a tester to test the RF circuit 594. In another embodiment, an off-chip baseband processing module generates the off-chip stream of outbound symbols 594 from off-chip data and provides the off-chip stream of outbound symbols 594 to the IC pin 586.

The RF circuit 584 also receives inbound RF signals 604 and converts them into a stream of inbound symbols 590. The inbound RF signals 604 may be inbound RF voice signals, inbound RF data signals, inbound RF real-time signals, and/or inbound RF non-real-time signals. In this embodiment, the RF circuit 584 converts the inbound RF signals 604 into the stream of inbound symbols 590 in a manner as previously discussed with reference to the RF sections 82, 236, 238, 372, or 416.

When the IC 50, 70, or 410 is in the first mode as indicated by the mode signal 596, the interface module 84, 234, 374, or 450 provides the stream of inbound symbols 590 to baseband processing module 582. The baseband processing module 582 converts the stream of inbound symbols 590 into inbound data 600 in a manner as previously described with reference to baseband processing modules 80, 170, 172, 230, 232, 370, 414, or 415.

When the IC 50, 70, or 410 is in the second mode as indicated by the mode signal 596, the interface module 84, 234, 374, or 450 provides an off-chip stream of inbound symbols 592 to the baseband processing module 582. In this mode, the baseband processing module 582 converts the off-chip stream of inbound symbols 592 into the inbound data 600 in a manner as previously described with reference to baseband processing modules 80, 170, 172, 230, 232, 370, 414, or 415. In one embodiment, the off-chip stream of inbound symbols 592 is a stream of test symbols provided by a tester to test the baseband processing module 582. In another embodiment, an off-chip RF circuit generates the off-chip stream of inbound symbols 592 from an off-chip inbound RF signal and provides the off-chip stream of inbound symbols 592 to the IC pin 586.

In one embodiment, the baseband processing module 80, 170, 172, 230, 232, 370, 414, or 415, the RF circuit or section 82, 236, 238, 372, or 416, and the on-chip baseband-to-RF interface module 84, 234, 374, or 450 are fabricated on a single die using a complimentary metal oxide semiconductor (CMOS) process of at most sixty-five nano-meters.

Figure 33:
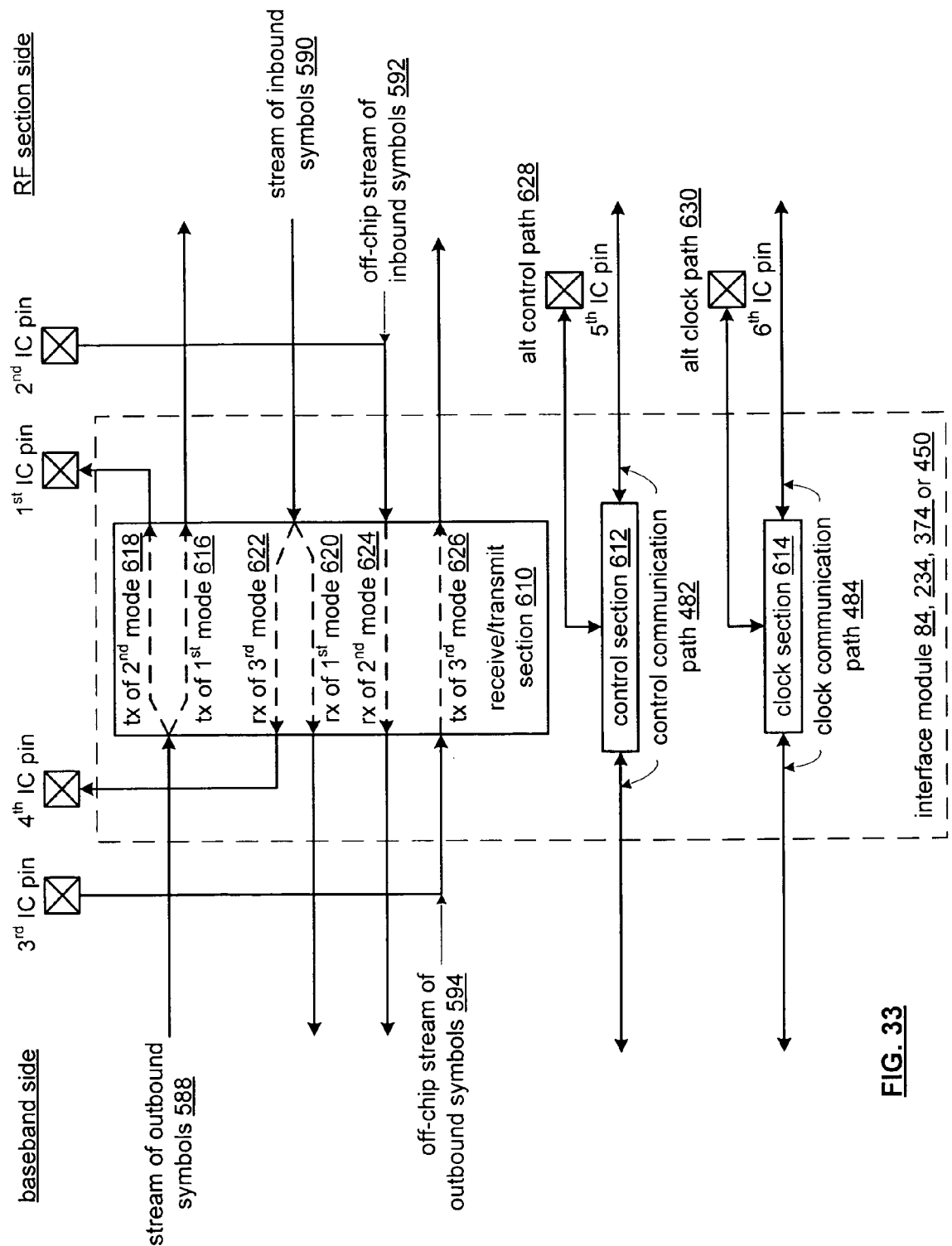
FIG. 33 is a schematic block diagram of another embodiment of an interface module in accordance with the present invention.

FIG. 33 is a schematic block diagram of another embodiment of an interface module 84, 234, 374, or 450 that includes the receive/transmit section 610, the control section 612, the clock section 614, and $1^{st}$ through $6^{th}$ IC pins. In this embodiment, the $1^{st}$ IC pin provides a connection an alternate path for the stream of outbound symbols 588; the $2^{nd}$ IC pin provides a connection for an off-chip stream of inbound symbols 592; the $3^{rd}$ IC pin provides a connection for an off-chip stream of outbound symbols 594; the $4^{th}$ IC pin provides an alternate path for the stream of inbound symbols 590; the $5^{th}$ IC pin provides a connection for an alternate control path 28; and the $6^{th}$ IC pin provides a connection for an alternate clock path 630.

When the IC 50, 70, or 410 is in a transmit state of the first mode 616, the receive/transmit section 610 provides the stream of outbound symbols 588 from the baseband processing module to the RF circuit. When the IC 50, 70, or 410 is in a receive state of the first mode 620, the receive/transmit section 610 provides the stream of inbound symbols 590 from the RF circuit to the baseband processing module.

When the IC 50, 70, or 410 is in a transmit state of a second mode 618, the receive/transmit section 610 provides the stream of outbound symbols 588 from the baseband processing module to a first IC pin. In one embodiment, the stream of outbound symbols 588 may be used to the test the baseband processing module. In another embodiment, the stream of outbound symbols 588 may be provided to an off-chip RF section that converts the outbound stream of symbols 588 into an outbound RF signal.

When the IC 50, 70, or 410 is in a receive state of a second mode 624, the receive/transmit section 610 provides an off-chip stream of inbound symbols 592 from the second IC pin to the baseband processing module. In one embodiment, the off-chip stream of inbound symbols 592 may be a stream of test symbols to test the baseband processing module. In another embodiment, the off-chip stream of inbound symbols 592 may be provided from an off-chip RF section that produced the off-chip stream of inbound symbols 592 from another inbound RF signal.

When the IC 50, 70, or 410 is in a transmit state of a third mode 626, the receive/transmit section 610 provides an off-chip stream of outbound symbols 594 from a third IC pin to the RF circuit. In one embodiment, the off-chip stream of outbound symbols 594 is a stream of test symbols provided by a tester to test the RF circuit 594. In another embodiment, an off-chip baseband processing module generates the off-chip stream of outbound symbols 594 from off-chip data and provides the off-chip stream of outbound symbols 594 to the IC pin 586.

When the IC 50, 70, or 410 is in a receive state of a third mode 622, the receive/transmit section 610 provides the stream of inbound symbols 590 from the RF circuit to a fourth IC pin. In one embodiment, the stream of inbound symbols 590 may be provided to a tester for testing the RF circuit. In another embodiment, the stream of inbound symbols are provided to an off-chip baseband processing module, which converts in the stream of inbound symbols 590 into off-chip inbound data.

When the IC 50, 70, or 410 in the first state, the control section 612 provides the control communication path 482 between the baseband processing module and the RF circuit and the clock section 614 provides a clock communication path 484 between the baseband processing module and the RF circuit. When the IC 50, 70, or 410 is in the second state, the control section 612 provides a first alternate control communication path between a fifth IC pin and the baseband processing module and the clock section 614 provides a first alternate clock communication path between a sixth IC pin and the baseband processing module. When the IC 50, 70, or 410 is in the third state, the control section 612 provides a second alternate control communication path between the fifth IC pin and the RF circuit and the clock section 614 provides a second alternate clock communication path between the sixth IC pin and the RF circuit. Note that the IC 50, 70, or 410 may further include a control data enable IC pin coupled to facilitate the second and third control data enable connections and a control clock IC pin coupled to facilitate the second and third control clock connection.

Figure 34:
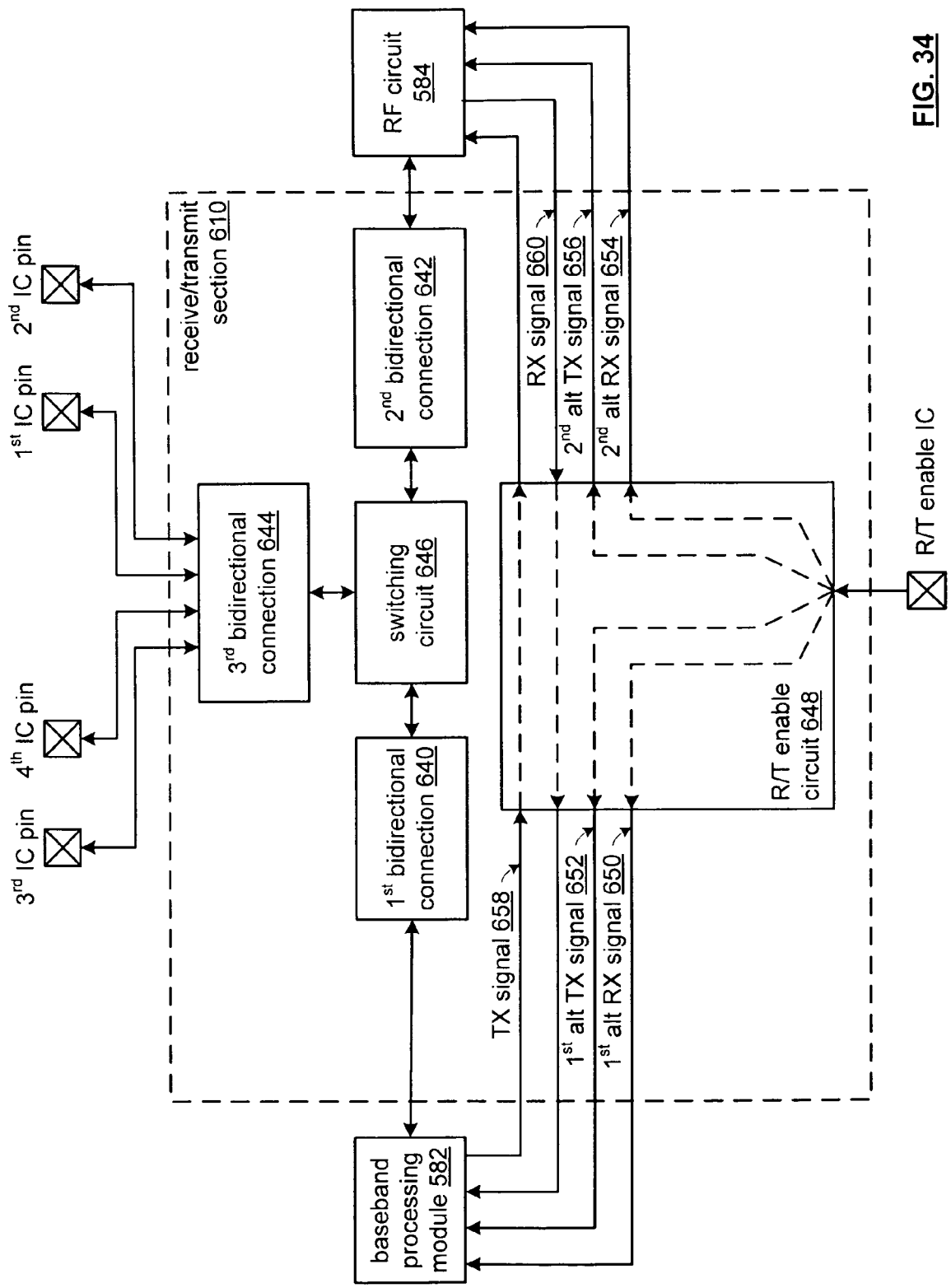
FIG. 34 is a schematic block diagram of another embodiment of a transmit/receive section of an interface module in accordance with the present invention.

FIG. 34 is a schematic block diagram of another embodiment of a transmit/receive section 610 that includes a receive/transmit (R/T) enable circuit 648, a $1^{st}$ bidirectional connection 640, a $2^{nd}$ bidirectional connection 642, a $3^{rd}$ bidirectional connection 644, and a switching circuit 646. In this illustration, the receive/transmit section 610 is coupled to the baseband processing module 582, the RF circuit 584, and a receive/transmit (R/T) enable circuit 648.

In this embodiment, the first bidirectional connection 640 is coupled to the baseband processing module 582; the second bidirectional connection 642 is coupled to the RF circuit 584, and the third bidirectional connection 644 is coupled to at least one of the first, second, third, and fourth IC pins. The first, second, and third bidirectional connections 640-644 may be a wire, a 3-wire interface, a bidirectional transistor switch, etc.

The switching circuit 646, which may be switching network, transistor network, multiplexer network, etc., couples the first and second bidirectional connections 640 and 642 together when the IC 50, 70, or 410 is in the first mode. In this mode, the inbound and outbound signals are routed between the baseband processing module 582 and the RF circuit 584. In addition, the R/T enable circuit 648 provides the transmit enable signal 658 from the baseband processing module 582 to the RF circuit 584 and provides the receive enable signal 660 from the RF circuit 584 to the baseband processing module 582.

When the IC 50, 70, or 410 is in the second mode, the switching circuit 646 couples the first bidirectional connection 640 to the third bidirectional connection 644. In this mode, the baseband processing module 582 is coupled to the $1^{st}$ through $4^{th}$ IC pins for testing, processing of off-chip inbound symbols, and/or for providing outbound symbols off-chip. In addition, the R/T enable circuit 648 provides a first alternative transmit signal 652 to the baseband processing module 582 for controlling when the baseband processing module 582 generates outbound symbols. The R/T enable circuit 648 also provides a $1^{st}$ alternate receive signal 650 to the baseband processing module 582 for controlling when the baseband processing module 582 receives off-chip inbound symbols.

When the IC 50, 70, or 410 is in the third mode, the switching circuit 646 couples the second bidirectional connection 642 to the third bidirectional connection 644. In this mode, the RF circuit 584 is coupled to the $1^{st}$ through $4^{th}$ IC pins for testing, processing of off-chip outbound symbols, and/or for providing inbound symbols off-chip. In addition, the R/T enable circuit 648 provides a second alternative transmit signal 656 to the RF circuit 584 for controlling when the RF circuit 584 provides the inbound symbols off-chip. The R/T enable circuit 648 also provides a $2^{nd}$ alternate receive signal 654 to the RF circuit for controlling when the RF circuit receives off-chip outbound symbols.

Figure 35:
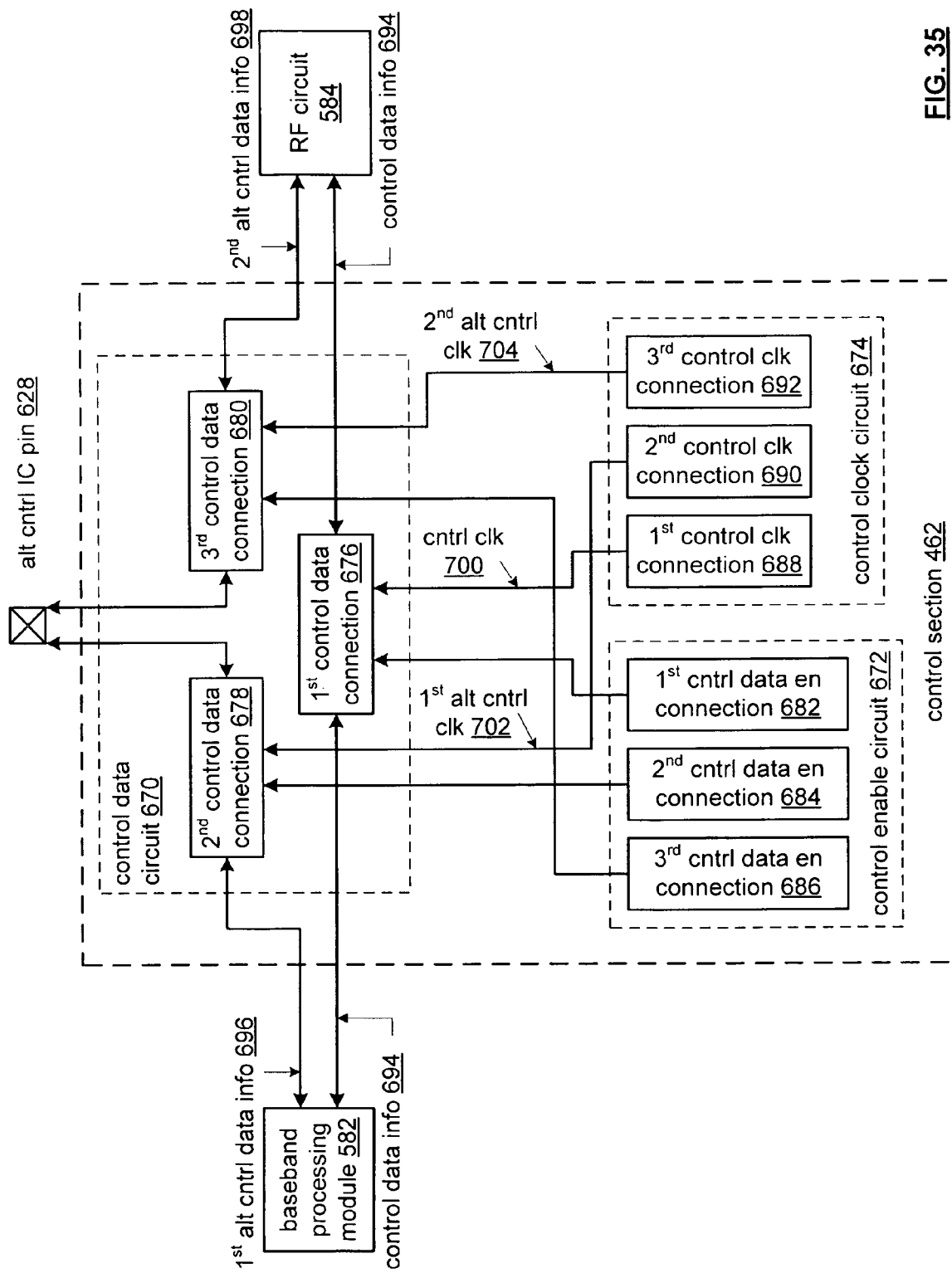
FIG. 35 is a schematic block diagram of another embodiment of a control section of an interface module in accordance with the present invention.

FIG. 35 is a schematic block diagram of another embodiment of a control section 462 coupled to an alternate control IC pin 628. The control section 462 includes the control data circuit 670, the control enable circuit 672, and the control clock circuit 674. The control data circuit 670 includes a first control data connection 676, a second control data connection 678, and a third control data connection 680. The control enable circuit 672 includes a first control data enable connection 682, a second control data enable connection 684, and a third control data enable connection 686. The control clock circuit 674 includes a first control clock connection 688, a second control clock connection 690, and a third control clock connection 692.

When the IC 50, 70, or 410 is in the first mode, the first control data connection 676 carries, when enabled, control data information 696 between the baseband processing module and the RF circuit. In this mode, the a first control data enable connection 682 provides an enable signal to the first control data connection 676 to indicate a start and an end of the control data information 694. Also in this mode, the first control clock connection 688 provides a control clock signal 700 to the first control data connection 676 for clocking the control data information 694.

When the IC 50, 70, or 410 is in the second mode, the second control data connection 678 carries first alternate control data information 696 between the baseband processing module 582 and the control data IC pin 628. In this mode, the second control data enable connection 684 provides an enable signal to the second control data connection 678 to indicate a start and an end of the first alternate control data information 696. Also in this mode, the second control clock connection 690 carries a first alternate control clock signal 702 to the second control data connection 678 for clocking the first alternate control data information 696.

When the IC 50, 70, or 410 is in the third mode, the third control data connection 680 carries second alternate control data information 698 between the control data IC pin 628 and the RF circuit 584. In this mode, the third control data enable connection 686 provides an enable signal to the third control data connection 680 to indicate a start and an end of the second alternate control data information 698. Also in this mode, the third control clock connection 692 carries a second alternate control clock signal 704 to the third control data connection 680 for clocking the second alternate control data information 698. Note that the alternate control data 696, 698, the alternate control clocks 702, 704, and the alternate control data enable signals may be generated off-chip, by the baseband processing module 582, and/or by the RF circuit 584.

Figure 36:
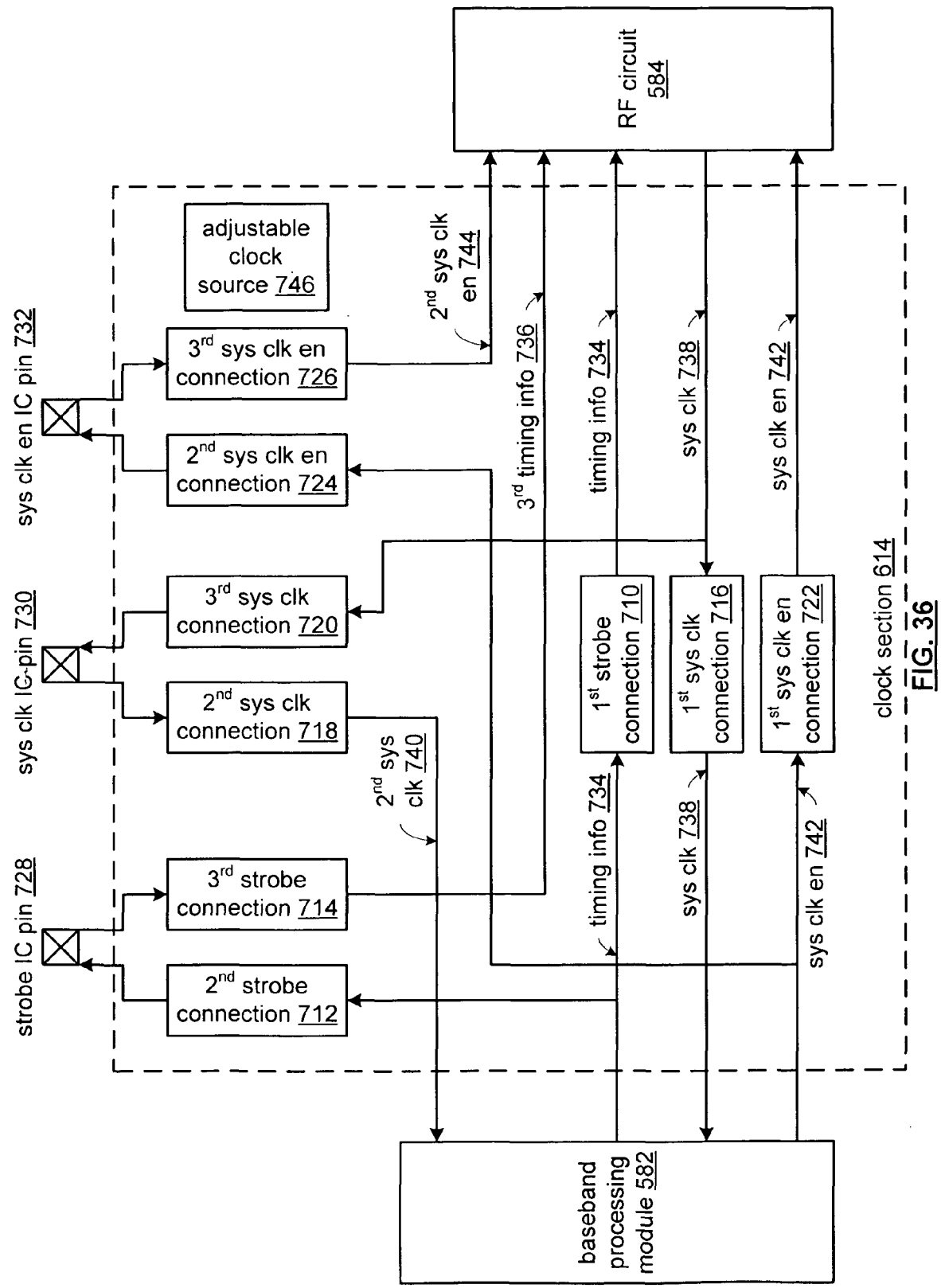
FIG. 36 is a schematic block diagram of another embodiment of a clock section of an interface module in accordance with the present invention.

FIG. 36 is a schematic block diagram of another embodiment of a clock section 614 coupled to the baseband processing module 582, the RF circuit 584, a strobe IC pin 728, a system clock IC pin 730, and a system clock enable IC pin 732. The clock section 614 includes first, second, and third strobe connections 710, 712, and 714, first, second, and third system clock connections 716, 718, 720, and first, second, and third system clock enable connections 722, 724, and 726. The clock section 614 may also include an adjustable clock source 746.

When the IC 50, 70, or 410 is in the first mode, the first strobe connection 710 provides timing information 734 of an event from the baseband processing module 582 to the RF circuit 584. In this mode, the first system clock connection 716 provides a system clock 738 from the RF circuit 584 to the baseband processing module 582. Also in this mode, the first system clock enable connection 722 provides a system clock enable signal 742 from the baseband processing module 582 to the RF circuit 584.

When the IC 50, 70, or 410 is in the second mode, the second strobe connection 712 provides the timing information 734 of an event from the baseband processing module 582 to the strobe IC pin 728. In this mode, the second system clock connection 718 provides a second system clock 740 from the system clock IC pin 703 to the baseband processing module 582. Also in this mode, the second system clock enable connection 724 provides the system clock enable signal 742 from the baseband processing module 582 to the system clock enable IC pin 732.

When the IC 50, 70, or 410 is in the third mode, the third strobe connection 714 provides third timing information 736 of an event from the strobe IC pin 728 to the RF circuit 584. In this mode, the third system clock connection 720 provides the system clock 738 from the RF circuit 582 to the system clock IC pin 730. Also in this mode, the third system clock enable connection 726 provides a second system clock enable signal 744 from the system clock enable IC pin 732 to the RF circuit 582.

The adjustable clock source that provides a first adjustable clock signal to at least one of the baseband processing module and the RF circuit via the clock communication path, wherein rate of the first adjustable clock signal is adjusted based on at least one of the converting of the outbound data into the stream of outbound symbols and the converting the stream of inbound symbols into the inbound data.

Figure 37:
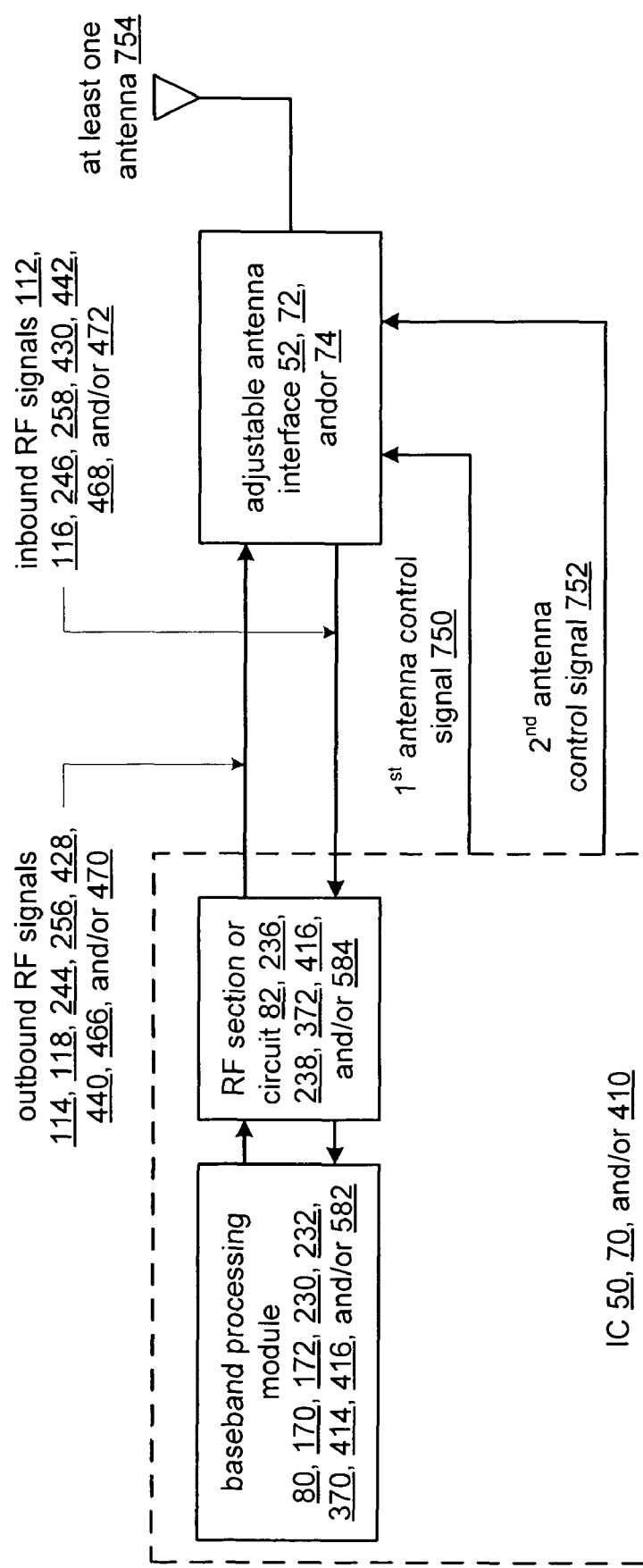
FIG. 37 is a schematic block diagram of an embodiment of a Voice Data RF IC coupled to an embodiment of an adjustable antenna interface in accordance with the present invention.

FIG. 37 is a schematic block diagram of an embodiment of a Voice Data RF IC 50, 70, and/or 410 coupled to an adjustable antenna interface 52, 72, and/or 74. The Voice Data RF IC 50, 70, and/or 410 includes a baseband processing module 80, 170, 172, 230, 232, 370, 414, 416, and/or 582 and an RF section or circuit 82, 236, 238, 372, 416, and/or 584.

In this embodiment, the baseband processing module 80, 170, 172, 230, 232, 370, 414, 416, and/or 582 converts an outbound signal into a stream of outbound symbols and converts a stream of inbound symbols into an inbound signal. The outbound signal and the inbound signal may each be a voice signal, a real-time signal, a data signal, and/or a non-real-time signal. The conversion of outbound signals into outbound symbols and the conversion of inbound symbols into inbound signals performed by the baseband processing module is done in a manner as previously described with reference to baseband processing modules 80, 170, 172, 230, 232, 370, 414, or 415.

The RF section or circuit 82, 236, 238, 372, 416, and/or 584 converts inbound RF signals 112, 116, 246, 258, 430, 442, 468, and/or 472 into the stream of inbound symbols and converts the stream of outbound symbols into outbound RF signals 114, 118, 244, 256, 428, 440, 466, and/or 470. The conversion of outbound symbols into outbound RF signals and the conversion of inbound RF signals into inbound symbols performed by RF circuit is done in a manner as previously discussed with reference to the RF sections 82, 236, 238, 372, or 416.

The adjustable antenna interface 52, 72, and/or 74 is coupled to the at least one antenna 754 and to the RF section or circuit 82, 236, 238, 372, 416, and/or 584. When a first antenna control signal 750 is active, the adjustable antenna interface 52, 72, and/or 74 receives the outbound RF signals 114, 118, 244, 256, 428, 440, 466, and/or 470 from the RF circuit and provides them to the at least one antenna 754 for transmission. When a second control signal 752 is active, the adjustable antenna interface 52, 72, and/or 74 receives the inbound RF signals 112, 116, 246, 258, 430, 442, 468, and/or 472 from the at least one antenna 754 and provides them to the RF circuit.

In one embodiment, the baseband processing module 80, 170, 172, 230, 232, 370, 414, 416, and/or 582 generates the first and second antenna control signals 750 and 752. In another embodiment, the RF section or circuit 82, 236, 238, 372, 416, and/or 584 generates the first and second antenna control signals 750 and 752. In another embodiment, either of the he baseband processing module 80, 170, 172, 230, 232, 370, 414, 416, and/or 582 and the RF section or circuit 82, 236, 238, 372, 416, and/or 584 may generate the first and second antenna control signals 750 and 752

Figure 38:
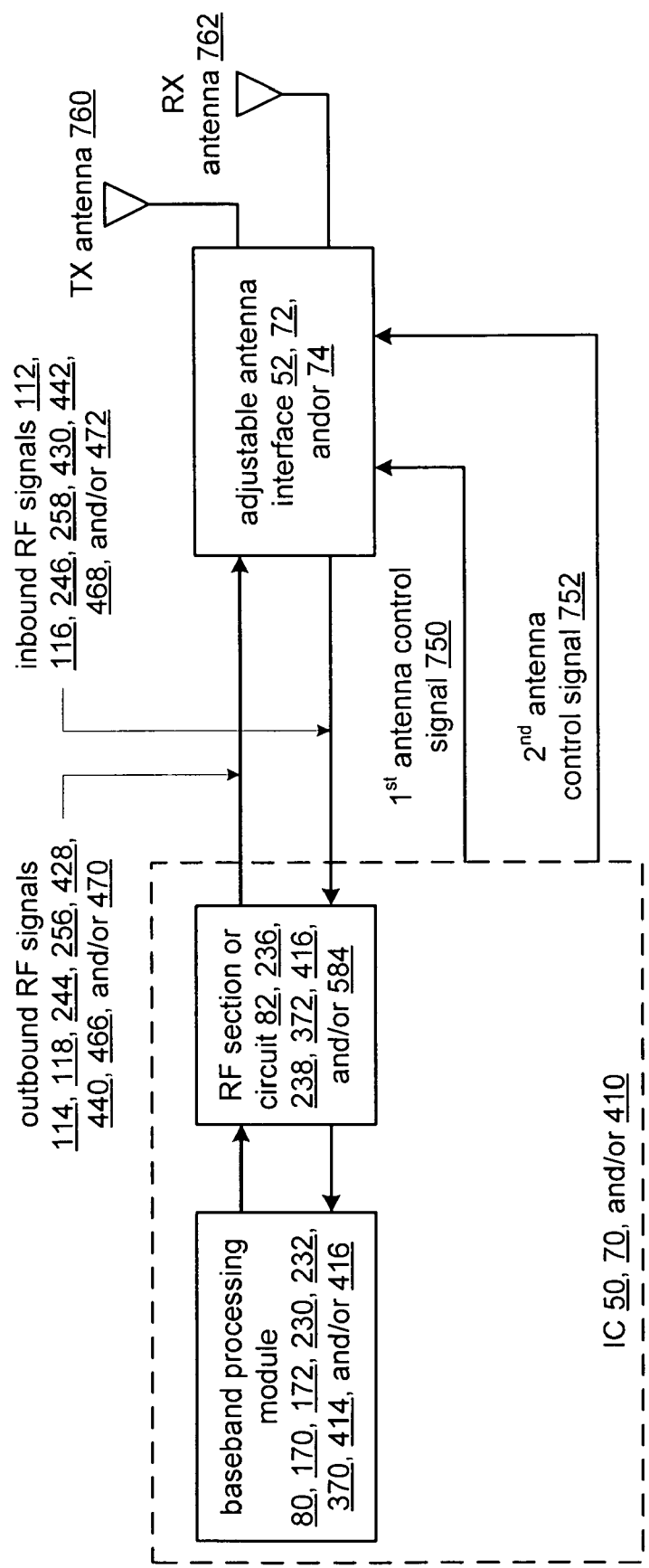
FIG. 38 is a schematic block diagram of another embodiment of a Voice Data RF IC coupled to another embodiment of an adjustable antenna interface in accordance with the present invention.

FIG. 38 is a schematic block diagram of another embodiment of a Voice Data RF IC 50, 70, and/or 410 coupled to an adjustable antenna interface 52, 72, and/or 74. The Voice Data RF IC 50, 70, and/or 410 includes a baseband processing module 80, 170, 172, 230, 232, 370, 414, 416, and/or 582 and an RF section or circuit 82, 236, 238, 372, 416, and/or 584. In this embodiment, the baseband processing module 80, 170, 172, 230, 232, 370, 414, 416, and/or 582 and the RF section or circuit 82, 236, 238, 372, 416, and/or 584 function as previously described with reference to FIG. 37.

In this embodiment, the adjustable antenna interface 52, 72, and/or 74 is coupled to a transmit antenna 760 and a receive antenna 762. When the first antenna control signal 750 is active, the adjustable antenna interface 52, 72, and/or 74 couples the transmit antenna 760 to the RF circuit for transmitting the outbound RF signals. When the second antenna control signal 752 is active, the adjustable antenna interface 52, 72, and/or 74 couples the receive antenna 762 to the RF circuit for receiving the inbound RF. Note that, in this embodiment, the outbound RF signals have a carrier frequency within a transmit band of a first or second frequency band and the inbound RF signals have a carrier frequency within a receive band of the first or second frequency band.

Figure 39:
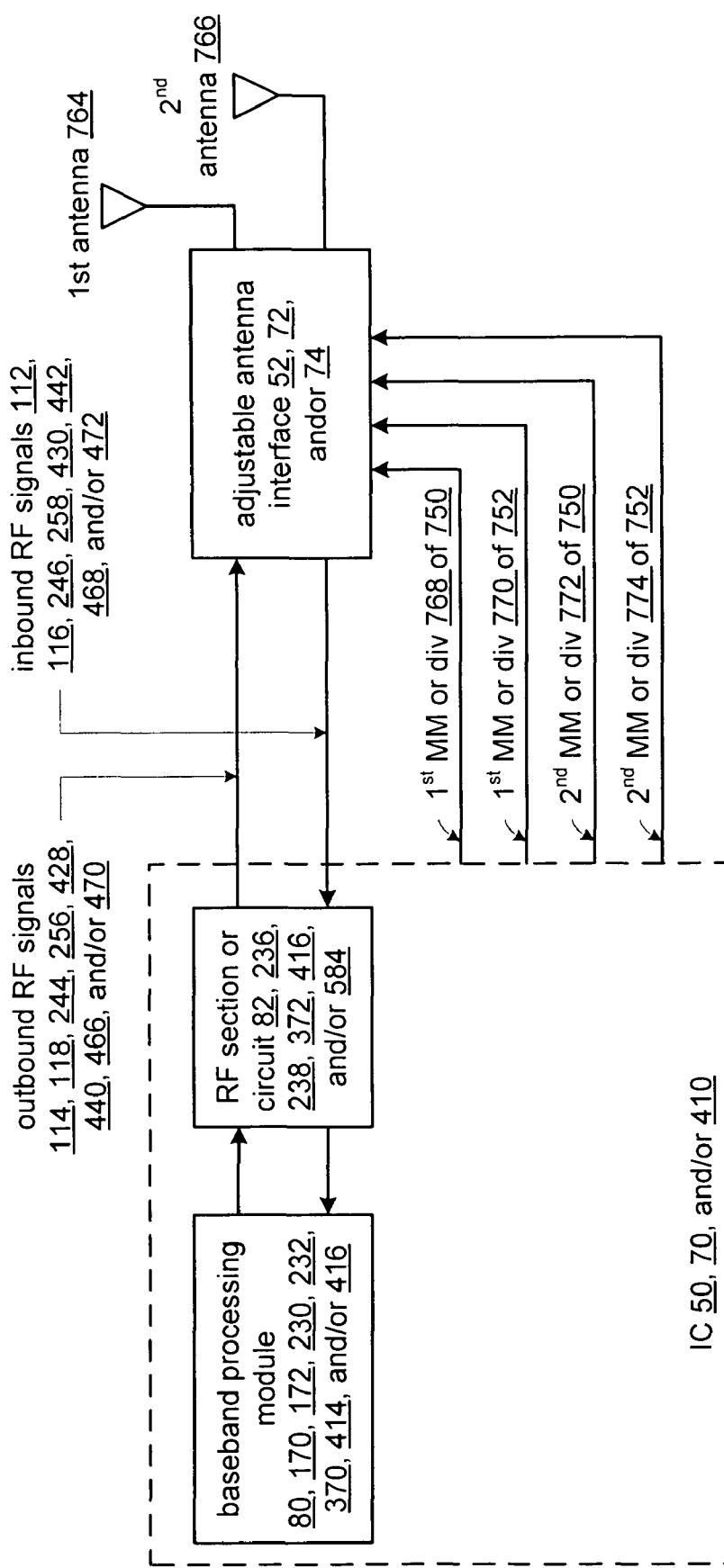
FIG. 39 is a schematic block diagram of another embodiment of a Voice Data RF IC coupled to another embodiment of an adjustable antenna interface in accordance with the present invention.

FIG. 39 is a schematic block diagram of another embodiment of a Voice Data RF IC 50, 70, and/or 410 coupled to an adjustable antenna interface 52, 72, and/or 74. The Voice Data RF IC 50, 70, and/or 410 includes a baseband processing module 80, 170, 172, 230, 232, 370, 414, 416, and/or 582 and an RF section or circuit 82, 236, 238, 372, 416, and/or 584. In this embodiment, the baseband processing module 80, 170, 172, 230, 232, 370, 414, 416, and/or 582 and the RF section or circuit 82, 236, 238, 372, 416, and/or 584 function as previously described with reference to FIG. 37.

In this embodiment, the adjustable antenna interface 52, 72, and/or 74 is coupled to a $1^{st}$ antenna 764 and a $2^{nd}$ antenna 766. When a first multi-mode (MM) state of the first antenna control signal 750, the adjustable antenna interface 52, 72, and/or 74 couples the first antenna 764 to the RF circuit for transmitting the outbound RF signals. When a first multi-mode (MM) state of the second antenna control signal 752 is active, the adjustable antenna interface 52, 72, and/or 74 couples the first antenna 764 to the RF circuit for receiving the inbound RF signals. In these modes, the inbound and outbound RF signals have a carrier frequency in a first frequency band and the first antenna and the adjustable antenna interface 52, 72, and/or 74 are tuned to the first frequency band.

When a second multi-mode (MM) state of the first antenna control signal 750 is active, the adjustable antenna interface 52, 72, and/or 74 couples the second antenna 766 to the RF circuit for transmitting second outbound RF signals. When a second multi-mode state of the second antenna control signal is active, the adjustable antenna interface 52, 72, and/or 74 couples the second antenna 762 to the RF circuit for receiving second inbound RF signals. In these modes, the second inbound and outbound RF signals have a carrier frequency within a second frequency band.

When a first diversity state 768 of the first antenna control signal 750 is active, the adjustable antenna interface 52, 72, and/or 74 couples the first antenna 764 to the RF circuit for transmitting the outbound RF signals. When a first diversity state 770 of the second antenna control signal 752 is active, the adjustable antenna interface 52, 72, and/or 74 couples the first antenna 764 to the RF circuit for receiving the inbound RF signals.

When a second diversity state 772 of the first antenna control signal 750 is active, the adjustable antenna interface 52, 72, and/or 74 couples the second antenna 766 to the RF circuit for transmitting the outbound RF signals. When a second diversity state 774 of the second antenna control signal 752 is active, the adjustable antenna interface 52, 72, and/or 74 couples the second antenna 762 to the RF circuit for receiving the inbound RF signals. In this embodiment, the first and second antennas 760 and 762 are shared for transmitting and receiving, but are used in a diversity manner, where the antennas 760 and 762 are physically spaced by a quarter wavelength or at some other distance, such that if a null is occurring at one of the antennas 760 and 762 due to multi-path fading, the other antenna should not be experiencing a null. In this instance, the IC 50, 70, and/or 410 would select the antenna not experiencing the null for transmitting or receiving the RF signals.

Figure 40:
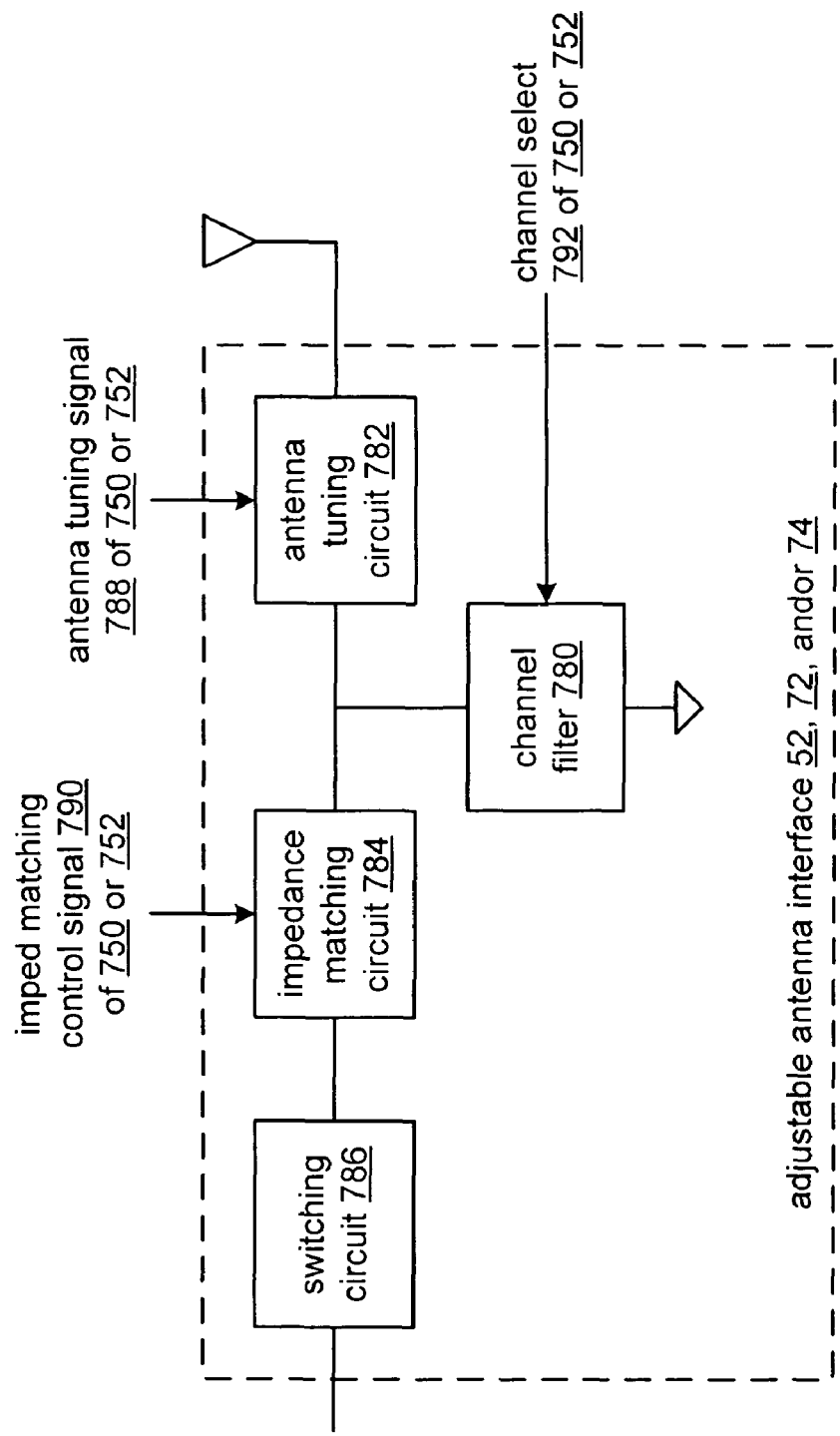
FIG. 40 is a schematic block diagram of an embodiment of an adjustable antenna interface in accordance with the present invention.

FIG. 40 is a schematic block diagram of an embodiment of an adjustable antenna interface 52, 72, and/or 74 that includes a channel filter 780, an antenna tuning circuit 782, an impedance matching circuit 784, and/or a switching circuit 786. If the adjustable antenna interface 52, 72, and/or 74 includes a channel filter 780, the channel filter 780 is coupled to adjust a filter response of the adjustable antenna interface based on a channel selection signal associated with the first or second antenna control signal. For example, the channel filter 780 may be a band pass filter that is tuned to a particular channel or channels of a frequency band (e.g., the first or second frequency bands).

If the adjustable antenna interface 52, 72, and/or 74 includes an antenna tuning circuit 782, the antenna tuning circuit 782 is coupled to tune a response of the at least one antenna based on an antenna tuning signal 788 associated with the first or second antenna control signal 750 or 752. For instance, if an antenna is a half wavelength antenna for a particular frequency within a frequency band, but the RF signal is within the frequency band, but not the exact frequency, the antenna tuning circuit 782 adjusts the effective length of the antenna to the desired half wavelength. As an example, assume the particular frequency is 900 MHz, but the actual RF signal is at 960 MHz, then the half wavelength length is 16.67 centimeters (cm) (i.e., $0.5*(3\times10^8)/(900\times10^6)$). However, for a 960 MHz signal, the desired half wavelength length is 15.63 cm. In this example, the antenna tuning circuit 782, which includes one or more inductors and one or more capacitors, has its resonant frequency adjusted to the actual frequency of the inbound or outbound RF signal (e.g., 760 MHz) such that the effective length of the antenna is adjusted to 15.63 cm even though the actual length is 16.67 cm.

If the adjustable antenna interface 52, 72, and/or 74 includes an impedance matching circuit 784, the impedance matching circuit 784 is coupled to adjust impedance of the adjustable antenna interface 52, 72, and/or 74 based on an impedance matching control signal 790 associated with the first or second antenna control signal 750 or 752. In this instance, the impedance matching circuit 784 includes one or more inductors, one or more resistors, and one or more capacitors that are selectively enabled by the impedance matching control signal 790 such that the adjustable antenna interface 52, 72, and/or 74 has an impedance that substantially matches the impedance of the antenna. Note that in one embodiment, the impedance matching circuit 784 and the antenna tuning circuit 782 may be combined into one circuit and provide antenna tuning and impedance matching.

If, in one embodiment, the adjustable antenna interface 52, 72, and/or 74 includes a switching circuit 786, the switching circuit 786 is a single-ended to single-ended switching circuit that receives the inbound RF signals as single-ended signals from the at least one antenna and provides the inbound RF signals as the single-ended signals to the RF circuit. The single-ended to single-ended switching circuit also receives the outbound RF signals as single-ended signals from the RF circuit and provides the outbound RF signals as single-ended signals to the at least one antenna. In one embodiment, the switching circuit 786 includes a buffer or unity gain amplifier.

If, in another embodiment, the adjustable antenna interface 52, 72, and/or 74 includes a switching circuit 786, the switching circuit 786 is a single-ended to differential switching circuit that receives the inbound RF signals as single-ended signals from the at least one antenna and provides the inbound RF signals as differential signals to the RF circuit. The single-ended to differential switching circuit also receives the outbound RF signals as differential signals from the RF circuit and provides the outbound RF signals as single-ended signals to the at least one antenna. In one embodiment, the single-ended to differential switching circuit is a transformer balun.

If, in another embodiment, the adjustable antenna interface 52, 72, and/or 74 includes a switching circuit 786, the switching circuit 786 is a differential to differential switching circuit that receives the inbound RF signals as differential signals from the at least one antenna and provides the inbound RF signals as the differential signals to the RF circuit. The differential to differential switching circuit also receives the outbound RF signals as differential signals from the RF circuit and provides the outbound RF signals as the differential signals to the at least one antenna. In one embodiment, the differential to differential switching circuit may be a differential unity gain amplifier.

Figure 41:
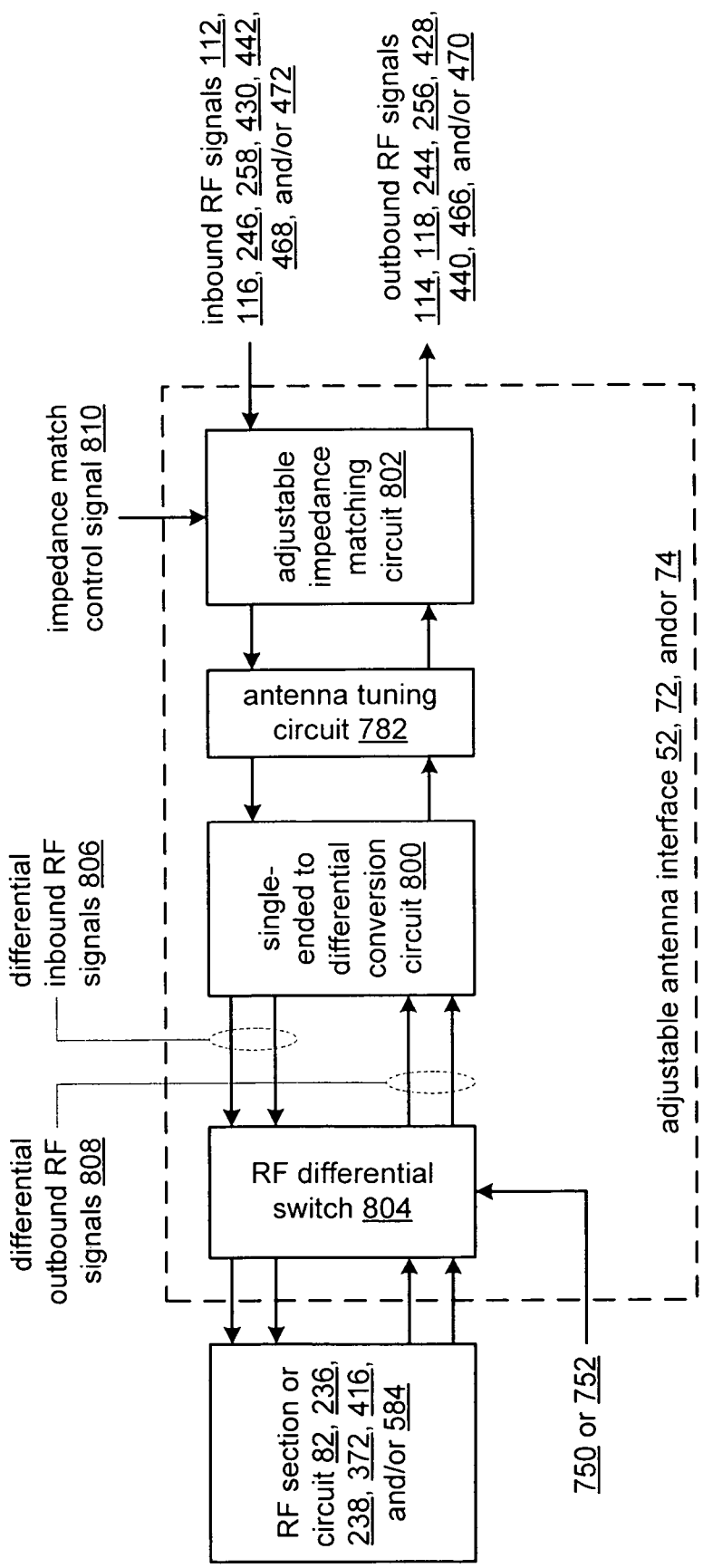
FIG. 41 is a schematic block diagram of another embodiment of an adjustable antenna interface in accordance with the present invention.

FIG. 41 is a schematic block diagram of another embodiment of an adjustable antenna interface 52, 72, and/or 74 coupled to the RF section or circuit 82, 236, 238, 372, 416, and/or 584. The adjustable antenna interface 52, 72, and/or 74 includes an impedance matching circuit 802, a single-ended to differential conversion circuit 800, an RF differential switch 804, and may further include an antenna tuning circuit 782.

The adjustable impedance matching circuit 802 receives inbound RF signals 112, 116, 246, 258, 430, 442, 468 and/or 472 from the at least one antenna and outputs outbound RF signals 114, 118, 244, 256, 428, 440, 466, and/or 470. In this embodiment, the adjustable impedance matching circuit 802 provides an impedance based on an impedance control signal 810 provided by an integrated circuit (IC). The adjustable impedance matching circuit 802 may include one or more inductors, one or more resistors, and one or more capacitors that are selectively enabled by the impedance matching control signal 810 such that the adjustable antenna interface 52, 72, and/or 74 has an impedance that substantially matches the impedance of the antenna.

If the adjustable antenna interface 52, 72, and/or 74 includes an antenna tuning circuit 782, the antenna tuning circuit 782 is coupled to tune a response of the at least one antenna based on an antenna tuning signal 788 associated with the first or second antenna control signal 750 or 752 as previously discussed. Note that in one embodiment, the impedance matching circuit 802 and the antenna tuning circuit 782 may be combined into one circuit and provide antenna tuning and impedance matching.

The single-ended to differential conversion circuit 806, which may be one or more transformer baluns, is coupled to convert inbound radio frequency (RF) signals from single-ended signals to differential signals to produce differential inbound RF signals 806 and to convert outbound RF signals 808 from differential signals to single-ended signals to produce single-ended outbound RF signals.

The RF differential switch 804, which may be a transmit/receive switch, provides the differential outbound RF signals 808 from the IC to the single-ended to differential conversion circuit 806 in accordance with a first antenna control signal 750 and provides the differential inbound RF signals 806 from the single-ended to differential conversion circuit 800 to the IC in accordance with a second antenna control signal 752.

The adjustable antenna interface 52, 72, and/or 74 may be expanded to include a second single-ended to differential conversion circuit and a second adjustable impedance matching circuit. In this embodiment, the second single-ended to differential conversion circuit is coupled to convert second inbound RF signals from single-ended signals to differential signals to produce second differential inbound RF signals and to convert second outbound RF signals from differential signals to single-ended signals to produce second single-ended outbound RF signals.

The second adjustable impedance matching circuit provides a second impedance based on a second impedance control signal provided by the IC. In this embodiment, the RF differential switch 804 provides the second differential outbound RF signals from the IC to the second single-ended to differential conversion circuit in accordance with a third antenna control signal and provides the second differential inbound RF signals from the second single-ended to differential conversion circuit to the IC in accordance with a fourth antenna control signal.

In one embodiment, the single-ended to differential conversion circuit 804 includes a transmit single-ended to differential conversion circuit and a receive single-ended to differential conversion circuit. The transmit single-ended to differential conversion circuit converts the outbound RF signals from differential signals to single-ended signals to produce the single-ended outbound RF signals, wherein the single-ended outbound RF signals are provided to a transmit antenna. The receive single-ended to differential conversion circuit converts the inbound RF signals from single-ended signals to differential signals to produce the differential inbound RF signals, wherein the inbound RF signals are received via a receive antenna. Note that the adjustable antenna interface 52, 72, and/or 74 may include an input for receiving the first antenna control signal 750, the second antenna control signal 752, and the impedance control signal 810 from the IC.

Figure 42:
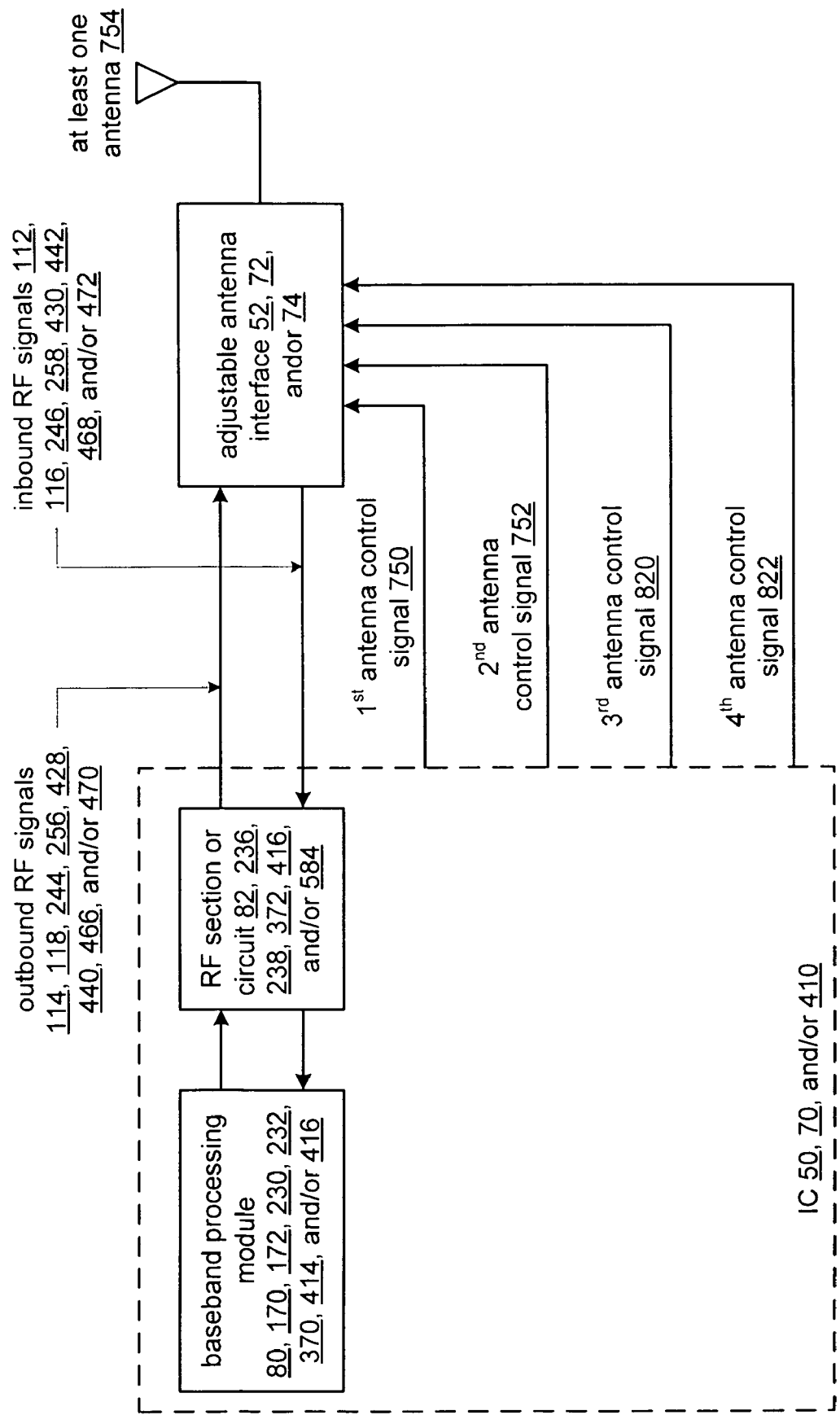
FIG. 42 is a schematic block diagram of another embodiment of a Voice Data RF IC coupled to another embodiment of an adjustable antenna interface in accordance with the present invention.

FIG. 42 is a schematic block diagram of another embodiment of a Voice Data RF IC 50, 70, and/or 410 coupled to an adjustable antenna interface 52, 72, and/or 74. The Voice Data RF IC 50, 70, and/or 410 includes a baseband processing module 80, 170, 172, 230, 232, 370, 414, 416, and/or 582 and an RF section or circuit 82, 236, 238, 372, 416, and/or 584. In this embodiment, the baseband processing module 80, 170, 172, 230, 232, 370, 414, 416, and/or 582 and the RF section or circuit 82, 236, 238, 372, 416, and/or 584 function as previously described with reference to FIG. 37.

In this embodiment, the adjustable antenna interface 52, 72, and/or 74 couples the at least one antenna 754 to transmit the outbound RF voice signals 114, 256, and/or 440 in response to a first antenna control signal 750, couples the at least one antenna 754 to receive the inbound RF voice signals 112, 258, and/or 442 in response to a second antenna control signal 752, couples the at least one antenna 754 to transmit the outbound RF data signals 118, 244, and/or 428 in response to a third antenna control signal 820, and to couple the at least one antenna 754 to receive the inbound RF data signals 116, 246, and/or 430 in response to a fourth antenna control signal 822, where the IC provides the first, second, third, and fourth antenna control signals.

In one embodiment, the at least one antenna 754 includes a transmit antenna and receive antenna. In this embodiment, the adjustable antenna interface 52, 72, and/or 74 couples the transmit antenna to the RF circuit for transmitting at least one of the outbound RF voice signals and the outbound RF data signals in response to at least one of the first and third antenna control signals. In addition, the adjustable antenna interface 52, 72, and/or 74 couples the receive antenna to the RF circuit for receiving at least one of the inbound RF voice signals and the inbound RF data signals in response to at least one of the second and fourth antenna control signals, wherein the outbound RF voice signals have a carrier frequency within a voice transmit band and the inbound RF voice signals have a carrier frequency within a voice receive band.

In another embodiment, the at least one antenna includes a voice transmit antenna, a data transmit antenna, a voice receive antenna, and a data receive antenna. In this embodiment, the adjustable antenna interface 52, 72, and/or 74 couples the voice transmit antenna to the RF circuit for transmitting the outbound RF voice signals in response to the first antenna control signal 750. The adjustable antenna interface 52, 72, and/or 74 couples the data transmit antenna to the RF circuit for transmitting the outbound RF data signals in response to the third antenna control signal 820. The adjustable antenna interface 52, 72, and/or 74 couples the voice receive antenna to the RF circuit for receiving the inbound RF voice signals in response to the second antenna control signal 752. The adjustable antenna interface 52, 72, and/or 74 couples the data receive antenna to the RF circuit for receiving the inbound RF data signals in response to the fourth antenna control signal 822. In this embodiment, the outbound RF voice signals have a carrier frequency within a voice transmit band and the inbound RF voice signals have a carrier frequency within a voice receive band, and wherein the outbound RF data signals have a carrier frequency within a data transmit band and the inbound RF data signals have a carrier frequency within a data receive band.

In another embodiment, the at least one antenna 754 includes a diversity antenna structure of a first antenna and a second antenna. In this embodiment, the adjustable antenna interface 52, 72, and/or 74 couples the first antenna to the RF circuit for transmitting the outbound RF voice signals in response to a first diversity state of the first antenna control signal. The adjustable antenna interface 52, 72, and/or 74 couples the first antenna to the RF circuit for transmitting the outbound RF data signals in response to a first diversity state of the third antenna control signal. The adjustable antenna interface 52, 72, and/or 74 couples the first antenna to the RF circuit for receiving the inbound RF voice signals in response to a first diversity state of the second antenna control signal. The adjustable antenna interface 52, 72, and/or 74 couples the first antenna to the RF circuit for receiving the inbound RF data signals in response to a first diversity state of the fourth antenna control signal.

Further, the adjustable antenna interface 52, 72, and/or 74 couples the second antenna to the RF circuit for transmitting the outbound RF voice signals in response to a second diversity state of the first antenna control signal. The adjustable antenna interface 52, 72, and/or 74 couples the second antenna to the RF circuit for transmitting the outbound RF data signals in response to a second diversity state of the third antenna control signal. The adjustable antenna interface 52, 72, and/or 74 couples the second antenna to the RF circuit for receiving the inbound RF voice signals in response to a second diversity state of the second antenna control signal. The adjustable antenna interface 52, 72, and/or 74 couples the second antenna to the RF circuit for receiving the inbound RF data signals in response to a second diversity state of the fourth antenna control signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio comprises:
    an integrated circuit (IC) that includes:
        a baseband processing module coupled to:
            convert outbound signal into a stream of outbound symbols; and
            convert a stream of inbound symbols into inbound signal;
        a radio frequency (RF) circuit coupled to:
            convert inbound RF signals into the stream of inbound symbols; and
            convert the stream of outbound symbols into outbound RF signals; and
    an adjustable antenna interface, communicatively coupled to the IC, operable to couple the at least one antenna to transmit the outbound RF signals in response to a first antenna control signal and to couple the at least one antenna to receive the inbound RF signals in response to a second antenna control signal, wherein the IC provides the first and second antenna control signals; and wherein the adjustable antenna interface includes:
        a single-ended to differential conversion circuit coupled to convert the inbound RF signals from single-ended signals to differential signals to produce differential inbound RF signals and to convert the outbound RF signals from differential signals to single-ended signals to produce single-ended outbound RF signals;
        an adjustable impedance matching circuit coupled to the single-ended to differential conversion circuit, wherein the adjustable impedance matching circuit provides an impedance based on an impedance control signal provided by the IC;
        an RF differential switch coupled to the single-ended to differential conversion circuit, wherein the RF differential switch provides the differential outbound RF signals from the RF circuit to the single-ended to differential conversion circuit in accordance with the first antenna control signal and provides the differential inbound RF signals from the single-ended to differential conversion circuit to the RF circuit in accordance with the second antenna control signal.

2. The radio of claim 1, wherein the adjustable antenna interface further functions to:
    couple a transmit antenna of the at least one antenna to the RF circuit for transmitting the outbound RF signals in response to the first antenna control signal; and
    couple a receive antenna of the at least one antenna to the RF circuit for receiving the inbound RF signals in response to the second antenna control signal, wherein the outbound RF signals have a carrier frequency within a transmit band and the inbound RF signals have a carrier frequency within a receive band.

3. The radio of claim 1, wherein the adjustable antenna interface further functions to:
    couple a first antenna of the at least one antenna to the RF circuit for transmitting the outbound RF signals in response to a first multi-mode state of the first antenna control signal;
    couple the first antenna of the at least one antenna to the RF circuit for receiving the inbound RF signals in response to a first multi-mode state of the second antenna control signal;
    couple a second antenna of the at least one antenna to the RF circuit for transmitting second outbound RF signals in response to a second multi-mode state of the first antenna control signal;
    couple the second antenna of the at least one antenna to the RF circuit for receiving second inbound RF signals in response to a second multi-mode state of the second antenna control signal, wherein the inbound and outbound RF signals have a carrier frequency within a first frequency band and the second inbound and outbound RF signals have a carrier frequency within a second frequency band.

4. The radio of claim 1, wherein the adjustable antenna interface further functions to:
    couple a first antenna of the at least one antenna to the RF circuit for transmitting the outbound RF signals in response to a first diversity state of the first antenna control signal;
    couple the first antenna of the at least one antenna to the RF circuit for receiving the inbound RF signals in response to a first diversity state of the second antenna control signal;
    couple a second antenna of the at least one antenna to the RF circuit for transmitting the outbound RF signals in response to a second diversity state of the first antenna control signal;

couple the second antenna of the at least one antenna to the RF circuit for receiving the inbound RF signals in response to a second diversity state of the second antenna control signal.

5. The radio of claim 1, wherein the adjustable antenna interface comprises at least one of:
a channel filter coupled to adjust a filter response based on a channel selection signal associated with the first or second antenna control signal;
an antenna tuning circuit coupled to tune a response of the at least one antenna based on an antenna tuning signal associated with the first or second antenna control signal; and
an impedance matching circuit coupled to adjust impedance of the adjustable antenna interface based on an impedance matching control signal associated with the first or second antenna control signal.

6. The radio of claim 1, wherein the adjustable antenna interface comprises at least one of:
a single-ended to single-ended switching circuit coupled to:
receive the inbound RF signals as single-ended signals from the at least one antenna and to provide the inbound RF signals as the single-ended signals to the RF circuit; and
receive the outbound RF signals as single-ended signals from the RF circuit and to provide the outbound RF signals as single-ended signals to the at least one antenna;
a single-ended to differential switching circuit coupled to:
receive the inbound RF signals as single-ended signals from the at least one antenna and to provide the inbound RF signals as differential signals to the RF circuit; and
receive the outbound RF signals as differential signals from the RF circuit and to provide the outbound RF signals as single-ended signals to the at least one antenna;
a differential to differential switching circuit coupled to:
receive the inbound RF signals as differential signals from the at least one antenna and to provide the inbound RF signals as the differential signals to the RF circuit; and
receive the outbound RF signals as differential signals from the RF circuit and to provide the outbound RF signals as the differential signals to the at least one antenna.

7. The radio of claim 1, wherein the adjustable antenna interface further comprises:
an antenna tuning circuit coupled to the adjustable impedance matching circuit, wherein the antenna tuning circuit adjusts frequency response of the at least one antenna based on an antenna tuning control signal received from the IC.

8. A cellular telephone circuit comprises:
an integrated circuit (IC) that includes:
a voice baseband processing module coupled to:
convert outbound voice signals into a stream of outbound voice symbols; and
convert a stream of inbound voice symbols into inbound voice signals;
a data baseband processing module coupled to:
convert outbound data into a stream of outbound data symbols; and
convert a stream of inbound data symbols into inbound data;
a radio frequency (RF) circuit coupled to:
convert inbound RF voice signals into the stream of inbound voice symbols;
convert the stream of outbound voice symbols into outbound RF voice signals;
convert inbound RF data signals into the stream of inbound data symbols; and
convert the stream of outbound data symbols into outbound RF data signals; and
an adjustable antenna interface, communicatively coupled to the IC, operable to couple the at least one antenna to transmit the outbound RF voice signals in response to a first antenna control signal, to couple the at least one antenna to receive the inbound RF voice signals in response to a second antenna control signal, to couple the at least one antenna to transmit the outbound RF data signals in response to a third antenna control signal, and to couple the at least one antenna to receive the inbound RF data signals in response to a fourth antenna control signal, wherein the IC provides the first, second, third, and fourth antenna control signals; and wherein the adjustable antenna interface includes:
a single-ended to differential conversion circuit coupled to convert the inbound RF voice or data signals from single-ended signals to differential signals to produce differential inbound RF voice or data signals and to convert the outbound RF voice or data signals from differential signals to single-ended signals to produce single-ended outbound RF voice or data signals;
an adjustable impedance matching circuit coupled to the single-ended to differential conversion circuit, wherein the adjustable impedance matching circuit provides an impedance based on an impedance control signal provided by the IC;
an RF differential switch coupled to the single-ended to differential conversion circuit, wherein the RF differential switch provides the differential outbound RF voice or data signals from the RF circuit to the single-ended to differential conversion circuit in accordance with the first or third antenna control signal and provides the differential inbound RF voice or data signals from the single-ended to differential conversion circuit to the RF circuit in accordance with the second or fourth antenna control signal.

9. The cellular telephone circuit of claim 8, wherein the adjustable antenna interface further functions to:
couple a transmit antenna of the at least one antenna to the RF circuit for transmitting at least one of the outbound RF voice signals and the outbound RF data signals in response to at least one of the first and third antenna control signals; and
couple a receive antenna of the at least one antenna to the RF circuit for receiving at least one of the inbound RF voice signals and the inbound RF data signals in response to at least one of the second and fourth antenna control signals, wherein the outbound RF voice signals have a carrier frequency within a voice transmit band and the inbound RF voice signals have a carrier frequency within a voice receive band.

10. The cellular telephone circuit of claim 9, wherein the adjustable antenna interface further functions to:
couple a voice transmit antenna of the at least one antenna to the RF circuit for transmitting the outbound RF voice signals in response to the first antenna control signal;
couple a data transmit antenna of the at least one antenna to the RF circuit for transmitting the outbound RF data signals in response to the third antenna control signal;

couple a voice receive antenna of the at least one antenna to the RF circuit for receiving the inbound RF voice signals in response to the second antenna control signal; and couple a data receive antenna of the at least one antenna to the RF circuit for receiving the inbound RF data signals in response to the fourth antenna control signal, wherein the outbound RF voice signals have a carrier frequency within a voice transmit band and the inbound RF voice signals have a carrier frequency within a voice receive band, and wherein the outbound RF data signals have a carrier frequency within a data transmit band and the inbound RF data signals have a carrier frequency within a data receive band.

11. The cellular telephone circuit of claim 8, wherein the adjustable antenna interface further functions to:

couple a first antenna of the at least one antenna to the RF circuit for transmitting the outbound RF voice signals in response to a first diversity state of the first antenna control signal;

couple the first antenna of the at least one antenna to the RF circuit for transmitting the outbound RF data signals in response to a first diversity state of the third antenna control signal;

couple the first antenna of the at least one antenna to the RF circuit for receiving the inbound RF voice signals in response to a first diversity state of the second antenna control signal;

couple the first antenna of the at least one antenna to the RF circuit for receiving the inbound RF data signals in response to a first diversity state of the fourth antenna control signal;

couple a second antenna of the at least one antenna to the RF circuit for transmitting the outbound RF voice signals in response to a second diversity state of the first antenna control signal;

couple the second antenna of the at least one antenna to the RF circuit for transmitting the outbound RF data signals in response to a second diversity state of the third antenna control signal;

couple the second antenna of the at least one antenna to the RF circuit for receiving the inbound RF voice signals in response to a second diversity state of the second antenna control signal; and couple the second antenna of the at least one antenna to the RF circuit for receiving the inbound RF data signals in response to a second diversity state of the fourth antenna control signal.

12. The cellular telephone circuit of claim 8, wherein the adjustable antenna interface comprises at least one of:

a channel filter coupled to adjust a filter response based on a channel selection signal associated with the first, second, third, or fourth antenna control signal;

an antenna tuning circuit coupled to tune a response of the at least one antenna based on an antenna tuning signal associated with the first, second, third, or fourth antenna control signal; and an impedance matching circuit coupled to adjust impedance of the adjustable antenna interface based on an impedance matching control signal associated with the first, second, third, or fourth antenna control signal.

13. The cellular telephone circuit of claim 8, wherein the adjustable antenna interface comprises at least one of:

a single-ended to single-ended switching circuit coupled to:
  receive the inbound RF voice or data signals as single-ended signals from the at least one antenna and to provide the inbound RF voice or data signals as the single-ended signals to the RF circuit; and
  receive the outbound RF voice or data signals as differential signals from the RF circuit and to provide the outbound RF voice or data signals as single-ended signals to the at least one antenna;

a single-ended to differential switching circuit coupled to:
  receive the inbound RF voice or data signals as single-ended signals from the at least one antenna and to provide the inbound RF voice or data signals as the single-ended signals to the RF circuit; and
  receive the outbound RF voice or data signals as differential signals from the RF circuit and to provide the outbound RF voice or data signals as single-ended signals to the at least one antenna;

a differential to differential switching circuit coupled to:
  receive the inbound RF voice or data signals as differential signals from the at least one antenna and to provide the inbound RF voice or data signals as the differential signals to the RF circuit; and
  receive the outbound RF voice or data signals as differential signals from the RF circuit and to provide the outbound RF voice or data signals as the differential signals to the at least one antenna.

14. The cellular telephone circuit of claim 8, wherein the adjustable antenna interface further comprises:

an antenna tuning circuit coupled to the adjustable impedance matching circuit, wherein the antenna tuning circuit adjusts frequency response of the at least one antenna based on an antenna tuning control signal received from the IC.

* * * * *